(12) United States Patent
Kawamura et al.

(10) Patent No.: US 9,175,218 B2
(45) Date of Patent: Nov. 3, 2015

(54) LIQUID CRYSTAL COMPOSITION AND LIQUID CRYSTAL DISPLAY ELEMENT

(71) Applicant: DIC CORPORATION, Tokyo (JP)

(72) Inventors: Joji Kawamura, Saitama (JP);
Masahiro Niwa, Kita-adachi-gun (JP);
Makoto Negishi, Kita-adachi-gun (JP);
Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/368,995

(22) PCT Filed: Mar. 22, 2013

(86) PCT No.: PCT/JP2013/058282
§ 371 (c)(1),
(2) Date: Jun. 26, 2014

(87) PCT Pub. No.: WO2014/147814
PCT Pub. Date: Sep. 25, 2014

(65) Prior Publication Data
US 2015/0108403 A1    Apr. 23, 2015

(51) Int. Cl.
*C09K 19/04* (2006.01)
*C09K 19/12* (2006.01)
(Continued)

(52) U.S. Cl.
CPC ............. *C09K 19/0403* (2013.01); *C09K 19/12* (2013.01); *C09K 2019/0407* (2013.01);
(Continued)

(58) Field of Classification Search
CPC ................. C09K 2019/123; C09K 2019/3016; G02F 1/13
See application file for complete search history.

(56) References Cited

U.S. PATENT DOCUMENTS

| | | |
|---|---|---|
| 2004/0065866 A1 | 4/2004 | Kato et al. |
| 2008/0303001 A1* | 12/2008 | Hattori et al. |
| 2009/0242835 A1 | 10/2009 | Fujita et al. |

FOREIGN PATENT DOCUMENTS

| | | |
|---|---|---|
| JP | 2000-053602 A | 2/2000 |
| JP | 2008-037918 A | 2/2008 |

(Continued)

OTHER PUBLICATIONS

International Search Report, dated Apr. 23, 2013, issued in corresponding application No. PCT/JP2013/058282.
Written Opinion, dated Apr. 23, 2013, issued in corresponding application No. PCT/JP2013/058282.

*Primary Examiner* — Shean C Wu
(74) *Attorney, Agent, or Firm* — Westerman, Hattori, Daniels & Adrian, LLP

(57) ABSTRACT

There is provided a liquid crystal composition comprising: at least one kind of a compound represented by the following formula (i); and at least one kind of a compound represented by the following formula (ii). In the formulae, each of $R^{i1}$, $R^{i2}$ and $R^{ii1}$ independently represents an alkyl group having a carbon number of 1-8; one of the alkyl groups, or two or more of the alkyl groups being noncontiguous, include —$CH_2$— which can be independently substituted by —CH=CH—, —C≡C—, —O—, —CO—, —COO— or —OCO—; hydrogen atom in the alkyl group can be substituted by fluorine atom or chlorine atom; and each of $X^{i1}$, $X^{i2}$, $X^{i3}$ and $X^{i4}$ independently represents hydrogen atom or fluorine atom.

7 Claims, 1 Drawing Sheet

(51) Int. Cl.
   *C09K 19/30* (2006.01)
   *G02F 1/1333* (2006.01)
   *G02F 1/1339* (2006.01)

(52) U.S. Cl.
   CPC ... *C09K2019/0466* (2013.01); *C09K 2019/123* (2013.01); *C09K 2019/3016* (2013.01); *G02F 1/1333* (2013.01); *G02F 1/13394* (2013.01)

(56) References Cited

FOREIGN PATENT DOCUMENTS

| | | |
|---|---|---|
| JP | 2008-038018 A | 2/2008 |
| JP | 2010-275390 A | 12/2010 |
| JP | 2011-052120 A | 3/2011 |
| WO | 2007/108307 A1 | 9/2007 |

* cited by examiner

LIQUID CRYSTAL COMPOSITION AND LIQUID CRYSTAL DISPLAY ELEMENT

TECHNICAL FIELD

The present invention relates to a nematic liquid crystal composition and a liquid crystal display element using it, that are useful as a liquid crystal display material, in which its dielectric constant anisotropic value ($\Delta\varepsilon$) is positive.

Liquid crystal display elements have been used in various devices such as measuring equipment, automotive panel, word processor, electronic note, printer, computer, TV, clock, advertisement panel board, and etc., including watch and electronic calculator. The representative of the liquid crystal display method includes TN (twisted nematic) type, STN (super twisted nematic) type, vertical orientation type using a TFT (thin film transistor), and IPS (in-plane switching) type. The liquid crystal composition used in the liquid crystal display element is demanded to be stable to the external stimulation such as water, air, heat, and light. It is also demanded to exhibit a liquid crystalline phase in a temperature range as wide as possible including the room temperature, as well as to have a low viscosity and to require lower drive voltage. Furthermore, the liquid crystal composition comprises several to dozens of components in order to make individual display element provided with the most appropriate values of dielectric constant anisotropy ($\Delta\varepsilon$) and/or refractive index anisotropy ($\Delta n$).

A vertical orientation (VA) type display uses a liquid crystal composition whose value of $\Delta\varepsilon$ is negative, and a horizontal orientation model display such as TN type, STN type and IPS (in-plane switching) type uses a liquid crystal composition whose value of $\Delta\varepsilon$ is positive. Also, there is a report of a drive type using a liquid crystal composition having a positive value of $\Delta\varepsilon$, which is made a vertical orientation at no voltage application, but when applying horizontal electric field, it can display. Therefore, the need for liquid crystal composition having a positive value of $\Delta\varepsilon$ has been further increased. On the other hand, lower voltage drive, higher response, and wider operating temperature are demanded in all drive types. Namely, it is demanded to have a positive value of $\Delta\varepsilon$ with a higher absolute value, having a lower viscosity ($\eta$), and higher transition temperature (Tni) between nematic phase and isotropic liquid phase. Also, in order to regulate the product ($\Delta n \times d$) of $\Delta n$ and a cell gap (d) in a specified value, it is required to adjust the $\Delta n$ value of the liquid crystal composition in a suitable range in accordance with the cell gap. In addition, when the liquid crystal display element is applied to a TV, high-speed response is weighed heavily, and therefore, the liquid crystal composition is required to have a small rotary viscosity ($\gamma 1$).

As a constitution of the liquid crystal composition to accomplish high-speed response, an example of such a liquid crystal composition was disclosed, that is a combination of a compound represented by the formula (A-1) or formula (A-2) that is a liquid crystal compound with a positive value of $\Delta\varepsilon$, with a compound represented by the formula (B) that is a liquid crystal compound with a neutral value of $\Delta\varepsilon$. Such a liquid crystal composition is characterized in that the liquid crystal compound with the positive $\Delta\varepsilon$ has a —CF$_2$O— structure, and that the liquid crystal compound with the neutral $\Delta\varepsilon$ has an alkenyl group. These characteristics are widely known in the field of the liquid crystal composition (see Patent References Nos. 1-4).

Chemical Formula 1

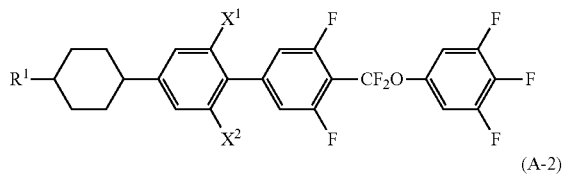

(A-1)

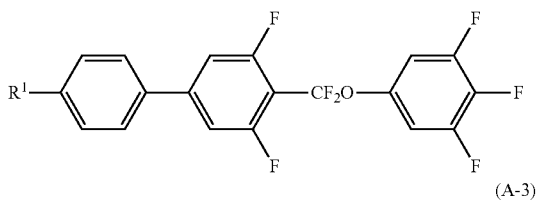

(A-2)

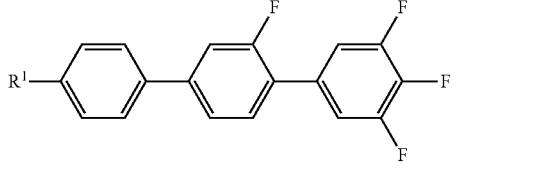

(A-3)

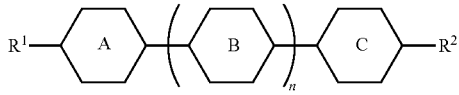

(B)

On the other hand, as the application of the liquid crystal display element has come to spread, a large change has been made in its use and manufacturing method. In order to cope with the change, it has been demanded to optimize the characteristics more than the basic physical properties as conventionally known. Namely, as the liquid crystal display element using the liquid crystal composition, a VA type and an IPS type have been widely used, and in addition, a display element having a super large size such as model 50 or more has become available and used. As upsizing the board size, the injection method of the liquid crystal composition into the board has been changed, too; that is, the conventional vacuum injection method has been replaced with an instillation method (ODF: One Drop Fill). However, a problem of deteriorated display quality has been noticed due to the drip trace caused when dropping the liquid crystal composition onto board. Furthermore, in the liquid crystal display element manufacture process using the ODF method, it is necessary to drop a liquid crystal at the most suitable quantity according to the size of the liquid crystal display element. As the dripping quantity becomes significantly different from the optimum quantity, the designed balance in the refractive index and the drive electric field of the liquid crystal display element can be collapsed, thereby causing indication defectiveness such as irregularity outbreak and contrast defectiveness. Particularly, in case of a small-sized liquid crystal display element widely used in smartphones being recently popular, the most suitable quantity of the liquid crystal to be dropped is so small that it is difficult to control the gap fallen within a certain range from the optimum quantity. Therefore, in order to maintain a high production yield of the liquid crystal display element, a liquid crystal composition is required e.g., to be little influenced by sudden change in pressure and impact caused inside the dripping device during the liquid crystal dripping, as well as to allow it to be continuously dropped for an extended period.

In this way, in the liquid crystal composition used in the active matrix drive liquid crystal display element driven with TFT elements, the followings are demanded: to maintain a characteristic and performance for a liquid crystal display element such as high speed response performance; to provide with high resistivity level, high voltage retention, and stability to the outside stimulation such as light and heat; and to consider the manufacturing method of the liquid crystal display element.

PRIOR ART REFERENCES

Patent References

Patent Reference No. 1: Japanese Laid-Open Patent Publication No. 2008-037918
Patent Reference No. 2: Japanese Laid-Open Patent Publication No. 2008-038018
Patent Reference No. 3: Japanese Laid-Open Patent Publication No. 2010-275,390
Patent Reference No. 4: Japanese Laid-Open Patent Publication No. 2011-052120

SUMMARY OF THE INVENTION

The Objectives to Solve by the Invention

The objective to solve in the present invention is to provide a liquid crystal composition and to provide a liquid crystal display element using the same. Here, the liquid crystal composition has a positive value of $\Delta\epsilon$, which can produce the liquid crystal display element with an excellent display quality at a high yield, having a liquid crystal phase at a wide temperature range, being small in the small viscosity, excellent in the solubility at a low temperature, high in the specific resistivity and the voltage retention, stable to the heat and light irradiation, and causing little defectiveness such as ghosting or drip trace.

Means to Solve the Problem

The inventors have examined various kinds of liquid crystal compounds and various kinds of chemical substance, and eventually reached the solution to the objective by combining specific liquid crystal compounds, thereby accomplishing the present invention. Namely, the first aspect of the present invention is the following liquid crystal composition, and the second aspect of the present invention is the following liquid crystalline elements.

Aspect (1): There is provided a liquid crystal composition comprising: at least one kind of a compound represented by the following formula (i); and at least one kind of a compound represented by the following formula (ii).

Chemical Formula 2:

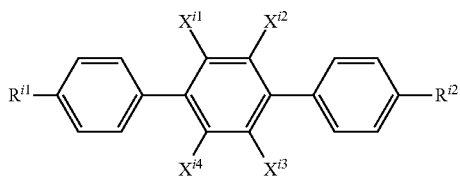

(i)

-continued

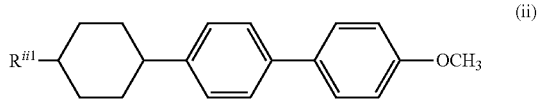

(ii)

In the formulae, each of $R^{i1}$, $R^{i2}$ and $R^{ii1}$ independently represents an alkyl group having a carbon number of 1-8; one of the alkyl groups, or two or more of the alkyl groups being noncontiguous, include —$CH_2$— which can be independently substituted by —CH=CH—, —C≡C—, —O—, —CO—, —COO— or —OCO—; hydrogen atom in the alkyl group can be substituted by fluorine atom or chlorine atom; and each of $X^{i1}$, $X^{i2}$, $X^{i3}$ and $X^{i4}$ independently represents hydrogen atom or fluorine atom.

Aspect (2): The liquid crystal composition according to aspect (1), wherein $X^{i2}$ in the formula (i) is fluorine atom.

Aspect (3): The liquid crystal composition according to aspect (1) or (2), wherein $X^{i1}$, $X^{i3}$ and $X^{i4}$ in the formula (i) are hydrogen atom.

Aspect (4): The liquid crystal composition according to any of aspects (1) to (3), further comprising a compound represented by formula (L).

Chemical Formula 3:

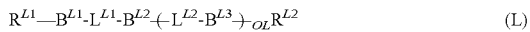

(L)

In the formula, each of $R^{L1}$ and $R^{L2}$ independently represents an alkyl group having a carbon atom number of 1-8. One of the alkyl groups, or two or more of the alkyl groups being noncontiguous, include —$CH_2$— which can be independently substituted by —CH=CH—, —C≡C—, —O—, —CO—, —COO— or —OCO—.

OL represents 0, 1, 2 or 3.

Each of $B^{L1}$, $B^{L2}$ and $B^{L3}$ independently represents a group selected from the group consisting of (a) and (b) below.

(a): 1,4-cyclohexylene group (in which one of —$CH_2$— groups or noncontiguous two of —$CH_2$— groups can be substituted with —O—); and (b): 1,4-phenylene group (in which one of —CH= group or noncontiguous two of —CH= group can be substituted with —N=). Here, at least one hydrogen atom in the group (a) and the group (b) can be independently substituted with cyano group, fluorine atom or chlorine atom.

Each of $L^{L1}$ and $L^{L2}$ independently represents single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF— or —C≡C—.

When OL is 2 or 3 so that plural groups of $L^{L2}$ exist, said plural groups of $L^{L2}$ can be the same or different; and when OL is 2 or 3 so that plural groups of $B^{L3}$ exist, said plural groups of $B^{L3}$ can be the same or different. Here, the compound represented by formula (L) is not the compound represented by the formula (i) or the compound represented by the formula (ii).

Aspect (5): The liquid crystal composition according to any of aspects (1) to (4), further comprising a compound represented by formula (M).

Chemical Formula 4

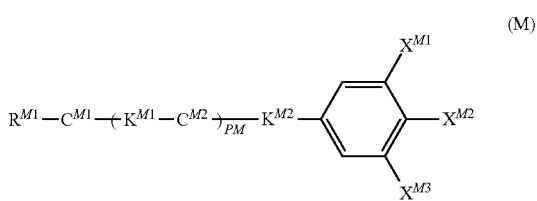

In the formula, $R^{M1}$ represents an alkyl group having a carbon atom number of 1-8; one of the alkyl groups, or two or more of the alkyl groups being noncontiguous, include —$CH_2$— which can be independently substituted by —CH=CH—, —C≡C—, —O—, —CO—, —COO— or —OCO—.

PM represents 0, 1, 2 3 or 4.

Each of $C^{M1}$ and $C^{M2}$ independently represents a group selected from the group consisting of (d) and (e) below;

(d): 1,4-cyclohexylene group (in which one of —$CH_2$— groups or noncontiguous two of —$CH_2$— groups can be substituted with —O— or —S—); and (e): 1,4-phenylene group (in which one of —CH= groups or noncontiguous two of —CH= groups can be substituted with —N=). Here, at least one hydrogen atom in the group (d) and the group (e) can be independently substituted with cyano group, fluorine atom or chlorine atom.

Each of $K^{M1}$ and $K^{M2}$ independently represents single bond, —$CH_2CH_2$—, —$(CH_2)_4$—, —$OCH_2$—, —$CH_2O$—, —$OCF_2$—, —$CF_2O$—, —COO—, —OCO— or —C≡C—.

When PM is 2, 3 or 4 so that plural groups of $K^{M1}$ exist, said plural groups of $K^{M1}$ can be the same or different; and when PM is 2, 3 or 4 so that plural groups of $C^{M2}$ exist, said plural groups of $C^{M2}$ can be the same or different.

Each of $X^{M1}$ and $X^{M3}$ independently represents hydrogen atom, chlorine atom or fluorine atom.

$X^{M2}$ represents hydrogen atom, fluorine atom, chlorine atom, cyano group, trifluoromethyl group, fluoromethoxy group, difluoromethoxy group, trifluoromethoxy group or 2,2,2-trifluoroethyl group.

Aspect 6: There is provided a liquid crystal display element using the composition of any of aspects (1) to (5).

Aspect (7): There is provided a liquid crystal display element using the composition of any of aspects (1) to (6), useful for IPS mode, OCB mode, ECB mode, VA mode, VA-IPS mode or FFS mode.

Aspect (8): There is provided a liquid crystal display using the liquid crystal display element of aspect (6) or (7).*

The liquid crystal composition with positive dielectric constant anisotropy in the present invention has a lower viscosity than conventional known, and therefore showing good solubility at a low temperature, and exhibiting extremely small degree of changes of the specific resistivity and the voltage retention due to heat and light. Therefore, the liquid crystal composition of the present invention can be high in the practical use (applicability) as liquid crystalline products, and therefore, use of the liquid crystal composition to produce a liquid crystal display element such as IPS type or FFS type can accomplish high speed response. In addition, even after the manufacturing process of the liquid crystal display element, the liquid crystal composition of the present invention can stably show its performance, and therefore, very useful is the restrained display defectiveness caused by the manufacturing process, thereby producing the liquid crystal display element at a high yield.

EMBODIMENTS TO CARRY OUT THE INVENTION

Figure 1:
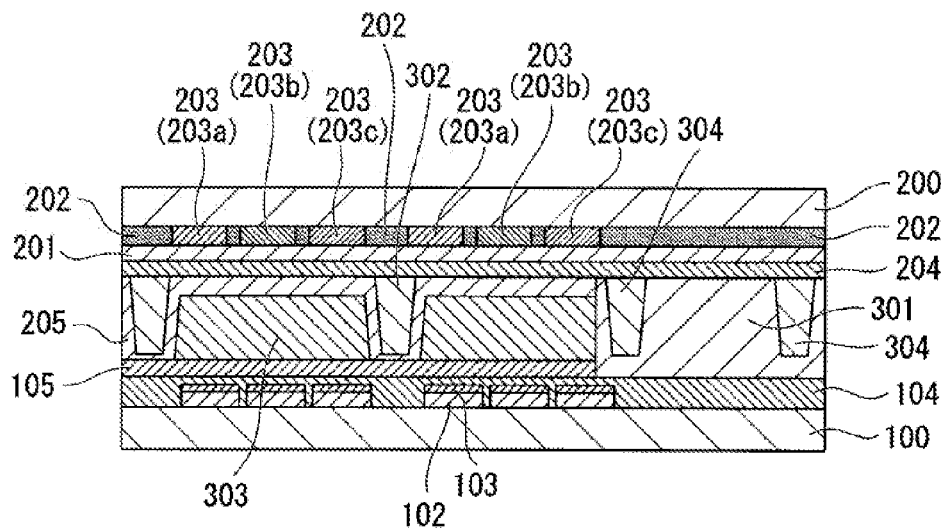
FIG. 1 is a cross section view of the liquid crystal display element of the present invention. The boards with elements 100-105 are referred to as "back-plane," and the board with elements 200-205 are referred to as "front-plane."

The indication of "%" in the following compositions means "mass %" unless otherwise stated.

The liquid crystal composition of the present invention includes at least one kind of a compound represented by the following formula (i); and at least one kind of a compound represented by the following formula (ii).

Chemical Formula 5:

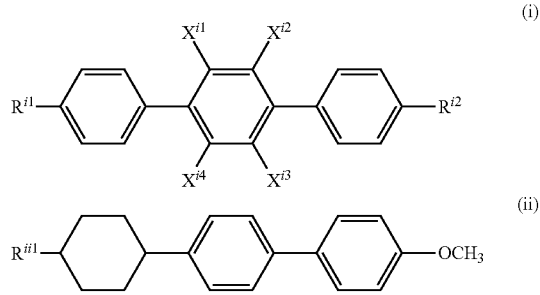

In the formulae, each of Ri1, Ri2 and Rii1 independently represents an alkyl group having a carbon number of 1-8; one of the alkyl groups, or two or more of the alkyl groups being noncontiguous, include —$CH_2$— which can be independently substituted by —CH=CH—, —C≡C—, —O—, —CO—, —COO— or —OCO—; hydrogen atom in the alkyl group can be substituted by fluorine atom or chlorine atom; and each of $X^{i1}$, $X^{i2}$, $X^{i3}$ and $X^{i4}$ independently represents hydrogen atom or fluorine atom.

Compound Represented by Formula (i)

In the formula (i), it is favorable that $X^{i2}$ is fluorine atom, and that $X^{i1}$, $X^{i3}$ and $X^{i4}$ are hydrogen atom. In the formula (i), it is preferable that each of $R^{i1}$ and $R^{i2}$ independently is: a linear alkyl group having a carbon atom number of 1-8 or a linear alkenyl group having a carbon atom number of 2-8; in particular, a linear alkyl group having a carbon atom number of 2-5 or a linear alkenyl group having a carbon atom number of 2-5; and more in particular, is selected from the group of methyl group, ethyl group, propyl group, butyl group, pentyl group, and the structure as follows.

Chemical Formula 6:

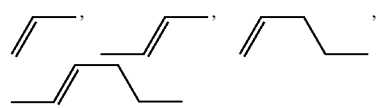

The right side end of the structure in the formula above shall be combined to the ring structure.

Here, ethyl group or propyl group is preferable.

When considering the weight on the improvement of the response speed, alkenyl group is desirable; and when considering the weight on the reliability such as voltage retention when producing a liquid crystal composition, alkyl group is preferable.

As to the inclusion amount of the compound represented by formula (i) with respect to 100 gross weight mass % of the liquid crystal composition of the present invention, the upper limit can be preferably 15 mass %, and more preferably 13 mass %, yet more preferably 10 mass %, further yet more preferably 8 mass %, and furthermore preferably 7 mass %; and the lower limit can be 0.5 mass %, and more preferably 1 mass %, and yet more preferably 3 mass % is desirable, and further yet more preferably 5 mass %.

Specifically, as to the inclusion amount of the compound represented by formula (i) with respect to 100 gross weight mass % of the liquid crystal composition of the present invention, preferable is 1 mass % or more and 11 mass % or less, more preferable is 3 mass % or more and 9 mass % or less, yet more preferable is 4 mass % or more and 8 mass % or less, further preferable is 5 mass % or more and 7 mass % or less.

The compounds represented by the formula (i) can include the compound represented by formula (i-1).

Chemical Formula 7:

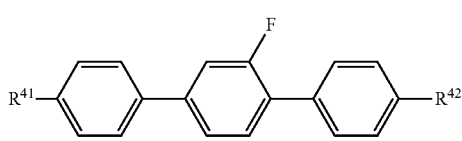

(i-1)

In the formula, each of $R^{41}$ and $R^{42}$ independently represents an alkyl group having a carbon atom number of 1-5 or an alkenyl group having a carbon atom number of 2-5.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds. Furthermore, another embodiment of the present invention can include three kinds. Furthermore, another embodiment of the present invention can include four kinds. Furthermore, another embodiment of the present invention can include five kinds. Furthermore, another embodiment of the present invention can include six or more kinds.

Furthermore, it is preferable that the compound represented by formula (i-1) can be a compound selected from the group consisting of ones represented by formula (i-1-1).

Chemical Formula 8:

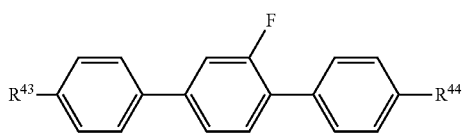

(i-1-1)

In the formula, each of $R^{43}$, $R^{44}$ independently represents an alkyl group having a carbon atom number of 1-5.

The content of the compound represented by formula (i-1-1) is required to be appropriately adjusted in accordance with the demanded performances such as solubility at a low temperature, transition temperature, electric reliability, birefringence rate, process compatibility, drip trace, and ghosting, dielectric constant anisotropy.

With respect to the total mass of the liquid crystal composition of the present invention, the content of the compound represented by formula (i-1-1) can be e.g., 1-40 mass % in one embodiment. Furthermore, the content above can be 2-40 mass % in another embodiment of the present invention. Furthermore, the content above can be 4-40 mass % in another embodiment of the present invention. Furthermore, the content above can be 6-40 mass % in another embodiment of the present invention. Furthermore, the content above can be 8-40 mass % in another embodiment of the present invention. Furthermore, the content above can be 10-40 mass % in another embodiment of the present invention. Furthermore, the content above can be 12-40 mass % in another embodiment of the present invention. Furthermore, the content above can be 15-40 mass % in another embodiment of the present invention. Furthermore, the content above can be 18-40 mass % in another embodiment of the present invention. Furthermore, the content above can be 21-40 mass % in another embodiment of the present invention.

Also, for example, with respect to the total mass of the liquid crystal composition of the present invention, the content of the compound represented by formula (i-1-1) can be 1-40 mass % in one embodiment of the present invention. Furthermore, the content above can be 1-30 mass % in another embodiment of the present invention. Furthermore, the content above can be 1-25 mass % in another embodiment of the present invention. Furthermore, the content above can be 1-20 mass % in another embodiment of the present invention. Furthermore, the content above can be 1-15 mass % in another embodiment of the present invention. Furthermore, the content above can be 1-10 mass % in another embodiment of the present invention. Furthermore, the content above can be 1-5 mass % in another embodiment of the present invention. Furthermore, the content above can be 1-4 mass % in another embodiment of the present invention.

It is preferable that the compound represented by formula (i-1-1) can be the compound that is represented, for example, by formulae (i-1-1.1) to (i-1-1.9), and in particular, it is preferable to choose the compound represented by formulae (i-1-1.1), (i-1-1.4) and (i-1-1.6).

Chemical Formula 9:

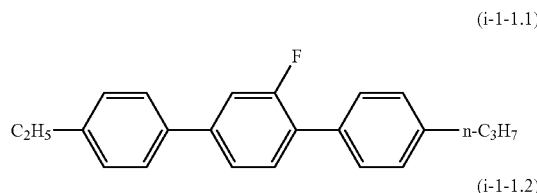

(i-1-1.1)

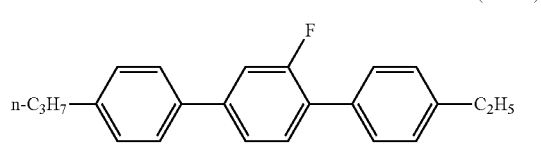

(i-1-1.2)

-continued

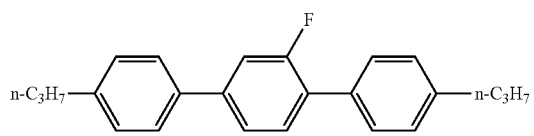
(i-1-1.3)

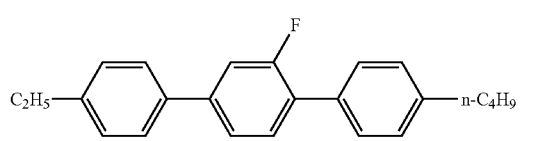
(i-1-1.4)

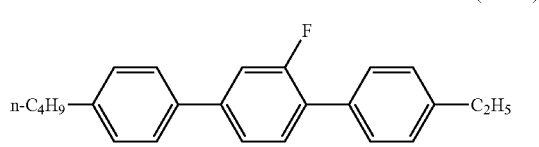
(i-1-1.5)

(i-1-1.6)

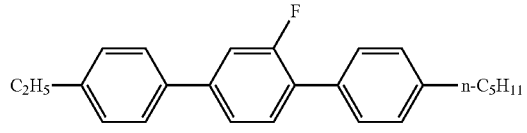
(i-1-1.7)

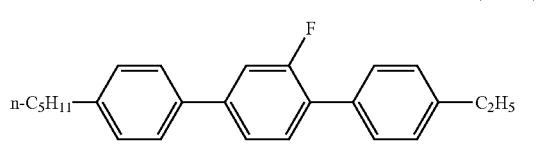
(i-1-1.8)

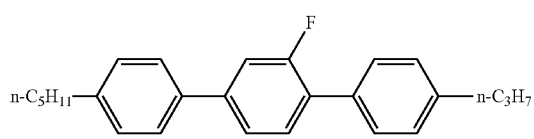
(i-1-1.9)

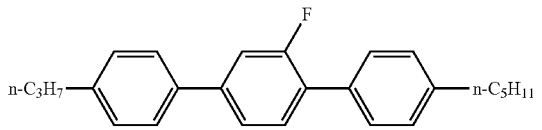

The kinds of the compounds to be combined are not particularly restricted, and one to three kinds of these compounds can be preferably used, and furthermore, one to four kinds of them can be preferably used. Also in view of the solubility, it is effective to make wide the molecular weight distribution of the compounds to be chosen. For example, one kind is selected from the compounds represented by formulae (i-1-1.1) and (i-1-1.2), one kind is selected from the compounds represented by formulae (i-1-1.4) and (i-1-1.5), one kind is selected from the compounds represented by formulae (i-1-1.6) and (i-1-1.7), one kind is selected from the compounds represented by formulae (i-1-1.8) and (i-1-1.9), and then, these selected compounds can be appropriately combined.

In one embodiment of the present invention, the followings are preferable ranges of the content of the compound represented by formula (i-1-1.1) with respect to the total mass of the liquid crystal composition of the present invention. That is, the upper limit thereof can be 25 mass %, preferably 20 mass %, more preferably 15 mass %, yet more preferably 13 mass %, further preferably 6 mass %, yet further preferably 4 mass %, and furthermore preferably 3 mass %. The lower limit thereof can be 0.5 mass %, and more preferably 1 mass %, and yet more preferably 5 mass %, and further preferably 6 mass %.

Specifically, the content of the compound represented by formula (i-1-1.1) can be as follows, with respect to 100 gross mass % of the liquid crystal composition of the present invention, and preferable is 0.5 mass % or more and 8 mass % or less, and more preferable is 1 mass % or more and 5 mass % or less, yet more preferable is 1 mass % or more and 3 mass % or less. In another embodiment, preferable is 4 mass % or more and 15 mass % or less, more preferable is 5 mass % or more and 13 mass % or less, yet more preferable is 6 mass % or more and 12 mass % or less.

In one embodiment of the present invention, with respect to the total mass of the liquid crystal composition of the present invention, the content of the compound represented by formula (i-1-1.4) can be preferably as follows. That is, the upper limit thereof can be 25 mass %, preferably 20 mass %, more preferably 15 mass %, yet more preferably 13 mass %, further preferably 6 mass %, yet further preferably 4 mass %, and furthermore preferably 3 mass %. The lower limit thereof can be 0.5 mass %, preferably 1 mass %, more preferably 5 mass %, yet more preferably 6 mass %.

Specifically, the content of the compound represented by formula (i-1-1.4) can be as follows, with respect to total 100 mass % of the liquid crystal composition of the present invention. That is, preferable is 0.5 mass % or more and 8 mass % or less, more preferable is 1 mass % or more and 5 mass % or less, yet more preferable is 1 mass % or more and 3 mass % or less, In other embodiments, preferably is 4 mass % or more and 15 mass % or less, more preferable is 5 mass % or more and 13 mass % or less, yet more preferable is 6 mass % or more and 12 mass % or less.

In one embodiment of the present invention, with respect to the total mass of the liquid crystal composition of the present invention, the content of the compound represented by formula (i-1-1.6) can be as follows. That is, the upper limit thereof can be preferably 25 mass %, more preferably 20 mass %, yet more preferably 15 mass %, further preferably 13 mass %, yet further preferably 6 mass %, furthermore preferably 4 mass %, yet furthermore preferably 3 mass %. The lower limit can be preferably 0.5 mass %, more preferably 1 mass %, yet more preferably 5 mass %, further preferably 6 mass %.

Specifically, the content of the compound represented by formula (i-1-1.6) can be as follows. With respect to total 100 mass % of the liquid crystal composition of the present invention, preferable is 0.5 mass % or more and 8 mass % or less, more preferable is 1 mass % or more and 5 mass % or less, yet more preferable is 1 mass % or more and 3 mass % or less. In another embodiment, preferably is 4 mass % or more and 15 mass % or less, more preferable is 5 mass % or more and 13 mass % or less, yet more preferable is 6 mass % or more and 12 mass % or less.

Also, it is preferable that the compound represented by formula (i-1) can be a compound selected from the group consisting of ones represented by formula (i-1-2).

Chemical Formula 10:

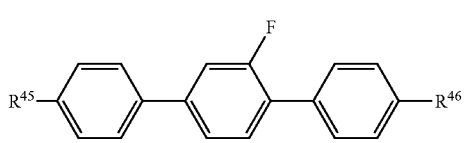

(i-1-2)

In the formula, each of $R^{45}$ and $R^{46}$ independently represents an alkyl group having a carbon atom number of 1-5 or an alkenyl group having a carbon atom number of 2-5, but at least one of them is an alkenyl group having carbon atom number of 2-5.

The kinds of the compounds to be combined are not particularly restricted, but can be combined in accordance with the demand on performances such as solubility at a low temperature, transition temperature, electric reliability, and the birefringence rate.

The content of the compound represented by formula (i-1-2) is required to be appropriately adjusted in accordance with the demanded performances such as solubility at a low temperature, transition temperature, electric reliability, birefringence rate, process compatibility, drip trace, ghosting and dielectric constant anisotropy. For example, with respect to the total mass of the liquid crystal composition of the present invention, it is favorable that the content of the compound can be 0.5-40 mass %. As to more favorable content, the examples are 1-40 mass %, 2-40 mass %, 3-40 mass %, 5-40 mass %, 7-40 mass %, 9-40 mass %, 12-40 mass %, 15-40 mass % and 20-40 mass %, or alternatively, 1-40 mass %, 1-30 mass %, 1-25 mass %, 1-20 mass %, 1-15 mass %, 1-10 mass %, 1-5 mass % and 1-4 mass %.

It is preferably that the compound represented by formula (i-1-2) can be a compound that is represented, for example, by formulae (i-1-2.1) to (i-1-2.8).

Chemical Formula 11

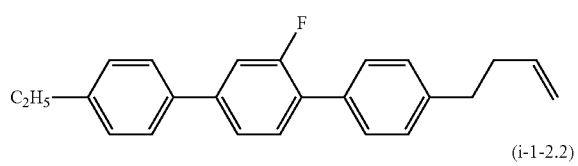

(i-1-2.1)

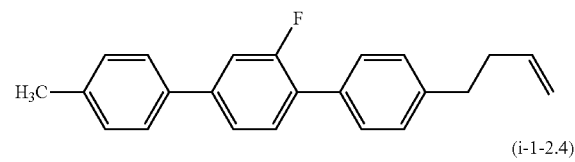

(i-1-2.2)

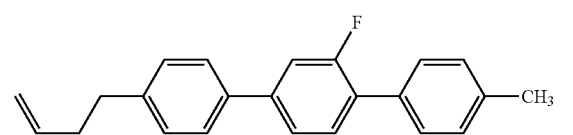

(i-1-2.3)

(i-1-2.4)

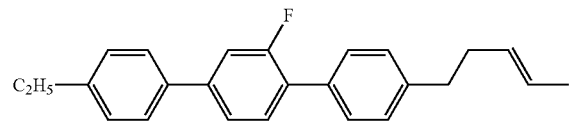

(i-1-2.5)

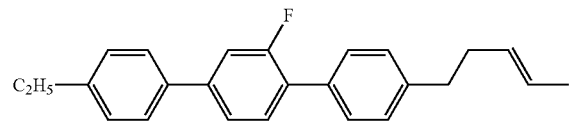

(i-1-2.6)

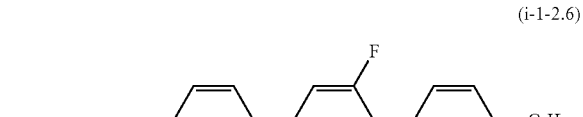

(i-1-2.7)

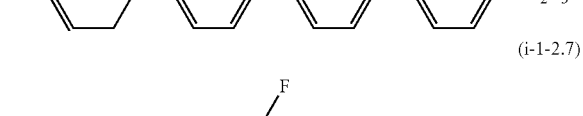

(i-1-2.8)

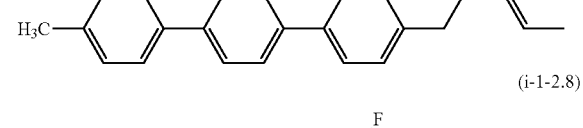

In view of solubility, it is effective to make broad the molecular weight distribution of the compounds to be chosen as ingredients of the liquid crystal composition. For example, one kind is selected from the compounds represented by formula (i-1-2.1) and formula (i-1-2.2), one kind is selected from the compounds represented by formula (i-1-2.3) and formula (i-1-2.4), one kind is selected from the compounds represented by formula (i-1-2.5) and formula (i-1-2.6), one kind is selected from the compounds represented by formula (i-1-2.7) and formula (i-1-2.8), and then, these selected compounds can be appropriately combined.

Compound Represented by Formula (ii)

In formula (ii), Rii1 is preferably alkyl group having a carbon atom number of 1-8 or a linear alkenyl group having a carbon atom number 2-8, and in particular, a linear alkyl group having a carbon atom number of 2-5 or a linear alkenyl group of linear alkyl group having a carbon atom number of 2-5. More in particular, preferable is ethyl group, propyl group, butyl group, pentyl group or the following structures.

Chemical Formula 12:

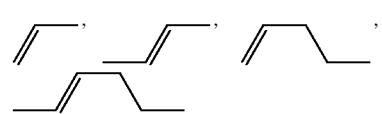

The right side end of the structure in the formula above shall be combined to the ring structure. Here, propyl group, butyl group or pentyl group is preferably, and in particular, pentyl group is preferable.

When considering the weight on the improvement of the response speed, alkenyl group is desirable; and when considering the weight on the reliability such as voltage retention when producing a liquid crystal composition, alkyl group is preferable.

The inclusion amount of the compound represented by formula (ii) with respect to total 100 mass % of the liquid crystal composition of the present invention can be as follows. The upper limit can preferably 15 mass %, more preferably 13 mass %, yet more preferably 10 mass %, further preferably 8 mass %, and, yet further preferably 7 mass %. The lower limit can preferably 0.5 mass %, more preferably 1 mass %, yet more preferably 3 mass %, and further preferably 5 mass %.

Specifically, as to the inclusion amount of the compound represented by formula (ii) with respect to total 100 mass % of the liquid crystal composition of the present invention, preferable is 1 mass % or more and 11 mass % or less, preferable is 3 mass % or more and 9 mass % or less, preferable is 4 mass % or more and 8 mass % or less, preferable is 5 mass % or more and 7 mass % or less.

It is preferably that the compound represented by formula (ii) is selected from the compounds represented by formula (ii-1).

Chemical Formula 13

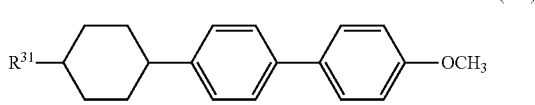

(ii-1)

$R^{31}$ represents an alkyl group having a carbon atom number of 1-5.

It is preferable that the compound represented by formula (ii-1) is selected from the groups represented, for example, by formulae (ii-1.1) to (ii-1.3).

Chemical Formula 14

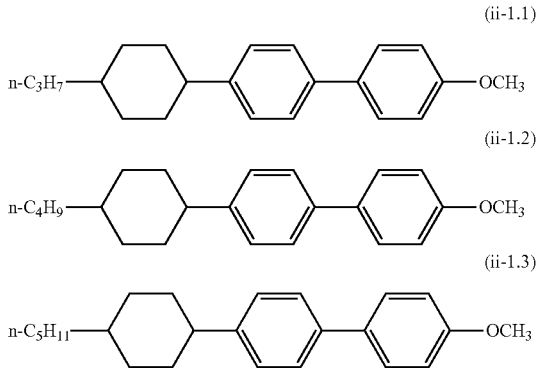

The compounds to be combined are not in particular limited, and one to two kinds can be combined in consideration of solubility at a low temperature, transition temperature, electric reliability, and birefringence rate.

As to the content of the compound represented by formula (ii-1), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound 4-20 mass % in one embodiment of the present invention. It can be 5-15 mass % in another embodiment. It can be 5-13 mass % in yet another embodiment. It can be 7-12 mass % in further another embodiment.

Also, for example, one embodiment of the present invention can include the compound at a content of 1-12 mass % with respect to the total mass of the liquid crystal composition of the present invention. Another embodiment can include at a content of 1-10 mass %. Yet another embodiment can include at a content of 2-7 mass %. Other embodiment can include at a content of 3-5 mass %.

In one embodiment of the present invention, with respect to the total mass of the liquid crystal composition of the present invention, the content of the compound represented by formula (ii-1.1) can be as follows. That is, the upper limit can be preferably 15 mass %, more preferably 13 mass %, yet more preferably 10 mass %, further preferably 8 mass %, yet further preferably 7 mass %. The lower limit can be preferably 0.5 mass %, more preferably 1 mass %, yet more preferably 3 mass %, and further preferably 5 mass %.

Specifically, as to the inclusion amount of the compound represented by formula (ii-1.1) with respect to total 100 mass % of the liquid crystal composition of the present invention, preferable is 1 mass % or more and 11 mass % or less, more preferable is 3 mass % or more and 9 mass % or less, yet more preferable is 4 mass % or more and 8 mass % or less, and further preferable is 5 mass % or more and 7 mass % or less.

In one embodiment of the present invention, the content of the compound represented by formula (ii-1.2) with respect to the total mass of the liquid crystal composition of the present invention can be as follows. That is, the upper limit can be preferably 15 mass %, more preferably 13 mass %, yet more preferably 10 mass %, further preferably 8 mass %, yet further preferably 7 mass %. The lower limit can be preferably 0.5 mass %, more preferably 1 mass %, yet more preferably 3 mass %, further preferably 5 mass %.

Specifically, as to the inclusion amount of the compound represented by formula (ii-1.2) with respect to total 100 mass % of the liquid crystal composition of the present invention, preferable is 1 mass % or more and 11 mass % or less, more preferable is 3 mass % or more and 9 mass % or less, yet more preferable is 4 mass % or more and 8 mass % or less, further preferable is 5 mass % or more and 7 mass % or less.

In one embodiment of the present invention, the content of the compound represented by formula (ii-1.3) with respect to the total mass of the liquid crystal composition of the present invention can be as follows. That is, the upper limit can be preferably 15 mass %, more preferably 13 mass %, yet more preferably 10 mass %, further preferably 8 mass %, and yet further preferably 7 mass %. The lower limit can be preferably 0.5 mass %, more preferably 1 mass %, yet more preferably 3 mass %, and further preferably 5 mass %.

Specifically, as to the inclusion amount of the compound represented by formula (ii-1.3) with respect to total 100 mass % of the liquid crystal composition of the present invention, preferable is 1 mass % or more and 11 mass % or less, more preferable is 3 mass % or more and 9 mass % or less, yet more preferable is 4 mass % or more and 8 mass % or less, and further preferable is 5 mass % or more and 7 mass % or less.

In addition, the liquid crystal composition of the present invention can include at least one kind of the compound represented by formula (L).

Chemical Formula 15:

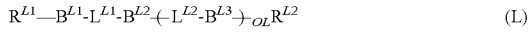

(L)

In the formula, each of $R^{L1}$ and $R^{L2}$ independently represents an alkyl group having a carbon atom number of 1-8, one of the alkyl groups, or two or more of the alkyl groups being noncontiguous, include —$CH_2$— which can be independently substituted by —CH═CH—, —C≡C—, —O—, —CO—, —COO— or —OCO—.

OL represents 0, 1, 2 or 3.

Each of $B^{L1}$, $B^{L2}$ and $B^{L3}$ independently represents a group selected from the group consisting of (a) and (b) below;
(a): 1,4-cyclohexylene group (in which one of —$CH_2$— groups or noncontiguous two of —$CH_2$— groups can be substituted with —O—); and
(b) 1,4-phenylene group (in which one of —CH═ groups or noncontiguous two of —CH═ groups can be substituted with —N═). Here, each of one or two or more hydrogen atoms in the groups (a) and (b) can be independently substituted by cyano group, fluorine atom or chlorine atom.

Each of $L^{L1}$ and $L^{L2}$ independently represents single bond, —$CH_2CH_2$—, —$(CH_2)_4$—, —$OCH_2$—, —$CH_2O$—, —COO—, —OCO—, —$OCF_2$—, —$CF_2O$—, —CH═N—N═CH—, —CH═CH—, —CF═CF— or —C≡C—.

When OL is 2 or 3 so that plural groups of $L^{L2}$ exist, said plural groups of $L^{L2}$ can be the same or different, and when OL is 2 or 3 so that plural groups of $B^{L3}$ exist, said plural groups of $B^{L3}$ can be the same or different.

The kinds of the compounds to be combined are not in particular limited, and can be appropriately used in accordance with the desired performances such as solubility at a low temperature, transition temperature, electric reliability, and birefringence rate.

For example, as the kinds of the compound to use, one embodiment of the present invention can include a single kind.

Alternatively, another embodiment of the present invention can include two kinds.

Also, yet another embodiment of the present invention can include three kinds.

Furthermore, another embodiment of the present invention can include four kinds.

Furthermore, another embodiment of the present invention can include five kinds.

Furthermore, another embodiment of the present invention can include 6 kinds.

Furthermore, another embodiment of the present invention can include 7 kinds.

Furthermore, another embodiment of the present invention can include 8 kinds.

Furthermore, another embodiment of the present invention can include 9 kinds.

Furthermore, another embodiment of the present invention can include 10 or more kinds.

In liquid crystal composition of the present invention, the content of the compound represented by formula (L) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 1-95 mass % in one embodiment of the present invention. Alternatively, the content above can be 10-95 mass % in a different embodiment of the present invention. Also, the content above can be 20-95 mass % in another different embodiment of the present invention. Furthermore, the content above can be 30-95 mass % in a different embodiment of the present invention. Furthermore, the content above can be 40-95 mass % in a different embodiment of the present invention. Furthermore, the content above can be 50-95 mass % in a different embodiment of the present invention. Furthermore, the content above can be 55-95 mass % in a different embodiment of the present invention. Furthermore, the content above can be 60-95 mass % in a different embodiment of the present invention. Furthermore, the content above can be 65-95 mass % in a different embodiment of the present invention. Furthermore, the content above can be 70-95 mass % in a different embodiment of the present invention. Furthermore, the content above can be 75-95 mass % in a different embodiment of the present invention. Furthermore, the content above can be 80-95 mass % in a different embodiment of the present invention.

Furthermore, with respect to the total mass of the liquid crystal composition of the present invention, the content of the compound can be e.g., 1-95% in one embodiment of the present invention. Also, the content above can be 1-85% in a different embodiment of the present invention. Furthermore, the content above can be 1-75% in another different embodiment of the present invention. Furthermore, the content above can be 1-65% in another different embodiment of the present invention. Furthermore, the content above can be 1-55% in another different embodiment of the present invention. Furthermore, the content above can be 1-45% in another different embodiment of the present invention. Furthermore, the content above can be 1-35% in another different embodiment of the present invention. Furthermore, the content above can be 1-25% in another different embodiment of the present invention.

In order to maintain a low viscosity of the liquid crystal composition of the present invention as well as to accomplish a fast response of the liquid crystal composition, it is favorable that the lower limit and the upper limit are kept high. Furthermore, in order to maintain high Tni of the liquid crystal composition of the present invention as well as to make the liquid crystal composition have excellent temperature stability, it is favorable that the lower limit and the upper are kept high. Also, in order to increase the dielectric constant anisotropy to keep the drive voltage low, it is desirable that the upper limit and the lower limit are kept low.

$R^{L1}$ and $R^{L2}$, when the ring structure to which it combines is a phenyl group (aromatic group), are preferably a linear alkyl group having a carbon atom number of 1-5, a linear alkoxy group having a carbon atom number of 1-4 (or more), and an alkenyl group having a carbon atom number 4-5. $R^{L1}$ and $R^{L2}$, when the ring structure to which it combines is saturated structure such as cyclohexane, pyran and dioxane, can be preferably a linear alkyl group having a carbon atom number of 1-5, a linear alkoxy group having a carbon atom number of 1-4 (or more), and a liner alkenyl group having a carbon atom number of 2-5.

It is preferably that the compound represented by formula (L) does not include chlorine atom in its molecule when the liquid crystal composition is demanded to be chemically stable. Preferably, the compound represented in formula (L) can be, for example, selected from the compounds represented by formula (I).

Chemical Formula 16:

$$R^{11}\text{-}A^{11}\text{-}A^{12}\text{-}R^{12} \qquad (I)$$

In the formula, each of $R^{11}$ and $R^{12}$ independently represents an alkyl group having a carbon atom number of 1-5, an alkoxy group having a carbon atom number of 1-5, or an alkenyl group having a carbon atom number of 2-5; and each of $A^{11}$ and $A^{12}$ independently represents 1,4-cyclohexylene group, 1,4-phenylene group, 2-fluoro-1,4-phenylene group, or 3-fluoro-1,4-phenylene group.

The kinds of the compounds to be combined are not in particular limited, and can be appropriately used in accordance with the demanded performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Also, yet another embodiment of the present invention can include three kinds. Furthermore, another embodiment of the present invention can include four kinds. Furthermore, another embodiment of the present invention can include five kinds. Furthermore, another embodiment of the present invention can include six or more kinds.

In the liquid crystal composition of the present invention, the content of the compound represented by formula (I) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 3-75 mass % in one embodiment of the present invention. Alternatively, the content above can be 15-75 mass % in a different embodiment of the present invention. Also, the content above can be 18-75 mass % in another different embodiment of the present invention. Furthermore, the content above can be 20-75 mass % in a different embodiment of the present invention. Furthermore, the content above can be 29-75 mass % in a different embodiment of the present invention. Furthermore, the content above can be 35-75 mass % in a different embodiment of the present invention. Furthermore, the content above can be 42-75 mass % in a different embodiment of the present invention. Furthermore, the content above can be 47-75 mass % in a different embodiment of the present invention. Furthermore, the content above can be 53-75 mass % in a different embodiment of the present invention. Furthermore, the content above can be 56-75 mass % in a different embodiment of the present invention. Furthermore, the content above can be 60-75 mass % in a different embodiment of the present invention. Furthermore, the content above can be 65-75 mass % in a different embodiment of the present invention.

Furthermore, for example, with respect to the total mass of the liquid crystal composition of the present invention, the content above can be 3-75 mass % in one embodiment of the present invention. Also, the content above can be 3-65 mass % in another different embodiment of the present invention. Furthermore, the content above can be 3-55 mass % in a different embodiment of the present invention. Furthermore, the content above can be 3-50 mass % in a different embodiment of the present invention. Furthermore, the content above can be 3-45 mass % in a different embodiment of the present invention. Furthermore, the content above can be 3-40 mass % in a different embodiment of the present invention. Furthermore, the content above can be 3-35 mass % in a different embodiment of the present invention. Furthermore, the content above can be 3-30 mass % in a different embodiment of the present invention.

In order to maintain a low viscosity of the liquid crystal composition of the present invention as well as to accomplish a fast response of the liquid crystal composition, it is favorable that the lower limit and the upper are kept high. Furthermore, in order to maintain high Tni of the liquid crystal composition of the present invention as well as to make the liquid crystal composition have excellent temperature stability, it is favorable that a lower limit and the upper limit are middling. Also, in order to increase the dielectric constant anisotropy to keep the drive voltage low, it is desirable that the upper limit and the lower limit are kept low.

Furthermore, it is preferably that the compound represented by formula (I) can be selected from the compounds represented by formula (I-1).

Chemical Formula 17

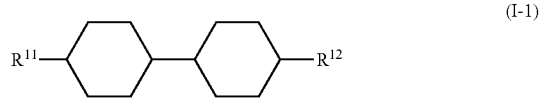

(I-1)

In the formula, each of $R^{11}$ and $R^{12}$ independently represents an alkyl group having a carbon atom number of 1-5, an alkoxy group having a carbon atom number of 1-5, or an alkenyl group having a carbon atom number of 2-5. The kinds of the compounds to be combined are not in particular limited, and can be appropriately used in accordance with the demanded performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Also, yet another embodiment of the present invention can include three kinds. Furthermore, another embodiment of the present invention can include four kinds. Furthermore, another embodiment of the present invention can include five or more kinds.

In the liquid crystal composition of the present invention, the content of the compound represented by formula (I-1) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be, for example, 3-70 mass % in one embodiment of the present invention. Alternatively, the content above can be 15-70 mass % in a different embodiment of the present invention. Also, the content above can be 18-70 mass % in another different embodiment of the present invention. Furthermore, the content above can be 25-70 mass % in a different embodiment of the present invention. Furthermore, the content above can be 29-70 mass % in a different embodiment of the present invention. Furthermore, the content above can be 31-70 mass % in a different embodiment of the present invention. Furthermore, the content above can be 35-70 mass % in a different embodiment of the present invention. Furthermore, the content above can be 43-70 mass % in a different embodiment of the present invention. Furthermore, the content above can be 47-70 mass % in a different embodiment of the present invention. Furthermore, the content above can be 50-70 mass % in a different embodiment of the present invention. Furthermore, the content above can be 53-70 mass % in a different embodiment of the present invention. Furthermore, the content above can be 56-70 mass % in a different embodiment of the present invention.

With respect to the total mass of the liquid crystal composition of the present invention, the content of the compound can be, for example, 3-70 mass % in one embodiment of the present invention. Also, the content above can be 3-60 mass % in another different embodiment of the present invention. Furthermore, the content above can be 3-50 mass % in a different embodiment of the present invention. Furthermore, the content above can be 3-45 mass % in a different embodiment of the present invention. Furthermore, the content above can be 3-40 mass % in a different embodiment of the present invention. Furthermore, the content above can be 3-35 mass % in a different embodiment of the present invention. Furthermore, the content above can be 3-30 mass % in a different embodiment of the present invention. Furthermore, the content above can be 3-26 mass % in a different embodiment of the present invention.

In order to maintain a low viscosity of the liquid crystal composition of the present invention as well as to accomplish a fast response of the liquid crystal composition, it is favorable that the lower limit and the upper are kept high. Furthermore, in order to maintain high Tni of the liquid crystal composition of the present invention as well as to make the liquid crystal composition have excellent temperature stability, it is favorable that a lower limit and the upper limit are middling. Also, in order to increase the dielectric constant anisotropy to keep the drive voltage low, it is desirable that the upper limit and the lower limit are kept low.

Furthermore, it is preferably that the compound represented by formula (I-1) can be selected from the compounds represented by formula (I-1-1).

Chemical Formula 18

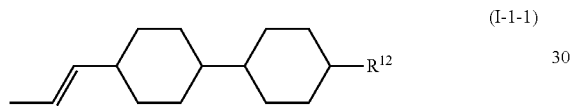

(I-1-1)

In the formula, $R^{12}$ independently represents an alkyl group having a carbon atom number of 1-5, an alkenyl group having a carbon atom number of 2-5 or an alkoxy group having a carbon atom number of 1-5.

In the liquid crystal composition of the present invention, the content of the compound represented by formula (I-1-1) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 2-60 mass % in one embodiment of the present invention. Alternatively, the content above can be 4-60 mass % in a different embodiment of the present invention. Also, the content above can be 7-60 mass % in another different embodiment of the present invention. Furthermore, the content above can be 11-60 mass % in a different embodiment of the present invention. Furthermore, the content above can be 13-60 mass % in a different embodiment of the present invention. Furthermore, the content above can be 15-60 mass % in a different embodiment of the present invention. Furthermore, the content above can be 17-60 mass % in a different embodiment of the present invention. Furthermore, the content above can be 20-60 mass % in a different embodiment of the present invention. Furthermore, the content above can be 25-60 mass % in a different embodiment of the present invention. Furthermore, the content above can be 30-60 mass % in a different embodiment of the present invention. Furthermore, the content above can be 32-60 mass % in a different embodiment of the present invention. Furthermore, the content above can be 35-60 mass % in a different embodiment of the present invention.

With respect to the total mass of the liquid crystal composition of the present invention, the content of the compound can be, for example, 2-60 mass % in one embodiment of the present invention. Also, the content above can be 2-50 mass % in another different embodiment of the present invention. Furthermore, the content above can be 2-40 mass % in another embodiment of the present invention. Furthermore, the content above can be 2-35 mass % in a different embodiment of the present invention. Furthermore, the content above can be 2-30 mass % in a different embodiment of the present invention. Furthermore, the content above can be 2-25 mass % in a different embodiment of the present invention. Furthermore, the content above can be 2-20 mass % in a different embodiment of the present invention. Furthermore, the content above can be 2-15 mass % in a different embodiment of the present invention.

Furthermore, it is preferable that the compound represented by formula (I-1-1) is selected from the compounds represented by formulae (1.1) to (1.3); and in particular, it is preferable to be the compound represented by formula (1.2) or formula (1.3); and more in particular, it is preferable to be the compound represented by formula (1.3).

Chemical Formula 19

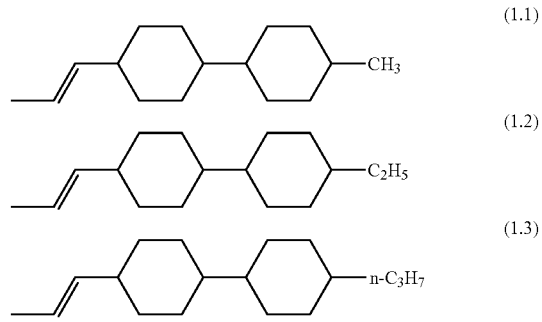

(1.1)

(1.2)

(1.3)

When the compound represented by formula (1.2) or formula (1.3) is used alone, it is effective to improve the response speed when the content of the compound represented by formula (1.2) is high. The content of the compound represented by formula (1.3) can be preferably within the range below, thereby obtaining a liquid crystal composition having a high response speed and being reliable in view of electrical and optical points.

The compound represented by formula (1.3) with respect to the total mass of the liquid crystal composition of the present invention can be preferably included at 3-35 mass %, and more preferably at 4-25 mass %, and yet more preferably at 5-15 mass %, or less.

Furthermore, it is preferably that the compound represented by formula (I-1) can be selected from the compounds represented by formula (I-1-2).

Chemical Formula 20

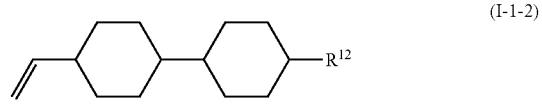

(I-1-2)

In the formula, $R^{12}$ independently represents an alkyl group having a carbon atom number of 1-5, an alkoxy group having a carbon atom number of 1-5 or an alkenyl group having a carbon atom number of 2-5.

The kinds of the compounds to be combined are not in particular limited, and can be appropriately used in accordance with the demanded performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Also, yet another embodiment of the present invention can include three kinds.

In the liquid crystal composition of the present invention, the content of the compound represented by formula (I-1-2) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 7-60 mass % in one embodiment of the present invention. Alternatively, the content above can be 15-60 mass % in a different embodiment of the present invention. Also, the content above can be 18-60 mass % in another different embodiment of the present invention. Furthermore, the content above can be 21-60 mass % in a different embodiment of the present invention. Furthermore, the content above can be 24-60 mass % in a different embodiment of the present invention. Furthermore, the content above can be 27-60 mass % in a different embodiment of the present invention. Furthermore, the content above can be 30-60 mass % in a different embodiment of the present invention. Furthermore, the content above can be 34-60 mass % in a different embodiment of the present invention. Furthermore, the content above can be 37-60 mass % in a different embodiment of the present invention. Furthermore, the content above can be 41-60 mass % in a different embodiment of the present invention. Furthermore, the content above can be 47-60 mass % in a different embodiment of the present invention. Furthermore, the content above can be 50-60 mass % in a different embodiment of the present invention.

Furthermore, with respect to the total mass of the liquid crystal composition of the present invention, the content of the compound is, for example, 7-60 mass % in one embodiment of the present invention. Also, the content above can be 7-55 mass % in another different embodiment of the present invention. Furthermore, the content above can be 7-45 mass % in a different embodiment of the present invention. Furthermore, the content above can be 7-40 mass % in a different embodiment of the present invention. Furthermore, the content above can be 7-35 mass % in a different embodiment of the present invention. Furthermore, the content above can be 7-30 mass % in a different embodiment of the present invention. Furthermore, the content above can be 7-25 mass % in a different embodiment of the present invention. Furthermore, the content above can be 7-20 mass % in a different embodiment of the present invention.

Furthermore, it is preferable that the compound represented by formula (I-1-2) is selected from the compounds represented by formulae (2.1) to (2.4), and also, it is preferable to be the compound represented by formula (2.2) to formula (2.4). Particularly, the compound represented by formula (2.2) is preferable in view of specifically improving the response speed of the liquid crystal composition of the present invention. Also, when demanding a higher value of Tni than the response speed, it is preferable to use the compound represented by formula (2.3) or formula (2.4). It might be not favorable to include the compound represented by formula (2.3) and formula (2.4) at a content more than 20% in order to make better the solubility at a low temperature.

Chemical Formula 21

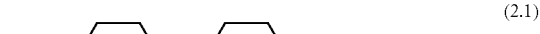

(2.1)

(2.2)

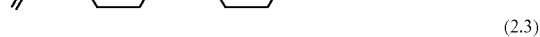

(2.3)

(2.4)

In the liquid crystal composition of the present invention, the content of the compound represented by formula (2.4) can be preferably 5-55 mass % with respect to the total mass of the liquid crystal composition of the present invention. The more preferable example of the content can include 5-40 mass %.

The liquid crystal composition of the present invention can further include the compound represented by formula (2.5), which has a structure similar to the compound represented by formula (I-1-2).

Chemical Formula 22

(2.5)

The content of the compound represented by formula (2.5) can be preferably adjusted in accordance with the demanded performances such as solubility at a low temperature, transition temperature, electric reliability, and birefringent rate. With respect to the total mass of the liquid crystal composition of the present invention, the compound can be preferably included at 11 mass % or more, and more preferably at 15 mass %, and yet more preferably at 23 mass %, and further preferably at 26 mass % or more, and furthermore preferably at 28 mass % or more.

Furthermore, it is preferably that the compound represented by formula (I) can be selected from the compounds represented by formula (I-2).

Chemical Formula 23

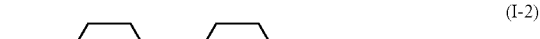

(I-2)

In the formula, each of $R^{13}$ and $R^{14}$ independently represents an alkyl group having a carbon atom number of 1-5.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds. Also, yet another embodiment of the present invention can include three kinds.

In the liquid crystal composition of the present invention, the content of the compound represented by formula (I-2) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 3-60 mass % in one embodiment of the present invention. Alternatively, the content above can be 4-60 mass % in a different embodiment of the present invention. Also, the content above can be 15-60 mass % in another different embodiment of the present invention. Furthermore, the content above can be 25-60 mass % in a different embodiment of the present invention. Furthermore, the content above can be 30-60 mass % in a different embodiment of the present invention. Furthermore, the content above can be 35-60 mass % in a different embodiment of the present invention. Furthermore, the content above can be 38-60 mass % in a different embodiment of the present invention. Furthermore, the content above can be 40-60 mass % in a different embodiment of the present invention. Furthermore, the content above can be 42-60 mass % in a different embodiment of the present invention. Furthermore, the content above can be 45-60 mass % in a different embodiment of the present invention. Furthermore, the content above can be 47-60 mass % in a different embodiment of the present invention. Furthermore, the content above can be 50-60 mass % in a different embodiment of the present invention.

Furthermore, with respect to the total mass of the liquid crystal composition of the present invention, the content of the compound can be e.g., 3-60 mass % in one embodiment of the present invention. Also, the content above can be 3-55 mass % in another different embodiment of the present invention. Furthermore, the content above can be 3-45 mass % in a different embodiment of the present invention. Furthermore, the content above can be 3-40 mass % in a different embodiment of the present invention. Furthermore, the content above can be 3-30 mass % in a different embodiment of the present invention. Furthermore, the content above can be 3-20 mass % in a different embodiment of the present invention. Furthermore, the content above can be 3-15 mass % in a different embodiment of the present invention. Furthermore, the content above can be 3-5 mass % in a different embodiment of the present invention.

Furthermore, it is preferable that the compound represented by formula (I-2) is selected from the compounds represented by formula (3.1) to formula (3.4). In particular, it is preferable favorable to be the compound represented by formula (3.1), formula (3.3) or formula (3.4). Specifically, the compound represented by formula (3.2) is preferable to improve the response speed of the liquid crystal composition of the present invention in particular. Also, when demanding a higher value of Tni than the response speed, it is preferable to use the compound represented by formula (3.3) or formula (3.4). It might be not favorable to include the compound represented by formula (3.3) and formula (3.4) at a content more than 20% in order to make better the solubility at a low temperature.

Furthermore, it is preferable that the compound represented by formula (I-2) is selected from the compounds represented by formula (3.1) to formula (3.4). It is preferable to be the compound represented by formula (3.1), formula (3.3) and/or formula (3.4).

Chemical Formula 24

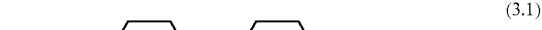
(3.1)

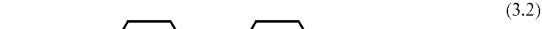
(3.2)

(3.3)

(3.4)

In the liquid crystal composition of the present invention, the content of the compound represented by formula (3.3) can be preferably 2-40 mass % with respect to the total mass of the liquid crystal composition of the present invention. For example, more preferable content includes 3-40 mass % and 4-40 mass %, or 3-5 mass %, 3-10 mass %, 3-12 mass %, 3-14 mass %, 3-16 mass %, 3-20 mass %, 3-23 mass %, 3-26 mass %, 3-30 mass %, 3-34 mass % and 3-37 mass %.

Furthermore, it is preferably that the compound represented by formula (I) can be selected from the compounds represented by formula (I-3).

Chemical Formula 25

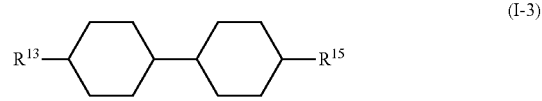
(I-3)

In the formula, $R^{13}$ represents an alkyl group having a carbon atom number of 1-5, and $R^{15}$ represents an alkoxy group having a carbon atom number of 1-4.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds. Also, yet another embodiment of the present invention can include three kinds.

In the liquid crystal composition of the present invention, the content of the compound represented by formula (I-3) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 3 mass % in one embodiment of the present invention. Alternatively, the content above can be 4-60 mass % in a different embodiment of the present invention. Also, the content above can be 15-60 mass % in another different embodiment of the present invention. Furthermore, the content above can be 25-60 mass % in a different embodiment of the present invention. Furthermore, the content above can be 30-60 mass % in a different embodiment of the present invention. Furthermore, the content above can be 35-60 mass % in a different embodiment of the present invention. Furthermore, the content above can be 38-60 mass % in a different embodiment of the present invention. Furthermore, the content above can be 40-60 mass % in a different embodiment of the present invention. Furthermore, the content above can be 42-60 mass % in a different embodiment of the present invention. Furthermore, the content above can be 45-60 mass % in a different embodiment of the present invention. Furthermore, the content above can be 47-60 mass % in a different embodiment of the present invention. Furthermore, the content above can be 50-60 mass % in a different embodiment of the present invention.

Furthermore, with respect to the total mass of the liquid crystal composition of the present invention, the content of the compound can be, for example, 3-60 mass % in one embodiment of the present invention. Also, the content above can be 3-55 mass % in another different embodiment of the present invention. Furthermore, the content above can be 3-45 mass % in a different embodiment of the present invention. Furthermore, the content above can be 3-40 mass % in a different embodiment of the present invention. Furthermore, the content above can be 3-30 mass % in a different embodiment of the present invention. Furthermore, the content above can be 3-20 mass % in a different embodiment of the present invention. Furthermore, the content above can be 3-15 mass % in a different embodiment of the present invention. Furthermore, the content above can be 3-5 mass % in a different embodiment of the present invention.

When considering the weight on the solubility at a low temperature, it is effective to set the content at a relatively large amount, and on the other hand, when considering the weight on the response speed, it is effective to set the content at a relatively small amount. Furthermore, in order to improve the characteristics of drip trace and ghosting, it is preferable to set the content at a middling range.

Furthermore, it is preferable that the compound represented by formula (I-3) is selected from the compounds represented by formula (4.1) to formula (4.3), and in particular, it is preferable to be the compound represented by formula (4.3).

Chemical Formula 26

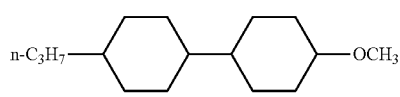

(4.1)

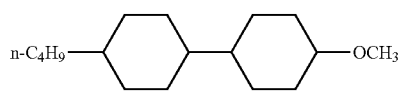

(4.2)

-continued

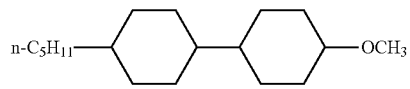

(4.3)

With respect to the total mass of the liquid crystal composition of the present invention, the compound represented by formula (4.3) is preferably included at a content of 2-30 mass %, and in particular, at 4-30 mass %; and still in particular, preferably at 6-30 mass %; and still in particular, preferably at 8-30 mass %; and still in particular, preferably at 10-30 mass %; and still in particular, preferably at 12-30 mass %; and still in particular, preferably at 14-30 mass % and still in particular, preferably at 16-30 mass %; and still in particular, preferably at 18-25 mass %; and still in particular, preferably at 20-24 mass %; and still in particular, preferably at 22-23 mass %.

Furthermore, it is preferably that the compound represented by formula (I) can be selected from the compounds represented by formula (I-4).

Chemical Formula 27

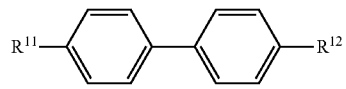

(I-4)

In the formula, each of $R^{11}$ and $R^{12}$ independently represents an alkyl group having a carbon atom number of 1-5, an alkenyl group having a carbon atom number of 4-5 or an alkoxy group having a carbon atom number of 1-4.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds.

In the liquid crystal composition of the present invention, the content of the compound represented by formula (I-4) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 3-50 mass % in one embodiment of the present invention. Alternatively, the content above can be 5-50 mass % in a different embodiment of the present invention. Also, the content above can be 6-50 mass % in another different embodiment of the present invention. Furthermore, the content above can be 8-50 mass % in a different embodiment of the present invention. Furthermore, the content above can be 10-50 mass % in a different embodiment of the present invention. Furthermore, the content above can be 12-50 mass % in a different embodiment of the present invention. Furthermore, the content above can be 15-50 mass % in a different embodiment of the present invention. Furthermore, the content above can be 20-50 mass % in a different embodiment of the present invention. Furthermore, the content above can be 25-50 mass % in a different embodiment of the present invention. Furthermore, the content above can be 30-50 mass % in a different embodiment of the present invention. Furthermore, the content above can be 35-50 mass % in a different embodiment of the present invention. Furthermore, the content above can be 40-50 mass % in a different embodiment of the present invention.

Furthermore, with respect to the total mass of the liquid crystal composition of the present invention, the content of the compound can be, for example, 3-50 mass % in one embodiment of the present invention. Also, the content above can be 3-40 mass % in another different embodiment of the present invention. Furthermore, the content above can be 3-35 mass % in a different embodiment of the present invention. Furthermore, the content above can be 3-30 mass % in a different embodiment of the present invention. Furthermore, the content above can be 3-20 mass % in a different embodiment of the present invention. Furthermore, the content above can be 3-15 mass % in a different embodiment of the present invention. Furthermore, the content above can be 3-10 mass % in a different embodiment of the present invention. Furthermore, the content above can be 3-5 mass % in a different embodiment of the present invention.

In order to accomplish a high birefringent rate, it is effective to set the content at a relatively large amount. On the other hand, when considering the weight on a high value of Tni, it is effective to set the content at a relatively small amount. Further, in order to improve the characteristics of drip trace and ghosting, it is preferable to set the content at a middling range.

Furthermore, it is preferable that the compound represented by formula (I-4) is selected from the compounds represented by formula (5.1) to formula (5.4).
In particular, it is preferable to be the compound represented by formula (5.2) to formula (5.4).

Chemical Formula 28

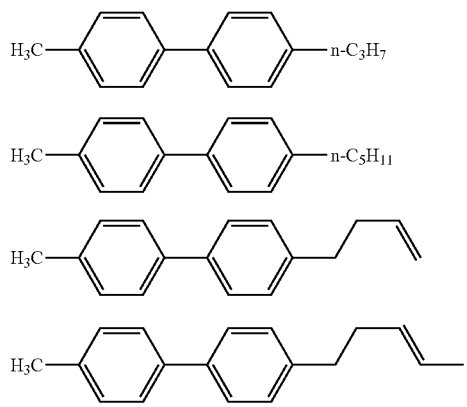

With respect to the total mass of the liquid crystal composition of the present invention, the compound represented by formula (5.4) is preferably included at a content of 2-30 mass %. More preferable content can include, for example, 4-30 mass %, 6-30 mass %, 8-30 mass %, 10-30 mass %, 12-30 mass %, 14-30 mass %, 16-30 mass %, 18-30 mass %, 20-30 mass %, 22-30 mass %, 23-30 mass %, 24-30 mass %, and 25-30 mass %, or 4-6 mass %, 4-8 mass %, 4-10 mass %, 4-12 mass %, 4-14 mass %, 4-16 mass %, 4-18 mass %, 4-20 mass %, 4-22 mass %, 4-23 mass %, 4-24 mass % and 4-25 mass %.

Furthermore, it is preferably that the compound represented by formula (I) can be selected from the compounds represented by formula (I-5).

Chemical Formula 29

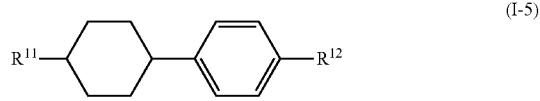

In the formula, each of $R^{11}$ and $R^{12}$ independently represents an alkyl group having a carbon atom number of 1-5 an alkenyl group having a carbon atom number of 2-5 or an alkoxy group having a carbon atom number of 1-4.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds.

In the liquid crystal composition of the present invention, the content of the compound represented by formula (I-5) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 1-50 mass % in one embodiment of the present invention. Alternatively, the content above can be 5-50 mass % in a different embodiment of the present invention. Also, the content above can be 8-50 mass % in another different embodiment of the present invention. Furthermore, the content above can be 11-50 mass % in a different embodiment of the present invention. Furthermore, the content above can be 13-50 mass % in a different embodiment of the present invention. Furthermore, the content above can be 15-50 mass % in a different embodiment of the present invention. Furthermore, the content above can be 17-50 mass % in a different embodiment of the present invention. Furthermore, the content above can be 20-50 mass % in a different embodiment of the present invention. Furthermore, the content above can be 25-50 mass % in a different embodiment of the present invention. Furthermore, the content above can be 30-50 mass % in a different embodiment of the present invention. Furthermore, the content above can be 35-50 mass % in a different embodiment of the present invention. Furthermore, the content above can be 40-50 mass % in a different embodiment of the present invention.

Furthermore, with respect to the total mass of the liquid crystal composition of the present invention, the content of the compound can be e.g., 1-50% in one embodiment of the present invention. Also, the content above can be 1-40% in another embodiment of the present invention. Furthermore, the content above can be 1-35% in another different embodiment of the present invention. Furthermore, the content above can be 1-30% in another different embodiment of the present invention. Furthermore, the content above can be 1-20% in another different embodiment of the present invention. Furthermore, the content above can be 1-15% in another different embodiment of the present invention. Furthermore, the content above can be 1-10% in another different embodiment of the present invention. Furthermore, the content above can be 1-5% in another different embodiment of the present invention.

When considering the weight on the solubility at a low temperature, it is effective to set the content at a relatively large amount, and on the other hand, when considering the weight on the response speed, it is effective to set the content at a relatively small amount. Furthermore, in order to improve the characteristics of drip trace and ghosting, it is preferable to set the content at a middling range.

Furthermore, it is preferable that the compound represented by formula (I-5) is selected from the compounds represented by formula (6.1) to formula (6.6). In particular, it is preferable to be the compound represented by formula (6.3), formula (6.4) and formula (6.6).

Chemical Formula 30

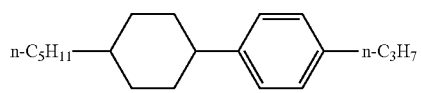

(6.1)

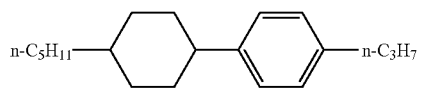

(6.1)

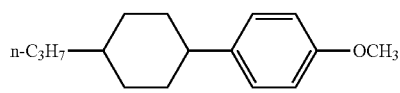

(6.3)

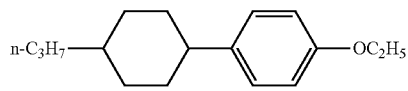

(6.4)

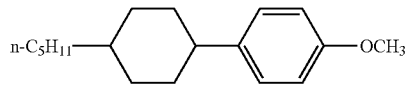

(6.5)

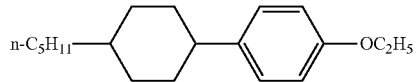

(6.6)

For example, with respect to the total mass of the liquid crystal composition of the present invention, the content of the compound represented by formula (6.3) is preferably at a content of 2-30 mass %, or less; and more preferably at 4-30 mass %; and still more preferably at 5-30 mass %; and still more preferably at 6-30 mass %; and still more preferably at 9-30 mass %; and still more preferably at 10-30 mass %.

The liquid crystal composition of the present invention can further include the compound represented by formula (6.7) to formula (6.9).

Chemical Formula 31

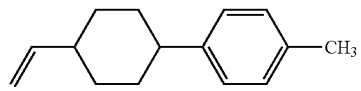

(6.7)

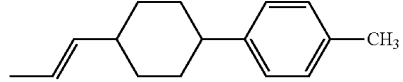

(6.8)

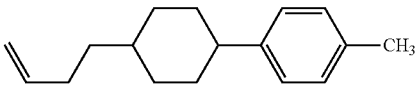

(6.9)

The content of the compound represented by formula (6.7) to formula (6.9) can be preferably adjusted in accordance with the demanded performances such as solubility at a low temperature, transition temperature, electric reliability, and birefringent rate. With respect to the total mass of the liquid crystal composition of the present invention, the compound can be preferably included at 2 mass % or more. In particular, it can include preferably at 3 mass % or more; and still more preferably at 4 mass % or more; and still more preferably at 5 mass % or more; and still more preferably at 7 mass % or more.

Furthermore, it is preferably that the compound represented by formula (I) can be selected from the compounds represented by formula (I-6).

Chemical Formula 32

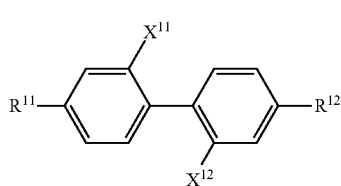

(I-6)

In the formula, each of $R^{11}$ and $R^{12}$ independently represents an alkyl group having a carbon atom number of 1-5, an alkenyl group having a carbon atom number of 4-5 or an alkoxy group having a carbon atom number of 1-4; each of $X^{11}$ and $X^{12}$ independently represents fluorine atom or hydrogen atom; and either $X^{11}$ or $X^{12}$ is fluorine atom.

With respect to the total mass of the liquid crystal composition of the present invention, the compound represented by formula (I-6) is preferably included at a content of 2-30 mass %; and more preferably at 4-30 mass %; and still more preferably at 5-30 mass %; and still more preferably at 6-30 mass %; and still more preferably at 9-30 mass %; and still more preferably at 12-30 mass %; and still more preferably at 14-30 mass %; and still more preferably at 16-30 mass %; and still more preferably at 18-25 mass %; and still more preferably at 20-24 mass %; and specifically, still more preferably at 22-23 mass %.

Furthermore, it is preferable that the compound represented by formula (I-6) is a compound represented by formula (7.1).

Chemical Formula 33

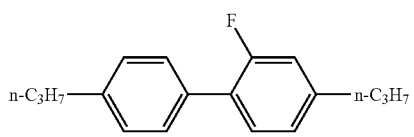

(7.1)

Furthermore, it is preferably that the compound represented by formula (I) can be selected from the compounds represented by formula (I-7).

Chemical Formula 34

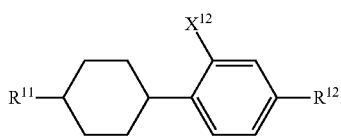
(I-7)

In the formula, each of $R^{11}$ and $R^{12}$ independently represents an alkyl group having a carbon atom number of 1-5, an alkenyl group having a carbon atom number of 2-5 or an alkoxy group having a carbon atom number of 1-4; and $X^{12}$ represents fluorine atom or chlorine atom.

With respect to the total mass of the liquid crystal composition of the present invention, the compound represented by formula (I-7) is preferably included at a content of 1-30 mass %; and still more preferably at 2-30 mass %; and still more preferably at 3-30 mass %; and still more preferably at 4-30 mass %; and still more preferably at 6-30 mass %; and still more preferably at 8-30 mass %; and still more preferably at 10-30 mass %; and still more preferably at 12-30 mass %; and still more preferably at 15-25 mass %; and still more preferably at 18-24 mass %; and specifically, still more preferably at 21-22 mass %.

Furthermore, it is preferable that the compound represented by formula (I-7) is a compound represented by formula (8.1).

Chemical Formula 35

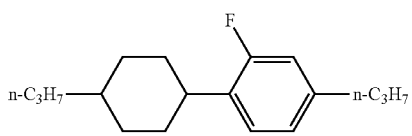
(8.1)

Furthermore, it is preferably that the compound represented by formula (I) can be selected from the compounds represented by formula (I-8).

Chemical Formula 36

(I-8)

In the formula, each of $R^{16}$ and $R^{17}$ independently represents an alkenyl group having a carbon atom number of 2-5.

The kinds of the compounds to be combined are not in particular limited, and one to three kinds can preferably be combined in accordance with the demanded performances such as solubility at a low temperature, transition temperature, electric reliability, and birefringence rate.

Depending on the demanded performances such as solubility at a low temperature, transition temperature, electric reliability, birefringent rate, process compatibility, drip trace, ghosting and dielectric constant anisotropy, the content of the compound represented by formula (I-8) with respect to the total mass of the liquid crystal composition of the present invention is preferably at 5-65 mass %. In particular, it is more preferably at 10-65 mass %; and still more preferably at 15-65 mass %; and still more preferably at 20-65 mass %; and still more preferably at 25-65 mass %; and still more preferably at 30-65 mass %; and still more preferably at 35-65 mass %; and still more preferably at 40-65 mass %; and still more preferably at 45-60 mass %; and still more preferably at 50-58 mass %; and specifically, still more preferably at 55-56 mass %.

Furthermore, it is preferable that the compound represented by formula (I-8) is selected from the compounds represented by formula (9.1) to formula (9.10). In particular, it is preferable to be the compound represented by formula (9.2), formula (9.4) and formula (9.7).

Chemical Formula 37

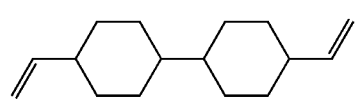
(9.1)

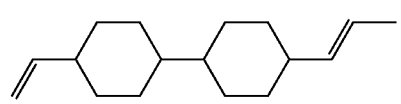
(9.2)

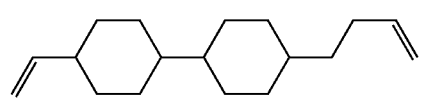
(9.3)

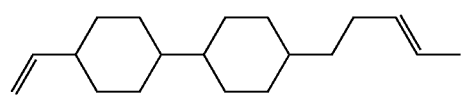
(9.4)

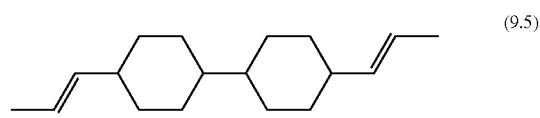
(9.5)

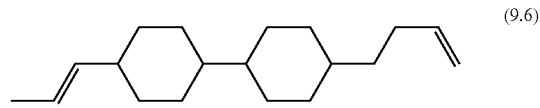
(9.6)

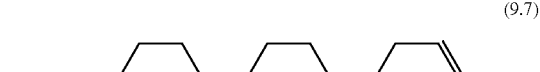
(9.7)

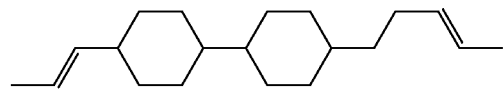
(9.8)

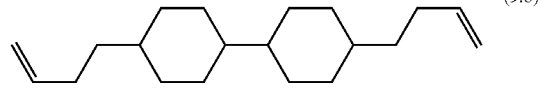
(9.9)

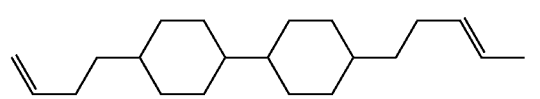
(9.10)

Furthermore, it is preferable that the compound represented by formula (L) is a compound selected from the compound represented by, for example, formula (II).

Chemical Formula 38

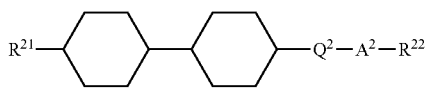
(II)

Each of $R^{21}$ and $R^{22}$ independently represents an alkenyl group having a carbon atom number of 2-5, or an alkyl group having a carbon atom number 1-5, or an alkoxy group having a carbon atom number 1-4; $A^2$ represents 1,4-cyclohexylene group or 1,4-phenylene group; and $Q^2$ represents a single bond, —COO—, —CH$_2$—CH$_2$— or —CF$_2$O—.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds. Also, yet another embodiment of the present invention can include three kinds. Furthermore, another embodiment of the present invention can include four or more kinds.

In the liquid crystal composition of the present invention, the content of the compound represented by formula (II) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 3-50 mass % in one embodiment of the present invention. Alternatively, the content above can be 5-50 mass % in a different embodiment of the present invention. Also, the content above can be 7-50 mass % in another different embodiment of the present invention. Furthermore, the content above can be 10-50 mass % in a different embodiment of the present invention. Furthermore, the content above can be 14-50 mass % in a different embodiment of the present invention. Furthermore, the content above can be 16-50 mass % in a different embodiment of the present invention. Furthermore, the content above can be 20-50 mass % in a different embodiment of the present invention. Furthermore, the content above can be 23-50 mass % in a different embodiment of the present invention. Furthermore, the content above can be 26-50 mass % in a different embodiment of the present invention. Furthermore, the content above can be 30-50 mass % in a different embodiment of the present invention. Furthermore, the content above can be 35-50 mass % in a different embodiment of the present invention. Furthermore, the content above can be 40-50 mass % in a different embodiment of the present invention.

Furthermore, with respect to the total mass of the liquid crystal composition of the present invention, the content of the compound can be e.g., 3-50 mass % in one embodiment of the present invention. Also, the content above can be 3-40 mass % in another different embodiment of the present invention. Furthermore, the content above can be 3-35 mass % in a different embodiment of the present invention. Furthermore, the content above can be 3-30 mass % in a different embodiment of the present invention. Furthermore, the content above can be 3-20 mass % in a different embodiment of the present invention. Furthermore, the content above can be 3-15 mass % in a different embodiment of the present invention. Furthermore, the content above can be 3-10 mass % in a different embodiment of the present invention. Furthermore, the content above can be 3-5 mass % in a different embodiment of the present invention.

Furthermore, it is preferable that the compound represented by formula (II) can be a compound selected from the compounds represented by formula (II-1).

Chemical Formula 39

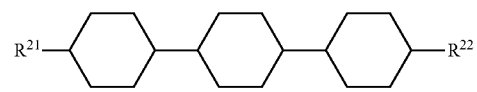
(II-1)

Each of $R^{21}$ and $R^{22}$ independently represents an alkenyl group having a carbon atom number of 2-5, or an alkyl group having a carbon atom number 1-5, or an alkoxy group having a carbon atom number 1-4.

The content of the compound represented by formula (II-1) is preferably adjusted depending on the demanded performances such as solubility at a low temperature, transition temperature, electric reliability, and birefringent rate. It is preferably 4-24 mass %; and more preferably 8-18 mass %; and yet more preferably 12-14 mass %.

Furthermore, it is preferable that the compound represented by formula (II-1) is a compound represented by, for example, formula (10.1) and formula (10.2).

Chemical Formula 40

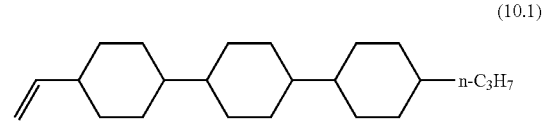
(10.1)

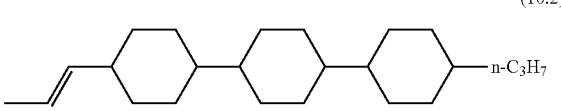
(10.2)

Furthermore, it is preferable that the compound represented by formula (II) can be a compound selected from the compounds represented by formula (II-2).

Chemical Formula 41

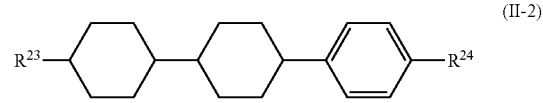
(II-2)

$R^{23}$ represents an alkenyl group having a carbon atom number of 2-5, and $R^{24}$ represents an alkyl group having a carbon atom number 1-5 or an alkoxy group having a carbon atom number 1-4.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds.

In the liquid crystal composition of the present invention, the content of the compound represented by formula (II-2) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 3-50 mass % in one embodiment of the present invention. Alternatively, the content above can be 5-50 mass % in a different embodiment of the present invention. Also, the content above can be 7-50 mass % in another different embodiment of the present invention. Furthermore, the content above can be 10-50 mass % in a different embodiment of the present invention. Furthermore, the content above can be 14-50 mass % in a different embodiment of the present invention. Furthermore, the content above can be 16-50 mass % in a different embodiment of the present invention. Furthermore, the content above can be 20-50 mass % in a different embodiment of the present invention. Furthermore, the content above can be 23-50 mass % in a different embodiment of the present invention. Furthermore, the content above can be 26-50 mass % in a different embodiment of the present invention. Furthermore, the content above can be 30-50 mass % in a different embodiment of the present invention. Furthermore, the content above can be 35-50 mass % in a different embodiment of the present invention. Furthermore, the content above can be 40-50 mass % in a different embodiment of the present invention.

Furthermore, with respect to the total mass of the liquid crystal composition of the present invention, the content of the compound can be e.g., 3-50 mass % in one embodiment of the present invention. Also, the content above can be 3-40 mass % in another different embodiment of the present invention. Furthermore, the content above can be 3-35 mass % in a different embodiment of the present invention. Furthermore, the content above can be 3-30 mass % in a different embodiment of the present invention. Furthermore, the content above can be 3-20 mass % in a different embodiment of the present invention. Furthermore, the content above can be 3-15 mass % in a different embodiment of the present invention. Furthermore, the content above can be 3-10 mass % in a different embodiment of the present invention. Furthermore, the content above can be 3-5 mass % in a different embodiment of the present invention.

Furthermore, it is preferable that the compound represented by formula (II-2) is a compound represented by, for example, formula (11.1) to formula (11.3).

Chemical Formula 42

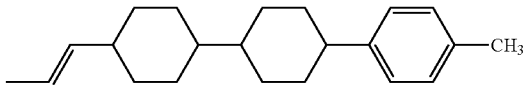

(11.1)

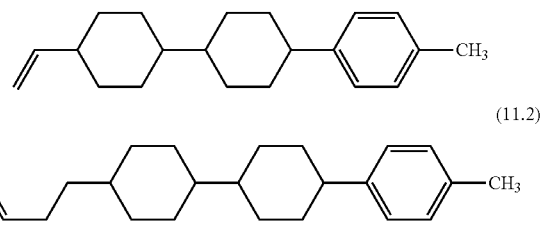

(11.2)

(11.3)

-continued

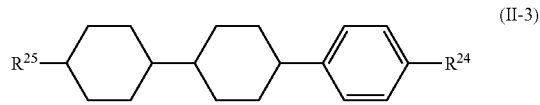

Depending on the demanded performances such as solubility at a low temperature, transition temperature, electric reliability, and birefringent rate, it is acceptable to include the compound represented by formula (11.1); or to include the compound represented by formula (11.2); or to include both of the compound represented by formula (11.1) and the compound represented by formula (11.2); or to include all of the compounds represented by formula (11.1) to formula (11.1). With respect to the total mass of the liquid crystal composition of the present invention, the compound represented by formula (11.1) or formula (11.2) is preferably included at a content of 3-40 mass %; and more preferably at 5-35 mass %; and still more preferably at 5-30 mass %; and still more preferably at 5-25 mass %; and most preferably at 5-20 mass %.

Also, with respect to the total mass of the liquid crystal composition of the present invention, the compound represented by formula (11.1) is preferably included at a content of 3-40 mass %; and more preferably at 3-35 mass %; furthermore preferably at 3-30 mass %; furthermore preferably at 3-25 mass %; particularly preferably at 3-20 mass %; and most preferably at 3-15 mass %. Among the most preferable ranges, the examples can include the ranges of e.g., 3-17 mass %, and 5-17 mass %.

When both of the compounds represented by formula (11.1) and formula (11.2), it is preferable that the total mass of both of the compounds is 5 mass % or more, and 45 mass % or lower, with respect to the total mass of the liquid crystal composition of the present invention. In particular, it is more preferably 5 mass % or more, and 40 mass % or lower; and further more preferably 5 mass % or more, and 35 mass % or lower; and specifically preferably 5 mass % or more, and 30 mass % or lower.

Furthermore, it is preferable that the compound represented by formula (II) can be a compound selected from the compounds represented by formula (II-3).

Chemical Formula 43

(II-3)

$R^{25}$ represents an alkyl group having a carbon atom number of 1-5, and $R^{24}$ represents an alkyl group having a carbon atom number 1-5 or an alkoxy group having a carbon atom number 1-4.

The kinds of the compound to be combined are not specifically limited, and one to three kinds of these compounds can be preferably included depending on the demanded performances such as solubility at a low temperature, transition temperature, electric reliability, and birefringence rate.

The content of the compound represented by formula (II-3) is required to be appropriately adjusted in accordance with the demanded performances such as solubility at a low temperature, transition temperature, electric reliability, birefringence rate, process compatibility, drip trace, and ghosting, dielectric constant anisotropy. For example, a preferable range of the content of the compound can include 2-45 mass % with respect to the total mass of the liquid crystal composition of the present invention. More preferable range of the content can include, for example, 5-45 mass %, 8-45 mass %, 11-45 mass %, 14-45 mass %, 17-45 mass %, 20-45 mass %, 23-45 mass %, 26-45 mass % and 29-45 mass %, or 2-45 mass %, 2-40 mass %, 2-35 mass %, 2-30 mass %, 2-25 mass %, 2-20 mass %, 2-15 mass % and 2-10 mass %.

Furthermore, it is preferable that the compound represented by formula (II-3) is a compound represented by, for example, formula (12.1) to formula (12.3).

Chemical Formula 44

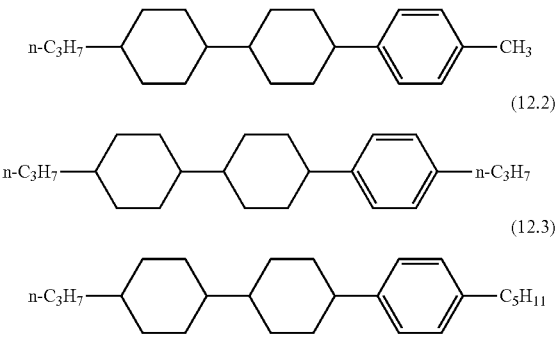

Depending on the demanded performances such as solubility at a low temperature, transition temperature, electric reliability, and birefringent rate, it is acceptable to include the compound represented by formula (12.1); or to include the compound represented by formula (12.2); or to include both of the compound represented by formula (12.1) and the compound represented by formula (12.2).

With respect to the total mass of the liquid crystal composition of the present invention, the compound represented by formula (12.1) or formula (12.2) is preferably included at a content of 3-40 mass %. In particular, it is more preferably 5-40 mass %; and still in particular, it is more preferably 7-40 mass %; and still in particular, it is more preferably 9-40 mass %; and still in particular, it is more preferably 11-40 mass %; and still in particular, it is more preferably 12-40 mass %; and further, it is more preferably 13-40 mass %; and further, in is more preferably 18-30 mass %; and specifically, it is preferably 21-25 mass %.

Also, with respect to the total mass of the liquid crystal composition of the present invention, the compound represented by formula (12.2) is preferably included at a content of 3-40 mass %; and more preferably at a content of 5-40 mass %; and further more preferable at a content of 8-40 mass %; and still further more preferable at a content of 10-40 mass %; and further preferable at a content of 12-40 mass %; and further preferable at a content of 15-40 mass %; and further preferable at a content of 17-30 mass %; and specifically preferably at a content of 19-25 mass %. When both of the compounds represented by formula (12.1) and formula (12.2) are included, it is preferable that the total mass of both of the compounds is included at a content of 15-45 mass % with respect to the total mass of the liquid crystal composition of the present invention. In particular, it is more preferably 19-45 mass %; and further preferable at a content of 24-40 mass %; and specifically, still more preferably at 30-35 mass %.

Also, with respect to the total mass of the liquid crystal composition of the present invention, the compound represented by formula (12.3) is preferably included at a content of 0.05-2 mass %; and in particular at a content of 0.1-1 mass %; and further in particular at a content of 0.2-0.5 mass %. The compound represented by formula (12.3) can be an optically active compound.

Furthermore, it is preferable that the compound represented by formula (II-3) can be a compound selected from the compounds represented by formula (II-3-1).

Chemical Formula 45

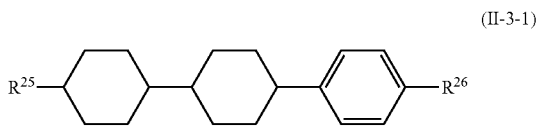

$R^{25}$ represents an alkyl group having a carbon atom number of 1-5, and $R^{26}$ represents an alkoxy group having a carbon atom number of 1-4.

The kinds of the compound to be combined are not specifically limited, and one to three kinds of these compounds can be preferably included depending on the demanded performances such as solubility at a low temperature, transition temperature, electric reliability, and birefringence rate.

The content of the compound represented by formula (II-3-1) is preferably adjusted depending on the demanded performances such as solubility at a low temperature, transition temperature, electric reliability, and birefringent rate. It is preferably 1-24 mass %; and more preferably 4-18 mass %; and furthermore preferably 8-14 mass %.

Furthermore, it is preferable that the compound represented by formula (II-3-1) is a compound represented by, for example, formula (13.1) to formula (13.4). In particular, it is preferably the compound represented by formula (13.3).

Chemical Formula 46

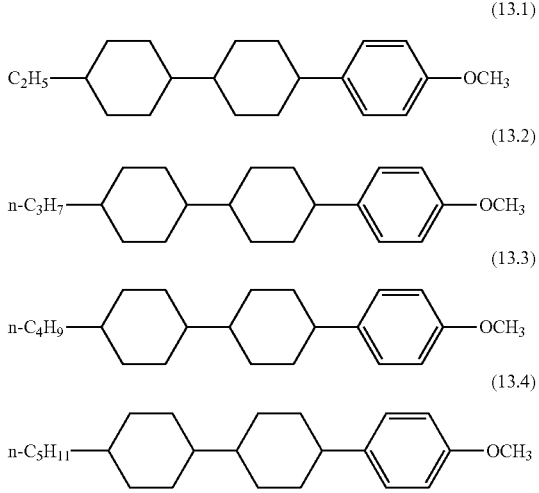

The content of the compound represented by formula (13.3) is preferably adjusted depending on the demanded performances such as solubility at a low temperature, transition temperature, electric reliability, and birefringent rate. It is preferably 1-20 mass %; and more preferably 2-10 mass %; and furthermore preferably 3-8 mass %.

Furthermore, it is preferable that the compound represented by formula (II) can be a compound selected from the compounds represented by formula (II-4).

Chemical Formula 47

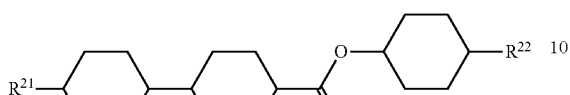

(II-4)

Each of $R^{21}$ and $R^{22}$ independently represents an alkenyl group having a carbon atom number of 2-5, or an alkyl group having a carbon atom number 1-5, or an alkoxy group having a carbon atom number 1-4.

Among these compounds, one kind, or two or more of them can be included. It is preferable to combine appropriately depending on the demanded performance. The kinds of the compound to be combined are not specifically limited, and one to two kinds of these compounds can be preferably included depending on the demanded performances such as solubility at a low temperature, transition temperature, electric reliability, and birefringence rate. In particular, it is preferable to include one to three kinds.

With respect to the total mass of the liquid crystal composition of the present invention, it is preferable that the content of the compound represented by formula (II-4) is 1-15 mass %; and more preferably 2-15 mass %; and more preferably 3-15 mass %; and more preferably 4-12 mass %; and specifically preferably 5-7 mass %.

Furthermore, it is preferable that the compound represented by formula (II-4) is a compound represented by, for example, formula (14.1) to formula (14.5). Particularly, it is preferable to be the compound represented by formula (14.2) or formula (14.5).

Chemical Formula 48

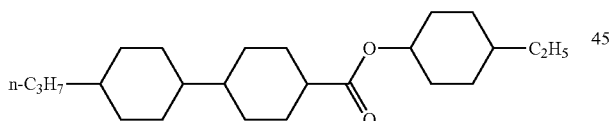

(14.1)

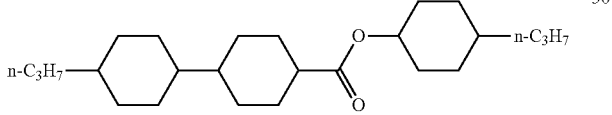

(14.2)

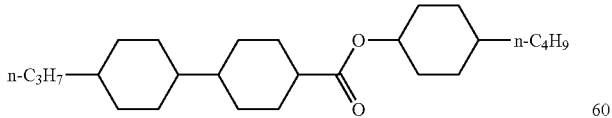

(14.3)

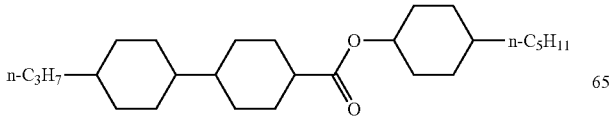

(14.4)

-continued

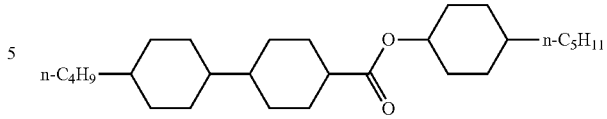

(14.5)

Furthermore, it is preferably that the compound represented by formula (L) can be selected from the compounds represented by formula (III).

Chemical Formula 49

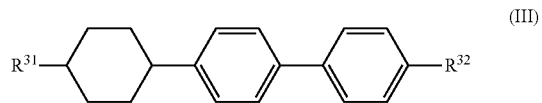

(III)

Each of $R^{31}$ and $R^{32}$ independently represents an alkenyl group having a carbon atom number of 2-5, or an alkyl group having a carbon atom number 1-5, or an alkoxy group having a carbon atom number 1-4.

In consideration of the solubility or the birefringent rate, the content of the compound represented by formula (III) with respect to the total mass of the liquid crystal composition of the present invention is preferably 3-25 mass %. More preferably, it is 6-20 mass %; and yet more preferably, it is 8-15 mass %.

Furthermore, it is preferable that the compound represented formula (III) is a compound represented by, for example, formula (15.1) to formula (15.3). In particular, it is preferably the compound represented by formula (15.3).

Chemical Formula 50

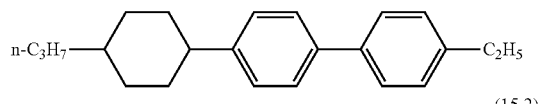

(15.1)

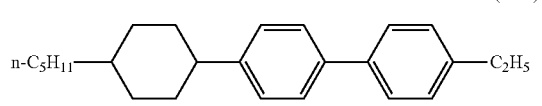

(15.2)

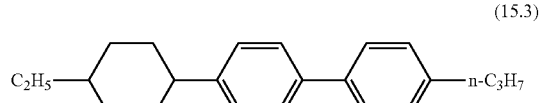

(15.3)

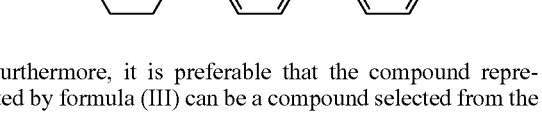

Furthermore, it is preferable that the compound represented by formula (III) can be a compound selected from the compounds represented by formula (III-1).

Chemical Formula 51

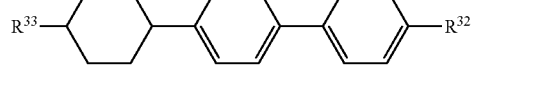

(III-1)

$R^{33}$ represents an alkenyl group having a carbon atom number of 2-5, $R^{32}$ independently represents an alkyl group having a carbon atom number of 1-5 or an alkoxy group having a carbon atom number of 1-4.

The content of the compound represented by formula (III-1) is preferably adjusted depending on the demanded performances such as solubility at a low temperature, transition temperature, electric reliability, and birefringent rate. In particular, it is preferably 4-23 mass %; more preferably 6-18 mass %; and furthermore preferably 10-13 mass %.

It is preferable that the compound represented by formula (III-1) is a compound represented by, for example, formula (16.1) or formula (16.2).

Chemical Formula 52:

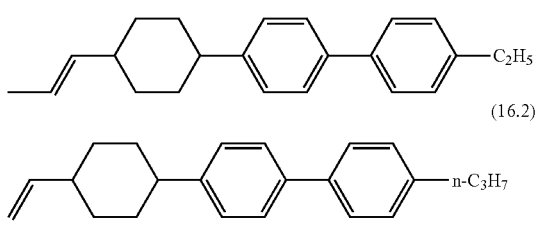

Furthermore, it is preferable that the compound represented by formula (L) is selected from the group represented by formula (V).

Chemical Formula 53

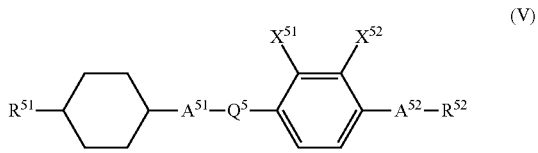

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4; and each of $A^{51}$ and $A^{52}$ independently represents 1,4-cyclohexylene group or 1,4-phenylene group; $Q^5$ represents a single bond or —COO—; and each of $X^{51}$ and $X^{52}$ independently represents fluorine atom or hydrogen atom.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds. Furthermore, another embodiment of the present invention can include three kinds. Furthermore, another embodiment of the present invention can include four kinds.

With respect to the total mass of the liquid crystal composition of the present invention, the content of the compound can be, for example, 2-40 mass % in one embodiment. Furthermore, the content above can be 4-40 mass % in another embodiment of the present invention. Furthermore, the content above can be 7-40 mass % in a different embodiment of the present invention. Furthermore, the content above can be 10-40 mass % in another embodiment of the present invention. Furthermore, the content above can be 12-40 mass % in another embodiment of the present invention. Furthermore, the content above can be 15-40 mass % in another embodiment of the present invention. Furthermore, the content above can be 17-40 mass % in a different embodiment of the present invention. Furthermore, the content above can be 18-40 mass % in another embodiment of the present invention. Furthermore, the content above can be 20-40 mass % in a different embodiment of the present invention. Furthermore, the content above can be 22-40 mass % in a different embodiment of the present invention.

Also, for example, in one embodiment of the present invention, the content of the compound with respect to the total mass of the liquid crystal composition of the present invention is 2-40 mass %. Furthermore, the content of the compound is 2-30 mass % in a different embodiment of the present invention. Furthermore, the content of the compound is 2-25 mass % in a different embodiment of the present invention. Furthermore, the content of the compound is 2-20 mass % in a different embodiment of the present invention. Furthermore, the content of the compound is 2-15 mass % in a different embodiment of the present invention. Furthermore, the content of the compound is 2-10 mass % in a different embodiment of the present invention. Furthermore, the content of the compound is 2-5 mass % in a different embodiment of the present invention. Furthermore, the content of the compound is 2-4 mass % in a different embodiment of the present invention.

Furthermore, it is preferable that the compound represented by formula (V) is a compound represented in formula (V-1).

Chemical Formula 54

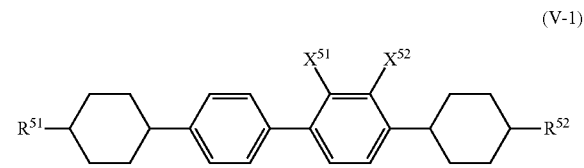

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4; and each of $X^{51}$ and $X^{52}$ independently represents fluorine atom or hydrogen atom.

Furthermore, it is preferable that the compound represented by formula (V-1) is a compound represented by formula (V-1-1).

Chemical Formula 55:

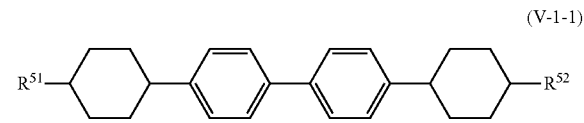

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4.

With respect to the total mass of the liquid crystal composition of the present invention, the compound represented by formula (V-1-1) is preferably included at a content of 1-15 mass %; and more preferably at a content of 2-15 mass %; and yet more preferably at a content of 3-10 mass %.

Furthermore, the compound represented by formula (V-1-1) is preferably a compound represented by formula (20.1) to formula (20.4). In particular, it is preferably a compound represented by formula (20.2).

Chemical Formula 56:

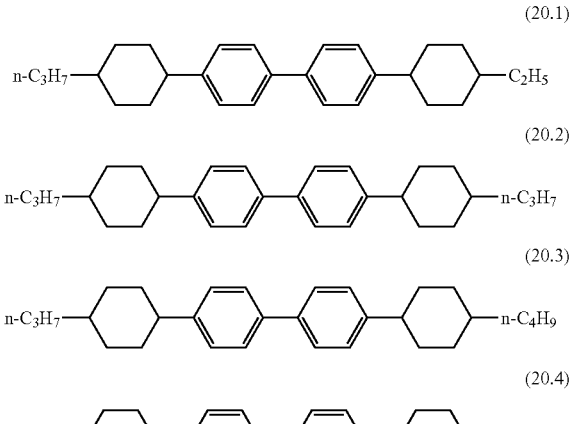

In the liquid crystal composition of the present invention, the content of the compound represented by formula (20.2) can be preferably 1-20 mass % with respect to the total mass of the liquid crystal composition of the present invention, in consideration of the solubility at a low temperature, transition temperature, and electric reliability. In particular, it is preferably 2-15 mass %; and more preferably, it is 3-10 mass %; yet more preferably, it is 3-7 mass %.

Furthermore, the compound represented by formula (V-1) is preferably a compound represented by formula (V-1-2).

Chemical Formula 57:

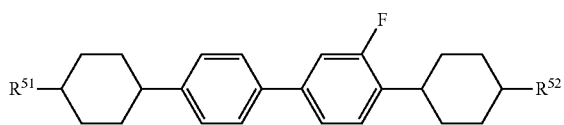

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4.

With respect to the total mass of the liquid crystal composition of the present invention, the compound represented by formula (V-1-2) is preferably included at a content of 1-15 mass %; and more preferably at a content of 2-15 mass %; and yet more preferably at a content of 3-10 mass %.

Furthermore, the compound represented by formula (V-1-2) is preferably a compound represented by formula (21.1) to formula (21.3). In particular, it is preferably a compound represented by formula (21.1).

Chemical Formula 58:

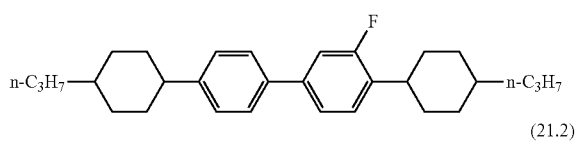

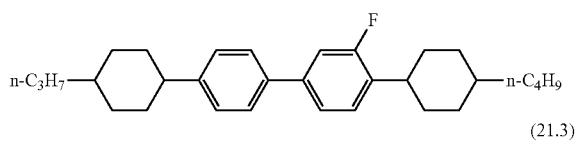

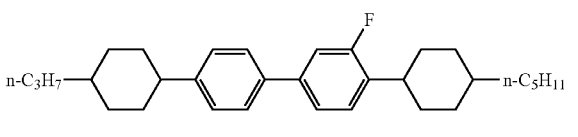

Furthermore, the compound represented by formula (V-1) is preferably a compound represented by formula (V-1-3).

Chemical Formula 59:

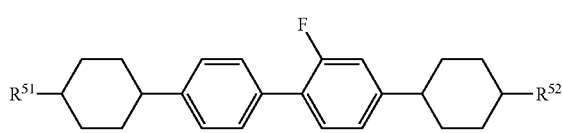

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4.

With respect to the total mass of the liquid crystal composition of the present invention, the compound represented by formula (V-1-3) is preferably included at a content of 1 mass % or more; and further preferably at a content of 2 mass % or more; and further preferably at a content of 3 mass % or more; and still more preferably at a content of 4 mass % or more. Also, the maximum ratio to be included is preferably 15 mass % or less; and more preferably 10 mass % or less; and yet more preferably 8 mass % or less.

Furthermore, the compound represented by formula (V-1-3) is a compound represented by formula (22.1) to formula (22.3). In particular, it is preferably the compound represented by formula (22.1).

Chemical Formula 60:

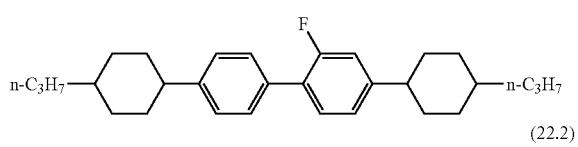

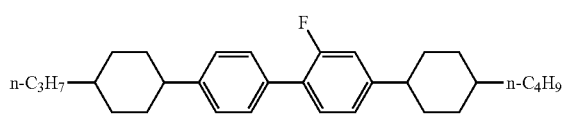

-continued (22.3)

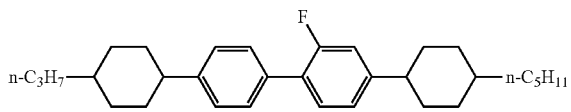

Furthermore, the compound represented by formula (V) is preferably a compound represented by formula (V-2).

Chemical Formula 61:

(V-2)

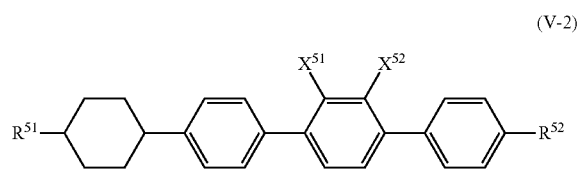

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4. Each of $X^{51}$ and $X^{52}$ independently represents fluorine atom or hydrogen atom.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds.

With respect to the total mass of the liquid crystal composition of the present invention, the content of the compound can be, for example, 2-40 mass % in one embodiment. Furthermore, the content above can be 4-40 mass % in a different embodiment of the present invention. Furthermore, the content above can be 7-40 mass % in a different embodiment of the present invention. Furthermore, the content above can be 10-40 mass % in a different embodiment of the present invention. Furthermore, the content above can be 12-40 mass % in a different embodiment of the present invention. Furthermore, the content above can be 15-40 mass % in a different embodiment of the present invention. Furthermore, the content above can be 17-40 mass % in a different embodiment of the present invention. Furthermore, the content above can be 18-40 mass % in a different embodiment of the present invention. Furthermore, the content above can be 20-40 mass % in a different embodiment of the present invention. Furthermore, the content above can be 22-40 mass % in a different embodiment of the present invention.

For example, with respect to the total mass of the liquid crystal composition of the present invention, the content of the compound 2-40 mass % in one embodiment of the present invention. Furthermore, the content above can be 2-30 mass % in a different embodiment of the present invention. Furthermore, the content above can be 2-25 mass % in a different embodiment of the present invention. Furthermore, the content above can be 2-20 mass % in a different embodiment of the present invention. Furthermore, the content above can be 2-15 mass % in a different embodiment of the present invention. Furthermore, the content above can be 2-10 mass % in a different embodiment of the present invention. Furthermore, the content above can be 2-5 mass % in a different embodiment of the present invention. Furthermore, the content above can be 2-4 mass % in a different embodiment of the present invention.

When demanding an embodiment having a high value of Tni in a liquid crystal composition of the present invention, it is preferable that the content of the compound represented by formula (V-2) becomes relatively large. When demanding an embodiment having a low viscosity, it is preferable that the content becomes relatively small.

Furthermore, the compound represented by formula (V-2) is preferably a compound represented by formula (V-2-1).

Chemical Formula 62:

(V-2-1)

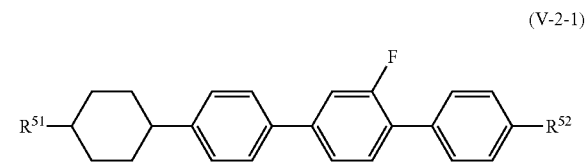

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4.

Furthermore, the compound represented by formula (V-2-1) is preferably a compound represented by formula (23.1) to formula (23.4). In particular, it is preferably the compound represented by formula (23.1) and/or formula (23.2).

Chemical Formula 63:

(23.1)

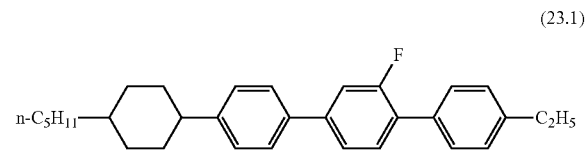

(23.2)

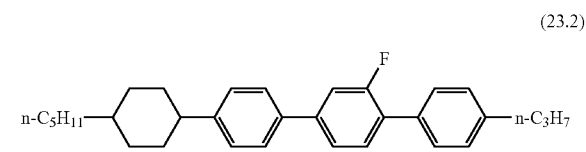

(23.3)

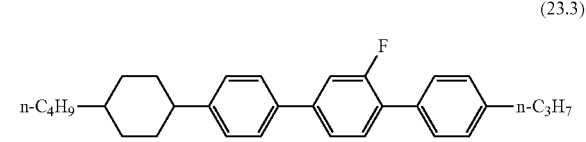

(23.4)

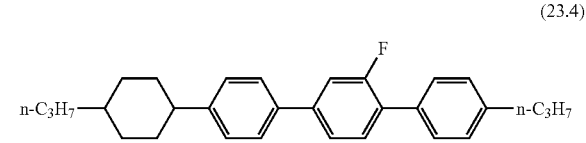

Furthermore, the compound represented by formula (V-2) is preferably a compound represented by formula (V-2-2).

Chemical Formula 64:

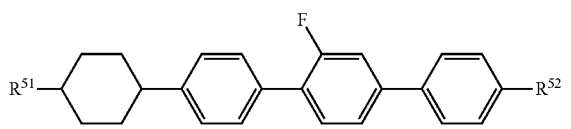

(V-2-2)

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4.

Furthermore, the compound represented by formula (V-2-2) is a compound represented by formula (24.1) to formula (24.4). In particular, it is preferably the compound represented by formula (24.1) or formula (24.2).

Chemical Formula 65:

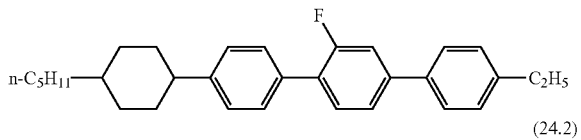

(24.1)

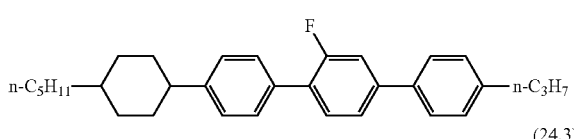

(24.2)

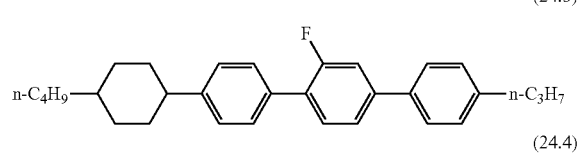

(24.3)

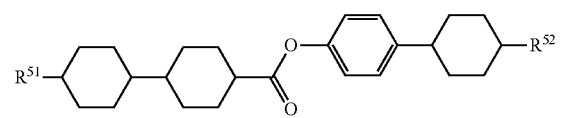

(24.4)

Furthermore, the compound represented by formula (V) is preferably a compound represented by formula (V-3).

Chemical Formula 66:

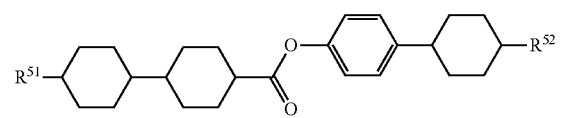

(V-3)

In the formula, each of $R^{51}$ and $R^{52}$ independently represents an alkyl group having a carbon atom number of 1-5, an alkenyl group having a carbon atom number of 2-5 or an alkoxy group having a carbon atom number of 1-4.

The kinds of the compounds to be combined are not particularly restricted, but can be combined in accordance with the demand on performances such as solubility at a low temperature, transition temperature, electric reliability, and the birefringence rate. For example, as the kinds of the compound to use, one embodiment of the present invention can include a single kind. Alternatively, another embodiment of the present invention can include two kinds. Furthermore, another embodiment of the present invention can include three or more kinds.

With respect to the total mass of the liquid crystal composition of the present invention, the compound represented by formula (V-3) is preferably included at a content of 2-16 mass %; and further preferably at a content of 4-16 mass %; and further preferably at a content of 7-13 mass %; and further preferably at a content of 8-11 mass %.

Furthermore, the compound represented by formula (V-3) is preferably a compound represented by formula (25.1) to formula (25.3).

Chemical Formula 67:

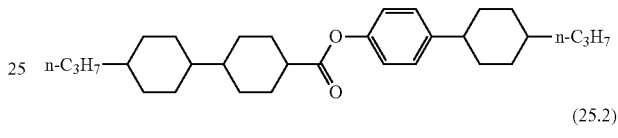

(25.1)

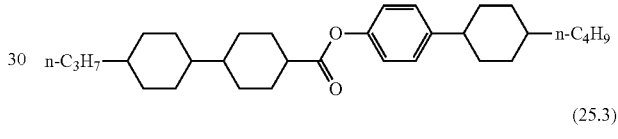

(25.2)

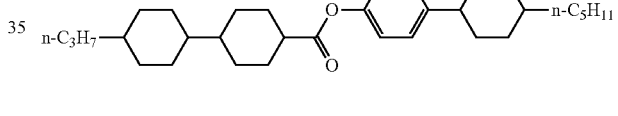

(25.3)

The liquid crystal composition of the present invention preferably includes a compound represented by formula (M).

Chemical Formula 68:

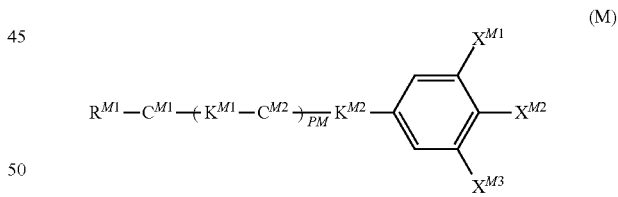

(M)

In the formula, $R^{M1}$ represents an alkyl group having a carbon atom number of 1-8; one of the alkyl groups, or two or more of the alkyl groups being noncontiguous, include —$CH_2$— which can be independently substituted by —CH=CH—, —C≡C—, —O—, —CO—, —COO— or —OCO—.

PM represents 0, 1, 2 3 or 4;

each of $C^{M1}$ and $C^{M2}$ independently represents a group selected from the group consisting of (d) and (e) below;

(d): 1,4-cyclohexylene group (in which one of —$CH_2$— groups or noncontiguous two of —$CH_2$— groups can be substituted with —O— or —S—); and (e): 1,4-phenylene group (in which one of —CH= groups or noncontiguous two of —CH= groups can be substituted with —N=), and at least one hydrogen atom in the group (d) and the group (e) can be independently substituted with cyano group, fluorine atom or chlorine atom;

each of $K^{M1}$ and $K^{M2}$ independently represents single bond, —$CH_2CH_2$—, —$(CH_2)_4$—, —$OCH_2$—, —$CH_2O$—, —$OCF_2$—, —$CF_2O$—, —COO—, —OCO— or —C≡C—;

when PM is 2, 3 or 4 so that plural groups of $K^{M1}$ exist, said plural groups of $K^{M1}$ can be the same or different; and when PM is 2, 3 or 4 so that plural groups of $C^{M2}$ exist, said plural groups of $C^{M2}$ can be the same or different;

each of $X^{M1}$ and $X^{M3}$ independently represents hydrogen atom, chlorine atom or fluorine atom; and $X^{M2}$ represents hydrogen atom, fluorine atom, chlorine atom, cyano group, trifluoromethyl group, fluoromethoxy group, difluoromethoxy group, trifluoromethoxy group or 2,2,2-trifluoroethyl group.

The kinds of the compounds to be combined are not in particular limited, and can be appropriately used in accordance with the desired performances such as solubility at a low temperature, transition temperature, electric reliability, and birefringence rate.

For example, as the kinds of the compound to use, one embodiment of the present invention can include a single kind. Alternatively, another embodiment of the present invention can include two kinds. Furthermore, another embodiment of the present invention can include three kinds. Furthermore, another embodiment of the present invention can include four kinds. Furthermore, another embodiment of the present invention can include five kinds. Furthermore, another embodiment of the present invention can include six kinds. Furthermore, another embodiment of the present invention can include seven or more kinds.

In the liquid crystal composition of the present invention, the content of the compound represented by formula (M) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 1-95 mass % in one embodiment of the present invention. Furthermore, the content of the compound is, e.g., 10-95 mass % in a different embodiment of the present invention. For example, the content of the compound is, e.g., 20-95 mass % in a yet different embodiment of the present invention. For example, the content of the compound is, e.g., 30-95 mass % in a yet different embodiment of the present invention. For example, the content of the compound is, e.g., 40-95 mass % in a yet different embodiment of the present invention. For example, the content of the compound is, e.g., 45-95 mass % in a yet different embodiment of the present invention. For example, the content of the compound is, e.g., 50-95 mass % in a yet different embodiment of the present invention. For example, the content of the compound is, e.g., 55-95 mass % in a yet different embodiment of the present invention. For example, the content of the compound is, e.g., 60-95 mass % in a yet different embodiment of the present invention. For example, the content of the compound is, e.g., 65-95 mass % in a yet different embodiment of the present invention. For example, the content of the compound is, e.g., 70-95 mass % in a yet different embodiment of the present invention. For example, the content of the compound is, e.g., 75-95 mass % in a yet different embodiment of the present invention. For example, the content of the compound is, e.g., 80-95 mass % in a yet different embodiment of the present invention.

Also, with respect to the total mass of the liquid crystal composition of the present invention, the content of the compound is, for example, 1-95 mass % in one embodiment of the present invention. Furthermore, the content of the compound is, e.g., 1-85 mass % in a different embodiment of the present invention. The content of the compound is, e.g., 1-75 mass % in a yet different embodiment of the present invention. The content of the compound is, e.g., 1-65 mass % in a yet different embodiment of the present invention. The content of the compound is, e.g., 1-55 mass % in a yet different embodiment of the present invention. The content of the compound is, e.g., 1-45 mass % in a yet different embodiment of the present invention. The content of the compound is, e.g., 1-35 mass % in a yet different embodiment of the present invention. The content of the compound is, e.g., 1-25 mass % in a yet different embodiment of the present invention.

In order to maintain a low viscosity of the liquid crystal composition of the present invention as well as to accomplish a fast response of the liquid crystal composition, it is favorable that the lower limit and the upper are kept low. Furthermore, in order to maintain high Tni of the liquid crystal composition of the present invention as well as to make the liquid crystal composition have excellent temperature stability, it is favorable that a lower limit and the upper limit are kept low. Also, in order to increase the dielectric constant anisotropy to keep the drive voltage low, it is desirable that the upper limit and the lower limit are kept high.

$R^{M1}$, when the ring structure to which it combines is a phenyl group (aromatic group), are preferably a linear alkyl group having a carbon atom number of 1-5, a linear alkoxy group having a carbon atom number of 1-4, and an alkenyl group having a carbon atom number 4-5. $R^{M1}$, when the ring structure to which it combines is saturated structure such as cyclohexane, pyran and dioxane, can be preferably a linear alkyl group having a carbon atom number of 1-5, a linear alkoxy group having a carbon atom number of 1-4, and a linear alkenyl group having a carbon atom number of 2-5.

It is preferably that the compound represented by formula (M) does not include chlorine atom in its molecule when the liquid crystal composition is demanded to be chemically stable. Furthermore, in the liquid crystal composition, the compound having chlorine atom is preferably included at a content of 5% or less; more preferably at a content of 3% or less; more preferably at a content of 1% or less; more preferably at a content of 0.5% or less; and more preferably it is not substantially included. The term "not substantially included" does not include the case where the liquid crystal composition is contaminated by a compound including chlorine atom, such as a compound formed as impurities at the time of the compound production without intension.

The compound represented by formula (M) is preferably a compound selected from the compounds represented by, for example, formula (VIII).

Chemical Formula 69:

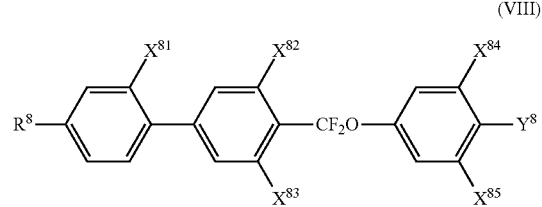

(VIII)

In the formula, $R^8$ represents an alkyl group having a carbon atom number of 1-5, an alkenyl group having a carbon atom number of 4-5 or an alkoxy group having a carbon atom number 1-4; each of $X^{81}$ to $X^{85}$ independently represents hydrogen atom or fluorine atom; and $Y^8$ represents fluorine atom or —$OCF_3$.

The kinds of the compounds to be combined are not in particular limited, and can be appropriately used in accordance with the desired performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Furthermore, another embodiment of the present invention can include three or more kinds.

In the liquid crystal composition of the present invention, the content of the compound represented by formula (VIII) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 2-40 mass % in one embodiment of the present invention. Furthermore, the content of the compound is, e.g., 4-40 mass % in a different embodiment of the present invention. For example, the content of the compound is, e.g., 5-40 mass % in a yet different embodiment of the present invention. For example, the content of the compound is, e.g., 6-40 mass % in a yet different embodiment of the present invention. For example, the content of the compound is, e.g., 7-40 mass % in a yet different embodiment of the present invention. For example, the content of the compound is, e.g., 8-40 mass % in a yet different embodiment of the present invention. For example, the content of the compound is, e.g., 9-40 mass % in a yet different embodiment of the present invention. For example, the content of the compound is, e.g., 10-40 mass % in a yet different embodiment of the present invention. For example, the content of the compound is, e.g., 11-40 mass % in a yet different embodiment of the present invention. For example, the content of the compound is, e.g., 12-40 mass % in a yet different embodiment of the present invention. For example, the content of the compound is, e.g., 14-40 mass % in a yet different embodiment of the present invention. For example, the content of the compound is, e.g., 15-40 mass % in a yet different embodiment of the present invention. For example, the content of the compound is, e.g., 21-40 mass % in a yet different embodiment of the present invention. For example, the content of the compound is, e.g., 23-40 mass % in a yet different embodiment of the present invention.

Also, with respect to the total mass of the liquid crystal composition of the present invention, the content of the compound is, for example, 2-40 mass % in one embodiment of the present invention. Furthermore, the content of the compound is, e.g., 2-30 mass % in a different embodiment of the present invention. The content of the compound is, e.g., 2-25 mass % in a yet different embodiment of the present invention. The content of the compound is, e.g., 2-21 mass % in a yet different embodiment of the present invention. The content of the compound is, e.g., 2-16 mass % in a yet different embodiment of the present invention. The content of the compound is, e.g., 2-12 mass % in a yet different embodiment of the present invention. The content of the compound is, e.g., 2-8 mass % in a yet different embodiment of the present invention. The content of the compound is, e.g., 2-5 mass % in a yet different embodiment of the present invention.

In order to maintain a low viscosity of the liquid crystal composition of the present invention as well as to accomplish a fast response of the liquid crystal composition, it is favorable that the lower limit and the upper are kept low. Furthermore, in order to maintain high Tni of the liquid crystal composition of the present invention as well as to make the liquid crystal composition have excellent temperature stability, it is favorable that the lower limit and the upper limit are relatively made lower. Also, in order to increase the dielectric constant anisotropy to keep the drive voltage low, it is desirable that the upper limit and the lower limit are kept high.

Furthermore, the compound represented by formula (VIII) is preferably a compound represented by formula (VIII-1).

Chemical Formula 70:

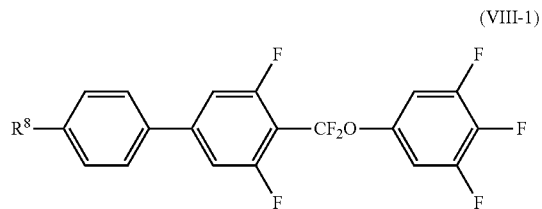

(VIII-1)

In the formula, $R^8$ represents an alkyl group having a carbon atom number of 1-5, an alkenyl group having a carbon atom number of 4-5 or an alkoxy group having a carbon atom number 1-4.

The kinds of the compounds to be combined are not in particular limited, and can be appropriately used in accordance with the desired performances such as solubility at a low temperature, transition temperature, electric reliability, and birefringence rate. For example, as the kinds of the compound to use, one embodiment of the present invention can include a single kind. Alternatively, another embodiment of the present invention can include two kinds or more.

Furthermore, it is preferable that the compound represented by formula (VIII-1) is a compound represented by, for example, formula (26.1) to formula (26.4). In particular, it is preferably the compound represented by formula (26.1) or formula (26.2); and more preferably the compound represented by formula (26.2).

Chemical Formula 71:

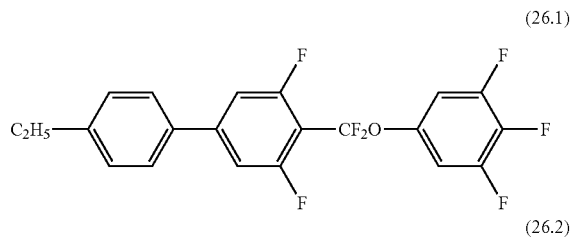

(26.1)

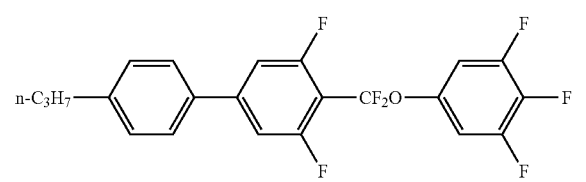

(26.2)

(26.3)

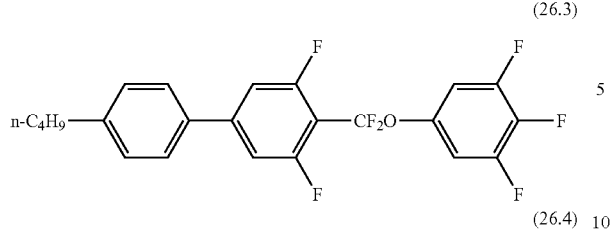

(26.4)

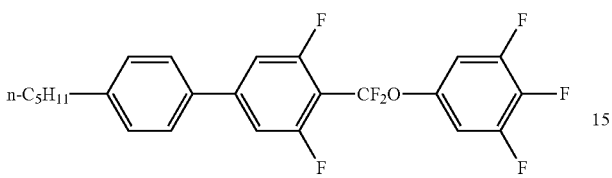

The content of a compound represented in a formula (26.2) can be preferably 2-40 mass % with respect to the total mass of the liquid crystal composition of the present invention, in consideration of the solubility at a low temperature, transition temperature, electric reliability and birefringent rate. In particular, it can be preferably 3-30 mass %; more preferably 3-20 mass %; and yet more preferably 3-15 mass %.

Furthermore, it is preferable that the compound represented by formula (VIII) is a compound represented by formula (VIII-2).

Chemical Formula 72:

(VIII-2)

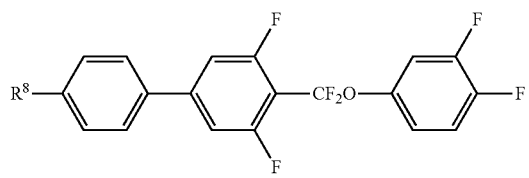

In the formula, $R^8$ represents an alkyl group having a carbon atom number of 1-5, an alkenyl group having a carbon atom number of 4-5 or an alkoxy group having a carbon atom number 1-4.

The kinds of the compounds to be combined are not in particular limited, and can be appropriately used in accordance with the desired performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Alternatively, yet another embodiment of the present invention can include three kinds or more.

The content of the compound represented by formula (VIII-2) can be 2.5-25 mass % in consideration of solubility at a low temperature, transition temperature, electric reliability, and birefringence rate. In particular, it is more preferably 8-25 mass %; and yet more preferably 10-20 mass %; and further more preferably 12-15 mass %.

Furthermore, the compound represented by formula (VIII-2) is a compound represented by formula (27.1) to formula (27.4). In particular, it is preferably the compound represented by formula (27.2).

Chemical Formula 73:

(27-1)

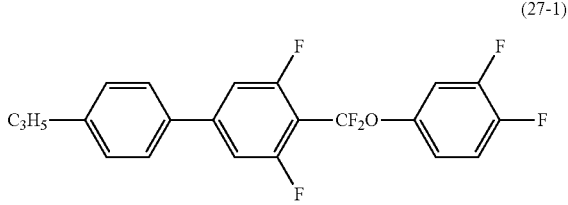

(27-2)

(27-3)

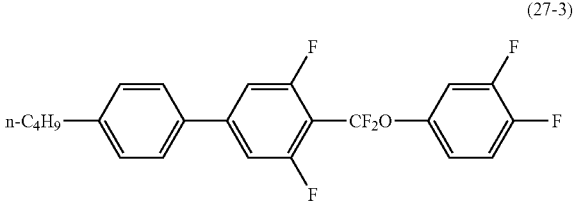

(27.4)

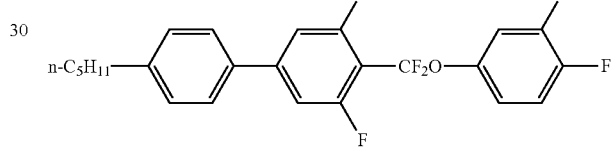

Furthermore, the compound represented by formula (M) is preferably a compound represented by formula (VIII-3).

Chemical Formula 74:

(VIII-3)

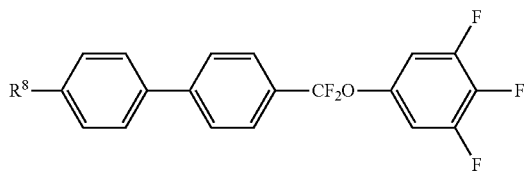

In the formula, $R^8$ represents an alkyl group having a carbon atom number of 1-5, an alkenyl group having a carbon atom number of 4-5 or an alkoxy group having a carbon atom number 1-4.

The kinds of the compounds to be combined are not in particular limited, and can be appropriately used in accordance with the desired performances such as solubility at a low temperature, transition temperature, electric reliability, and birefringence rate. For example, as the kinds of the compound to use, one embodiment of the present invention can include a single kind. Alternatively, another embodiment of the present invention can include two kinds or more.

Furthermore, it is preferable that the compound represented by formula (VIII-3) is a compound represented by, for example, formula (26.11) to formula (26.14). In particular, it is preferably the compound represented by formula (26.11) or formula (26.12), and more preferably the compound represented by formula (26.12).

Chemical Formula 75:

(26.11)

(26.12)

(26.13)

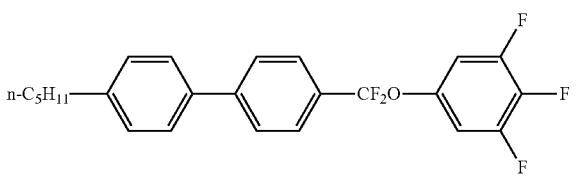

(26.14)

The compound represented by formula (M) is preferably a compound selected from the compounds represented by, for example, formula (IX).

Chemical Formula 76:

(IX)

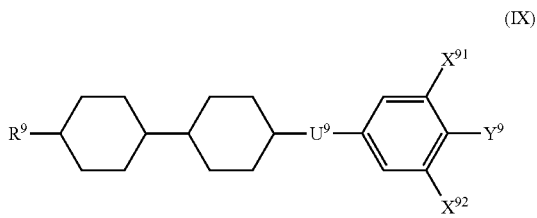

In the formula, $R^9$ represents an alkyl group having a carbon atom number of 1-5, an alkenyl group having carbon atom number of 2-5 or an alkoxy group having a carbon atom number 1-4; each of $X^{91}$ and $X^{92}$ independently represents hydrogen atom or fluorine atom; $Y^9$ represents fluorine atom, chlorine atom or —$OCF_3$; and $U^9$ represents a single bond, —COO— or —$CF_2O$—.

The kinds of the compounds to be combined are not in particular limited, and can be appropriately used in accordance with the desired performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Furthermore, another embodiment of the present invention can include three kinds. Furthermore, another embodiment of the present invention can include four kinds. Furthermore, another embodiment of the present invention can include five kinds. Furthermore, another embodiment of the present invention can include six or more kinds.

In the liquid crystal composition of the present invention, the content of the compound represented by formula (IX) is required to be appropriately adjusted in accordance with the demanded performances such as solubility at a low temperature, transition temperature, electric reliability, birefringent rate, process compatibility, drip trace, ghosting and dielectric constant anisotropy.

With respect to the total mass of the liquid crystal composition of the present invention, the content of the compound can be e.g., 3-70 mass % in one embodiment of the present invention. Furthermore, the content of the compound is, e.g., 5-70 mass % in a different embodiment of the present invention. For example, the content of the compound is, e.g., 8-70 mass % in a yet different embodiment of the present invention. For example, the content of the compound is, e.g., 10-70 mass % in a yet different embodiment of the present invention. For example, the content of the compound is, e.g., 12-70 mass % in a yet different embodiment of the present invention. For example, the content of the compound is, e.g., 15-70 mass % in a yet different embodiment of the present invention. For example, the content of the compound is, e.g., 17-70 mass % in a yet different embodiment of the present invention. For example, the content of the compound is, e.g., 20-70 mass % in a yet different embodiment of the present invention. For example, the content of the compound is, e.g., 24-70 mass % in a yet different embodiment of the present invention. For example, the content of the compound is, e.g., 28-70 mass % in a yet different embodiment of the present invention. For example, the content of the compound is, e.g., 30-70 mass % in a yet different embodiment of the present invention. For example, the content of the compound is, e.g., 34-70 mass % in a yet different embodiment of the present invention. For example, the content of the compound is, e.g., 39-70 mass % in a yet different embodiment of the present invention. For example, the content of the compound is, e.g., 40-70 mass % in a yet different embodiment of the present invention. For example, the content of the compound is, e.g., 42-70 mass % in a yet different embodiment of the present invention. For example, the content of the compound is, e.g., 45-70 mass % in a yet different embodiment of the present invention.

Also, with respect to the total mass of the liquid crystal composition of the present invention, the content of the compound is, for example, 3-70 mass % in one embodiment of the present invention. Furthermore, the content of the compound is, e.g., 3-60 mass % in a different embodiment of the present invention. The content of the compound is, e.g., 3-55 mass % in a yet different embodiment of the present invention. The content of the compound is, e.g., 3-50 mass % in a yet different embodiment of the present invention. The content of the compound is, e.g., 3-45 mass % in a yet different embodiment of the present invention. The content of the compound is, e.g., 3-40 mass % in a yet different embodiment of the present invention. The content of the compound is, e.g., 3-35 mass % in a yet different embodiment of the present invention. The content of the compound is, e.g., 3-30 mass % in a yet different embodiment of the present invention. It is 25 mass % in a yet different embodiment of the present invention. The content of the compound is, e.g., 3-20 mass % in a yet different embodiment of the present invention. The content of the compound is, e.g., 3-15 mass % in a yet different embodiment of the present invention. The content of the compound is, e.g., 3-10 mass % in a yet different embodiment of the present invention.

In order to maintain a low viscosity of the liquid crystal composition of the present invention as well as to accomplish a fast response of the liquid crystal composition, it is favorable that the lower limit and the upper are kept low. Furthermore, in order to maintain high Tni of the liquid crystal composition of the present invention as well as to make the liquid crystal composition have excellent temperature stability, it is favorable that the lower limit and the upper limit are relatively made lower. Also, in order to increase the dielectric constant anisotropy to keep the drive voltage low, it is desirable that the upper limit and the lower limit are kept high.

Furthermore, the compound represented by formula (IX) is preferably a compound represented by formula (IX-1).

Chemical Formula 77:

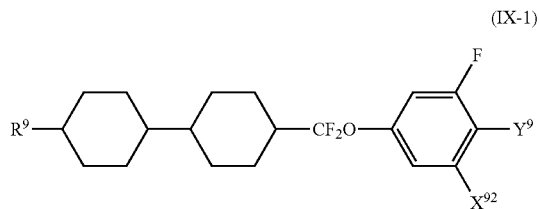

(IX-1)

In the formula, $R^9$ represents an alkyl group having a carbon atom number of 1-5, an alkenyl group having a carbon atom number of 2-5 or an alkoxy group having a carbon atom number 1-4; $X^{92}$ represents hydrogen atom or fluorine atom; and $Y^9$ represents fluorine atom or —$OCF_3$.

The kinds of the compounds to be combined are not in particular limited, and can be appropriately used in accordance with the desired performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Furthermore, another embodiment of the present invention can include three kinds. Furthermore, another embodiment of the present invention can include four kinds or more.

Furthermore, the compound represented by formula (IX-1) is preferably a compound represented by formula (IX-1-1).

Chemical Formula 78

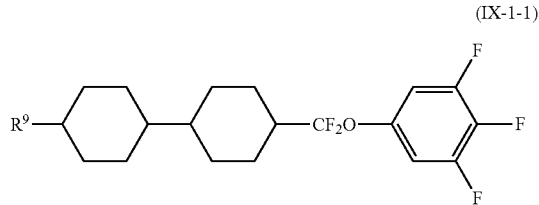

(IX-1-1)

In the formula, R9 represents an alkyl group having a carbon atom number of 1-5, an alkenyl group having a carbon atom number of 2-5 or an alkoxy group having a carbon atom number 1-4.

The kinds of the compounds to be combined are not in particular limited, and can be appropriately used in accordance with the desired performances such as solubility at a low temperature, transition temperature, electric reliability, and birefringence rate. For example, as the kinds of the compound to use, one embodiment of the present invention can include a single kind. Alternatively, another embodiment of the present invention can include two kinds. Furthermore, another embodiment of the present invention can include three or more kinds.

As to the content of the compound represented by formula (IX-1-1), there are an upper limit and a lower limit in each embodiment in consideration of the characteristics such as solubility at a low temperature, transition temperature, electric reliability, and birefringence rate.

With respect to the total mass of the liquid crystal composition of the present invention, the content of the compound can be, for example, 1-40 mass % in one embodiment. Another embodiment can include it at a content of 2-40 mass %. Yet another embodiment can include it at a content of 4-40 mass %. Also, yet another embodiment can include it at a content of 10-40 mass %. Also, yet another embodiment can include it at a content of 14-40 mass %. Also, yet another embodiment can include it at a content of 16-40 mass %.

Also, with respect to the total mass of the liquid crystal composition of the present invention, the content of the compound can be, for example, 1-40 mass % in one embodiment. Another embodiment can include at a content of 1-35 mass %. Yet another embodiment can include it at a content of 1-30 mass %. Also, yet another embodiment can include it at a content of 1-25 mass %.

Furthermore, the compound represented by formula (IX-1-1) is a compound represented by formula (28.1) to formula (28.5). In particular, it is preferably the compound represented by formula (28.3) and/or formula (28.5).

Chemical Formula 79:

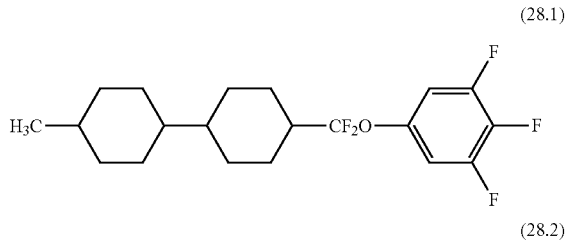

(28.1)

(28.2)

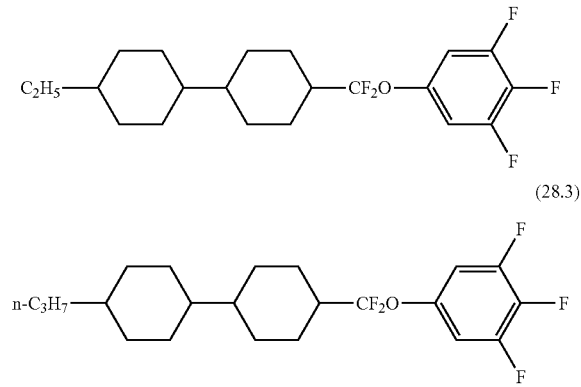

(28.3)

(28.4)

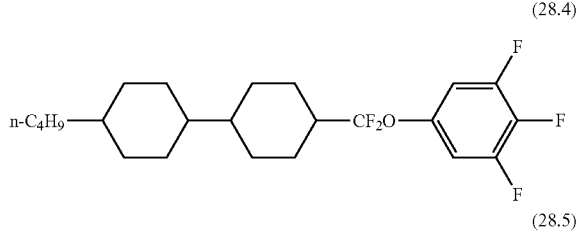

(28.5)

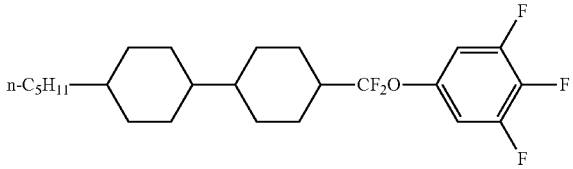

The content of a compound represented by formula (28.3) can be preferably 3-25 mass % with respect to the total mass of the liquid crystal composition of the present invention, in consideration of the solubility at a low temperature, transition temperature, electric reliability and birefringent rate. In particular, it is preferably 3-20 mass %; and more preferably, it is 3-15 mass %; yet more preferably, it is 3-10 mass %.

The content of a compound represented by formula (28.5) can be preferably 3-25 mass % with respect to the total mass of the liquid crystal composition of the present invention, in consideration of the solubility at a low temperature, transition temperature, electric reliability and birefringent rate. In particular, it is preferably 3-20 mass %; and more preferably, it is 3-15 mass %; yet more preferably, it is 3-10 mass %.

Furthermore, the compound represented by formula (IX-1) is preferably a compound represented by formula (IX-1-2).

Chemical Formula 80

(IX-1-2)

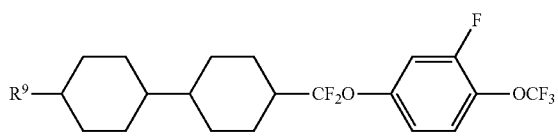

In the formula, $R^9$ represents an alkyl group having a carbon atom number of 1-5, an alkenyl group having a carbon atom number of 2-5 or an alkoxy group having a carbon atom number 1-4.

The compounds to be combined are not in particular limited, and one to four kinds can be combined in consideration of solubility at a low temperature, transition temperature, electric reliability, and birefringence rate.

The content of the compound represented in a formula (IX-1-2) can be preferably 1-30 mass % with respect to the total mass of the liquid crystal composition of the present invention, in consideration of the solubility at a low temperature, transition temperature, electric reliability and birefringent rate. In particular, it is preferably 5-30 mass %; and more preferably, it is 8-30 mass %; and more preferably, it is 10-25 mass %; and more preferably, it is 14-22 mass %; and specifically, it is preferably 16-20 mass %, or less.

Furthermore, the compound represented by formula (IX-1-2) is preferably a compound represented by formula (29.1) to formula (29.4). In particular, it is preferable to be the compound represented by formula (29.2) or formula (29.4).

Chemical Formula 81:

(29.1)

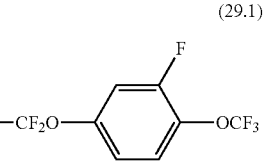

(29.2)

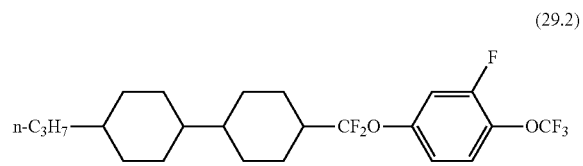

(29.3)

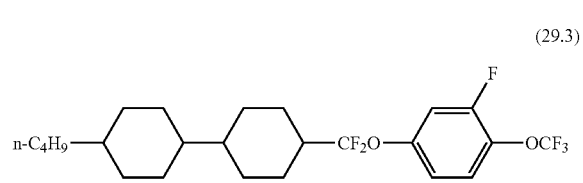

(29.4)

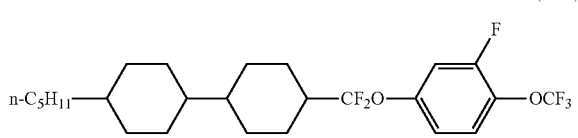

Furthermore, the compound represented by formula (IX) is preferably a compound represented by formula (IX-2).

Chemical Formula 82

(IX-2)

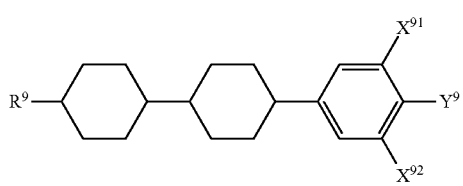

In the formula, $R^9$ represents an alkyl group having a carbon atom number of 1-5, an alkenyl group having a carbon atom number of 2-5 or an alkoxy group having a carbon atom number 1-4; each of $X^{91}$ and $X^{92}$ independently represents hydrogen atom or fluorine atom; and $Y^9$ represents fluorine atom, chlorine atom or —$OCF_3$.

The kinds of the compounds to be combined are not in particular limited, and can be appropriately used in accordance with the desired performances such as solubility at a low temperature, transition temperature, electric reliability, and birefringence rate. For example, one embodiment of the present invention includes one kind; another embodiment includes two kinds; yet another embodiment includes three kinds; still different embodiment includes four kinds; still different embodiment includes five kinds; and still different embodiment includes six or more kinds.

Furthermore, the compound represented by formula (IX-2) is preferably a compound represented by formula (IX-2-1).

Chemical Formula 83

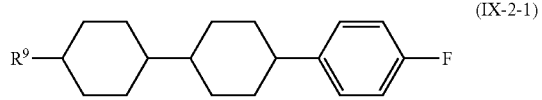

(IX-2-1)

In the formula, $R^9$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate.

As to the content of the compound represented by formula (IX-2-1), there are an upper limit and a lower limit in each embodiment in consideration of the characteristics such as solubility at a low temperature, transition temperature, electric reliability, and birefringence rate.

Also, for example, one embodiment of the present invention can include the compound at a content of 1-40 mass % with respect to the total mass of the liquid crystal composition of the present invention. In another embodiment, the content of the compound can be 2-40 mass %. Further, the content of the compound can be 2-40 mass % in different embodiment. Furthermore, the content of the compound can be 10-40 mass % in further different embodiment. Furthermore, the content of the compound can be 14-40 mass % in further different embodiment. Furthermore, the content of the compound can be 16-40 mass % in further different embodiment. Furthermore, the content of the compound can be 21-40 mass % in further different embodiment.

Also, for example, with respect to the total mass above, the content of the compound includes 1-40 mass % in one embodiment of the present invention. The content of the compound can be 1-35 mass % in a different embodiment. Furthermore, the content of the compound can be 1-30 mass % in further different embodiment. Furthermore, the content of the compound can be 1-25 mass % in further different embodiment. Furthermore, the content of the compound can be 1-22 mass % in further different embodiment. Furthermore, the content of the compound can be 1-20 mass % in further different embodiment. Furthermore, the content of the compound can be 1-10 mass % in further different embodiment. Furthermore, the content of the compound can be 1-7 mass % in further different embodiment. Furthermore, the content of the compound can be 1-5 mass % in further different embodiment.

Furthermore, the compound represented by formula (IX-2-1) is a compound represented by formula (30.1) to formula (30.4). In particular, it is preferably the compound represented by formula (30.1) to formula (30.2).

Chemical Formula 84

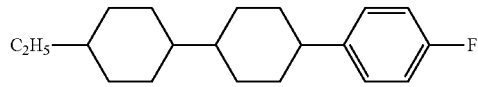

(30.1)

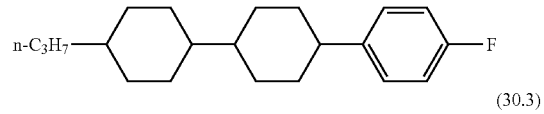

(30.2)

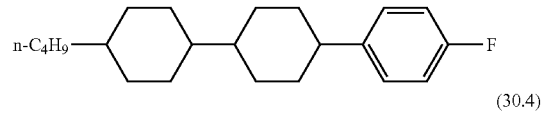

(30.3)

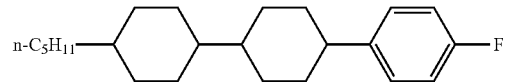

(30.4)

Furthermore, the compound represented by formula (IX-2) is preferably a compound represented by formula (IX-2-2).

Chemical Formula 85

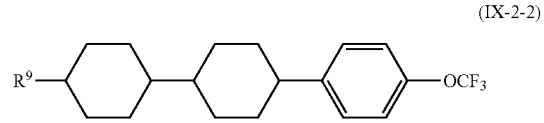

(IX-2-2)

In the formula, $R^9$ represents an alkyl group having a carbon atom number of 1-5, an alkenyl group having a carbon atom number of 2-5 or an alkoxy group having a carbon atom number 1-4.

The compounds to be combined are not in particular limited, and one to four kinds can be combined in consideration of solubility at a low temperature, transition temperature, electric reliability, and birefringence rate.

As to the content of the compound represented by formula (IX-2-2), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound 1-40 mass % in one embodiment of the present invention. The content of the compound can be 2-40 mass % in a different embodiment.

Also, for example, with respect to the total mass above, the content of the compound includes 1-40 mass % in one embodiment of the present invention. Furthermore, the content of the compound can be 1-35 mass % in another embodiment. Furthermore, the content of the compound can be 1-30 mass % in further different embodiment. Furthermore, the content of the compound can be 1-25 mass % in further different embodiment. Furthermore, the content of the compound can be 1-22 mass % in further different embodiment. Furthermore, the content of the compound can be 1-15 mass % in further different embodiment. Furthermore, the content of the compound can be 1-12 mass % in further different embodiment.

Furthermore, the compound represented by formula (IX-2-2) is preferably a compound represented by formula (31.1) to formula (31.4). In particular, it is preferable to be the compound represented by formula (31.2) to formula (31.4). Specifically, it is preferably to be the compound represented by formula (31.2).

Chemical Formula 86:

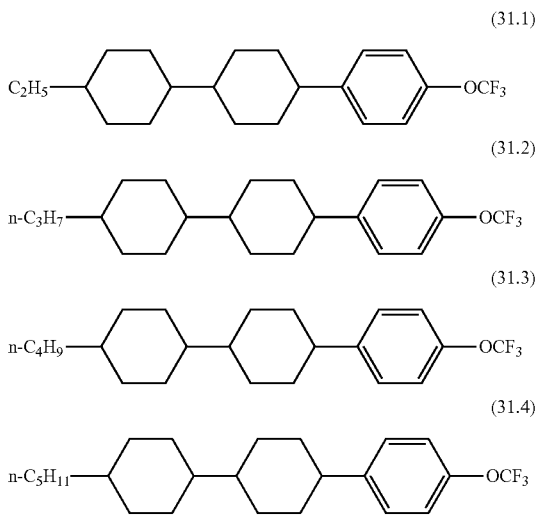

Furthermore, the compound represented by formula (IX-2) is preferably a compound represented by formula (IX-2-3).

Chemical Formula 87

(IX-2-3)

In the formula, $R^9$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate.

The content of a compound represented in a formula (IX-2-3) can be preferably 1-30 mass % with respect to the total mass of the liquid crystal composition of the present invention, in consideration of the solubility at a low temperature, transition temperature, electric reliability and birefringent rate. In particular, it is preferably 3-20 mass %; and more preferably, it is 6-15 mass %; and more preferably, it is 8-10 mass %;

Furthermore, the compound represented by formula (IX-2-3) is a compound represented by formula (32.1) to formula (32.4). In particular, it is preferably the compound represented by formula (32.2) and/or formula (32.4).

Chemical Formula 88:

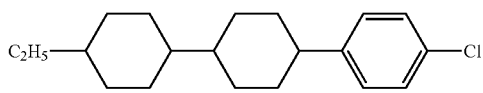
(32.1)

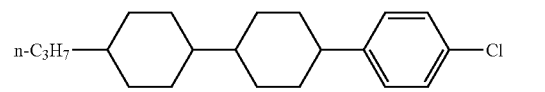
(32.2)

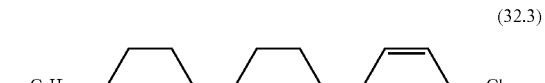
(32.3)

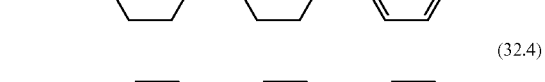
(32.4)

Furthermore, the compound represented by formula (IX-2) is preferably a compound represented by formula (IX-2-4).

Chemical Formula 89

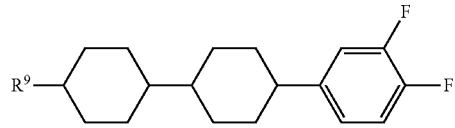
(IX-2-4)

In the formula, $R^9$ represents an alkyl group having a carbon atom number of 1-5, an alkenyl group having a carbon atom number of 2-5 or an alkoxy group having a carbon atom number 1-4.

The content of a compound represented in a formula (IX-2-4) can be preferably 1-30 mass % with respect to the total mass of the liquid crystal composition of the present invention, in consideration of the solubility at a low temperature, transition temperature, electric reliability and birefringent rate. In particular, it is preferably 3-20 mass %; and more preferably, it is 6-15 mass %; yet more preferably, it is 8-10 mass %.

Furthermore, the compound represented by formula (IX-2-4) is a compound represented by formula (33.1) to formula (33.6). In particular, it is preferably the compound represented by formula (33.1) and/or formula (33.3).

Chemical Formula 90

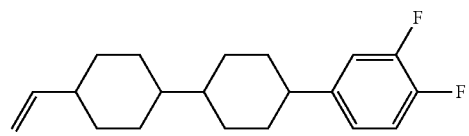
(33.1)

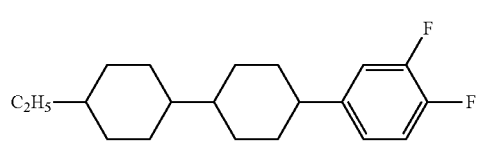
(33.2)

-continued

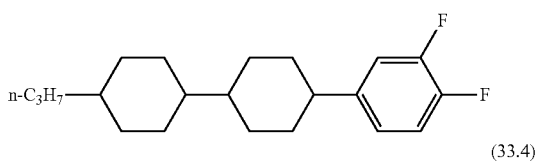
(33.3)

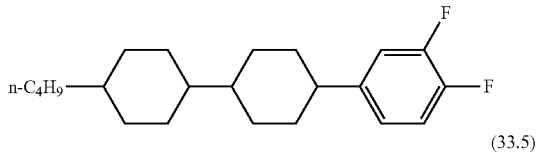
(33.4)

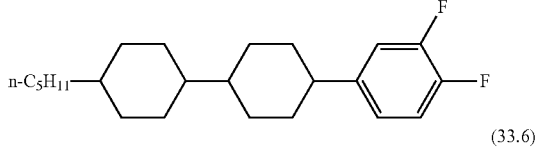
(33.5)

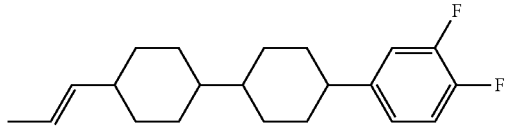
(33.6)

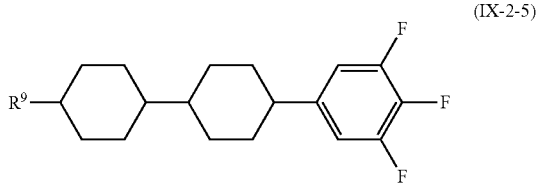

The content of a compound represented in a formula (33.3) can be preferably 1-30 mass % with respect to the total mass of the liquid crystal composition of the present invention, in consideration of the solubility at a low temperature, transition temperature, electric reliability and birefringent rate. In particular, it is preferably 5-30 mass %; and more preferably, it is 8-30 mass %;

Furthermore, the compound represented by formula (IX-2) is preferably a compound represented by formula (IX-2-5).

Chemical Formula 91

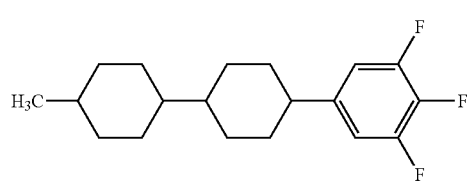
(IX-2-5)

In the formula, $R^9$ represents an alkyl group having a carbon atom number of 1-5, an alkenyl group having a carbon atom number of 2-5 or an alkoxy group having a carbon atom number 1-4.

The kinds of the compounds to be combined are not in particular limited, and can be appropriately used in accordance with the desired performances such as solubility at a low temperature, transition temperature, electric reliability, and birefringence rate. For example, one embodiment of the present invention includes one kind; another embodiment includes two kinds; yet another embodiment includes three kinds; still different embodiment includes four kinds or more.

As to the content of the compound represented by formula (IX-2-5), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound can be 4-45 mass % in one embodiment of the present invention. The content of the compound can be 8-45 mass % in another embodiment. The content of the compound can be 12-45 mass % in yet different embodiment. The content of the compound can be 21-45 mass % in yet further different embodiment. The content of the compound can be 30-45 mass % in yet further different embodiment. The content of the compound can be 31-45 mass % in yet further different embodiment. The content of the compound can be 34-45 mass % in yet further different embodiment. Also, for example, with respect to the total mass above, the content of the compound in one embodiment of the present invention can be 4-45 mass %; alternatively, the content of the compound can be 4-40 mass % in another embodiment; furthermore, the content of the compound can be 4-35 mass % in further different embodiment; furthermore, the content of the compound can be 4-32 mass % in further different embodiment; furthermore, the content of the compound can be 4-22 mass % in further different embodiment; furthermore, the content of the compound can be 4-13 mass % in further different embodiment; furthermore, the content of the compound can be 4-9 mass % in further different embodiment; furthermore, the content of the compound can be 4-8 mass % in further different embodiment; furthermore, the content of the compound can be 4-5 mass % in yet further different embodiment.

In order to maintain a low viscosity of the liquid crystal composition of the present invention as well as to accomplish a fast response of the liquid crystal composition, it is favorable that the lower limit and the upper are kept low. Furthermore, in order to maintain a high value of Tni of the liquid crystal composition of the present invention and to make the liquid crystal composition hard to burn, it is preferable that the upper limit and the lower limit are kept relatively low. Also, in order to increase the dielectric constant anisotropy to keep the drive voltage low, it is desirable that the upper limit and the lower limit are kept high.

Furthermore, the compound represented by formula (IX-2-5) is preferably a compound represented by formula (34.1) to formula (34.7). In particular, it is preferably the compound represented by formula (34.2), formula (34.3) and formula (34.5).

Chemical Formula 92

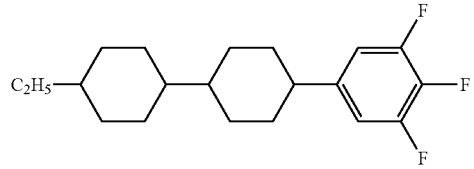
(34.1)

(34.2)

-continued

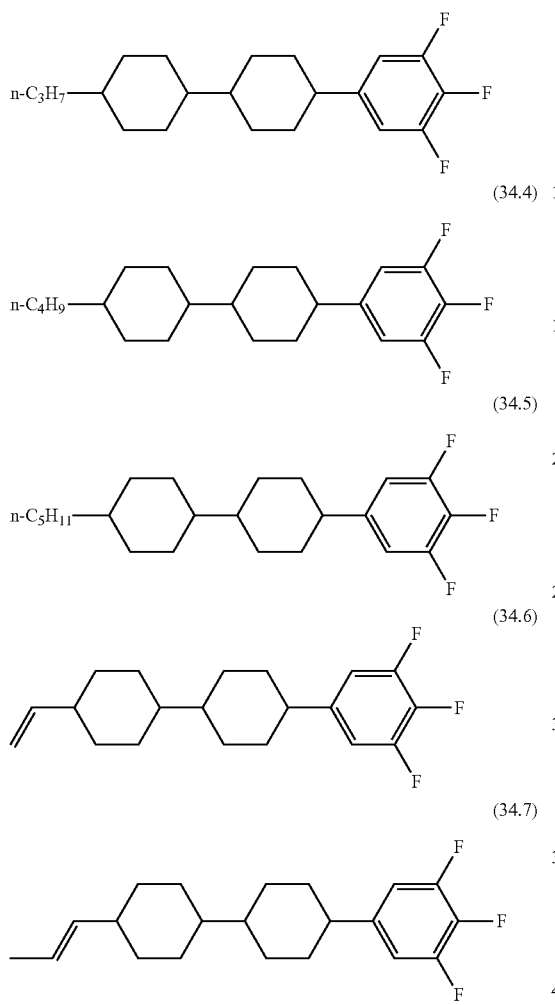

The content of a compound represented in a formula (34.2) can be preferably 1-30 mass % with respect to the total mass of the liquid crystal composition of the present invention, in consideration of the solubility at a low temperature, transition temperature, electric reliability and birefringent rate. In particular, it is preferably 5-30 mass %; and more preferably, it is 8-30 mass %;

The content of a compound represented in a formula (34.3) can be preferably 1-30 mass % with respect to the total mass of the liquid crystal composition of the present invention, in consideration of the solubility at a low temperature, transition temperature, electric reliability and birefringent rate. In particular, it is preferably 5-30 mass %; and more preferably, it is 8-30 mass %;

The content of a compound represented in a formula (34.5) can be preferably 1-30 mass % with respect to the total mass of the liquid crystal composition of the present invention, in consideration of the solubility at a low temperature, transition temperature, electric reliability and birefringent rate. In particular, it is preferably 2-20 mass %; and more preferably, it is 3-10 mass %.

Furthermore, the compound represented by formula (IX) is preferably a compound represented by formula (IX-3).

Chemical Formula 93

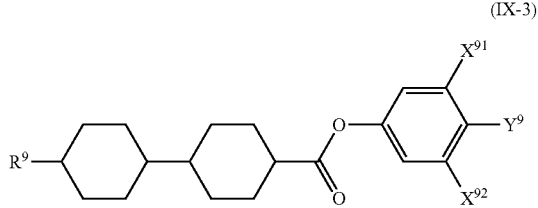

In the formula, $R^9$ represents an alkyl group having a carbon atom number of 1-5 or an alkenyl group having a carbon atom number of 2-5; each of $X^{91}$ and $X^{92}$ independently represents hydrogen atom or fluorine atom; and $Y^9$ represents fluorine atom, chlorine atom or —$OCF_3$.

Furthermore, the compound represented by formula (IX-3) is preferably a compound represented by formula (IX-3-1).

Chemical Formula 94

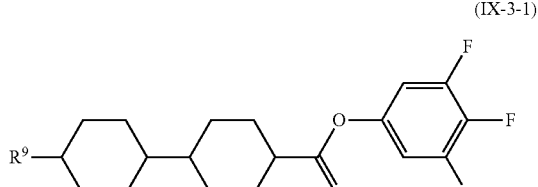

In the formula, $R^9$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate.

The content of a compound represented in a formula (IX-3-1) can be preferably 3-30 mass % with respect to the total mass of the liquid crystal composition of the present invention, in consideration of the solubility at a low temperature, transition temperature, and electric reliability. In particular, it can be preferably 7-30 mass %; and more preferably 13-20 mass %; and furthermore preferably 15-18 mass %.

Furthermore, the compound represented by formula (IX-3-1) is a compound represented by formula (35.1) to formula (35.4). In particular, it is preferably the compound represented by formula (35.1) and/or formula (35.2).

Chemical Formula 95

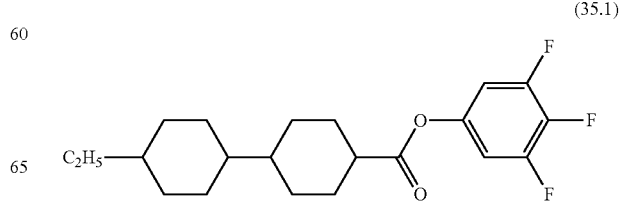

-continued (35.2)

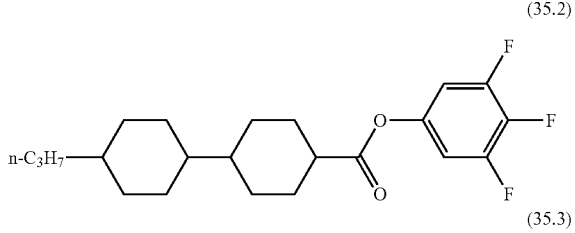

(35.3)

(35.4)

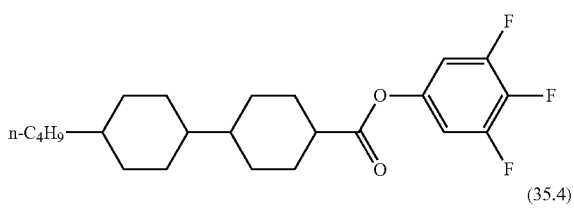

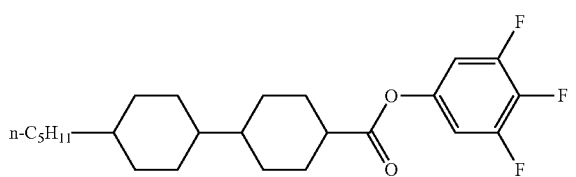

Furthermore, the compound represented by formula (M) is preferably a compound represented by formula (X).

Chemical Formula 96

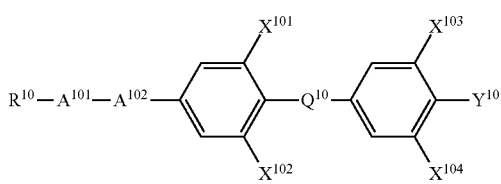

(X)

In the formula, each of $X^{101}$ to $X^{104}$ independently represents fluorine atom or hydrogen atom; $Y^{10}$ represents fluorine atom, chlorine atom, or —$OCF_3$; $Q^{10}$ represents a single bond or —$CF_2O$—; $R^{10}$ represents an alkyl group having a carbon atom number of 1-5, an alkenyl group having a carbon atom number of 2-5 or an alkoxy group having a carbon atom number 1-4; each of $A^{101}$ and $A^{102}$ independently represents 1,4-cyclohexylene group or 1,4-phenylene group, or the structure below:

Chemical Formula 97

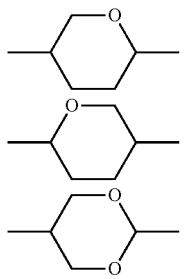

Here, the hydrogen atom on the 1,4-phenylene group can be replaced by fluorine atom.

The compounds to be combined are not in particular limited, and they can be combined in consideration of solubility at a low temperature, transition temperature, electric reliability, and birefringence rate. For example, one embodiment of the present invention includes one kind. Also, another embodiment of the present invention can include two kinds. Yet another embodiment includes three kinds. Still different embodiment includes four kinds. Still different embodiment includes five kinds or more.

As to the content of the compound represented by formula (X), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound can be 2-45 mass % in one embodiment of the present invention. Also, the content of the compound can be 3-45 mass % in another embodiment. The content of the compound can be 6-45 mass % in yet further different embodiment. The content of the compound can be 8-45 mass % in yet further different embodiment. The content of the compound can be 9-45 mass % in yet further different embodiment. The content of the compound can be 11-45 mass % in yet further different embodiment. The content of the compound can be 12-45 mass % in yet further different embodiment. The content of the compound can be 18-45 mass % in yet further different embodiment. The content of the compound can be 19-45 mass % in yet further different embodiment. The content of the compound can be 23-45 mass % in yet further different embodiment. The content of the compound can be 25-45 mass % in yet further different embodiment. Also, for example, with respect to the total mass above, the content of the compound includes 2-45 mass % in one embodiment of the present invention. The content of the compound can be 2-35 mass % in another embodiment. Furthermore, the content of the compound can be 2-30 mass % in further different embodiment. Furthermore, the content of the compound can be 2-25 mass % in further different embodiment. Furthermore, the content of the compound can be 2-20 mass % in further different embodiment. Furthermore, the content of the compound can be 2-13 mass % in further different embodiment. Furthermore, the content of the compound can be 2-9 mass % in further different embodiment. Furthermore, the content of the compound can be 2-6 mass % in further different embodiment. Furthermore, the content of the compound can be 2-3 mass % in yet further different embodiment.

In order to maintain a low viscosity of the liquid crystal composition of the present invention as well as to accomplish a fast response of the liquid crystal composition, it is favorable that the lower limit and the upper are kept relatively low. Furthermore, if requiring the liquid crystal composition to be hard to burn, it is preferable that the lower limit and the upper limit are kept relatively low. Also, in order to increase the dielectric constant anisotropy to keep the drive voltage low, it is desirable that the upper limit and the lower limit are kept relatively high.

The compound represented by formula (X) is preferably a compound represented by formula (X-1).

Chemical Formula 98

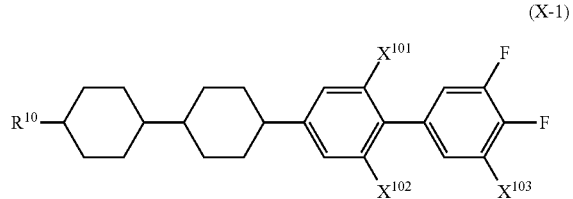

(X-1)

In the formula, each of $X^{101}$ to $X^{103}$ independently represents fluorine atom or hydrogen atom; and $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate. For example, one embodiment of the present invention includes one kind. Also, yet another embodiment of the present invention can include two kinds. Yet another embodiment includes three kinds. Still different embodiment includes four kinds. Still different embodiment includes five kinds or more.

As to the content of the compound represented by formula (X-1), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound can be 2-40 mass % in one embodiment of the present invention. The content of the compound can be 3-40 mass % in another embodiment. The content of the compound can be 5-40 mass % in yet further different embodiment. The content of the compound can be 6-40 mass % in yet further different embodiment. The content of the compound can be 7-40 mass % in yet further different embodiment. The content of the compound can be 8-40 mass % in yet further different embodiment. The content of the compound can be 9-40 mass % in yet further different embodiment. The content of the compound can be 13-40 mass % in yet further different embodiment. The content of the compound can be 18-40 mass % in yet further different embodiment. The content of the compound can be 23-40 mass % in yet further different embodiment.

Also, for example, with respect to the total mass above, the content of the compound includes 2-40 mass % in one embodiment of the present invention. The content of the compound can be 2-30 mass % in another embodiment. Furthermore, the content of the compound can be 2-25 mass % in further different embodiment. Furthermore, the content of the compound can be 2-20 mass % in further different embodiment. Furthermore, the content of the compound can be 2-15 mass % in further different embodiment. Furthermore, the content of the compound can be 2-10 mass % in further different embodiment. Furthermore, the content of the compound can be 2-6 mass % in further different embodiment. Furthermore, the content of the compound can be 2-4 mass % in yet further different embodiment.

The compound represented by formula (X-1) is preferably a compound represented by formula (X-1-1).

Chemical Formula 99

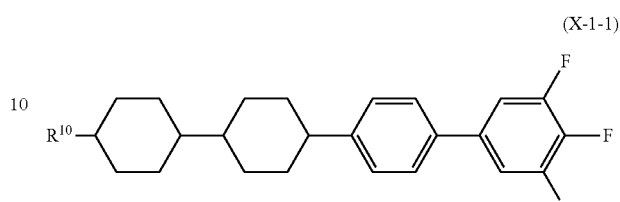

(X-1-1)

In the formula, $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate. For example, one embodiment of the present invention includes one kind. Also, yet another embodiment of the present invention can include two kinds. Yet another embodiment includes three kinds. Still different embodiment includes four kinds or more.

As to the content of the compound represented by formula (X-1-1), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound can be 3-30 mass % in one embodiment of the present invention. The content of the compound can be 4-30 mass % in another embodiment. The content of the compound can be 6-30 mass % in yet further different embodiment. The content of the compound can be 9-30 mass % in yet further different embodiment. The content of the compound can be 12-30 mass % in yet further different embodiment. The content of the compound can be 15-30 mass % in yet further different embodiment. The content of the compound can be 18-30 mass % in yet further different embodiment. The content of the compound can be 21-30 mass % in yet further different embodiment.

Also, for example, with respect to the total mass above, the content of the compound includes 3-30 mass % in one embodiment of the present invention. The content of the compound can be 3-20 mass % in another embodiment. Furthermore, the content of the compound can be 3-13 mass % in further different embodiment. Furthermore, the content of the compound can be 3-10 mass % in further different embodiment. Furthermore, the content of the compound can be 3-7 mass % in yet further different embodiment.

Furthermore, the compound represented by formula (X-1-1) is a compound represented by formula (36.1) to formula (36.4). In particular, it is preferably the compound represented by formula (36.2) and/or formula (36.4).

Chemical Formula 100

(36.1)
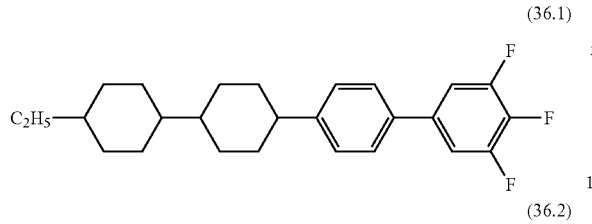

(36.2)
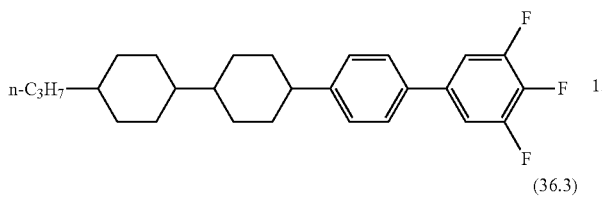

(36.3)
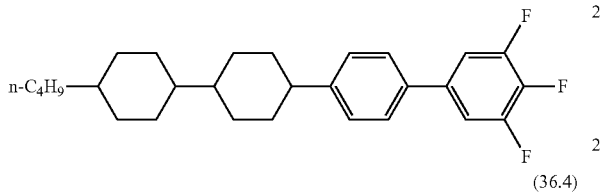

(36.4)
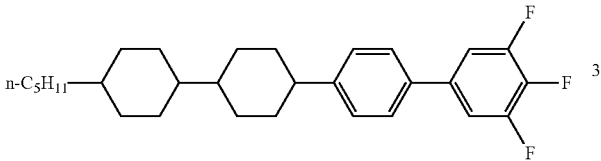

Furthermore, the compound represented by formula (X-1) is preferably a compound represented by formula (X-1-2).

Chemical Formula 101

(X-1-2)
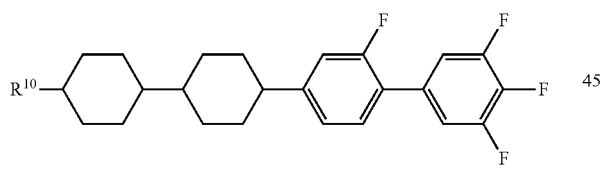

In the formula, $R^{10}$ represents an alkyl group having a carbon atom number of 1-5, an alkenyl group having a carbon atom number of 2-5 or an alkoxy group having a carbon atom number 1-4.

The content of a compound represented in a formula (X-1-2) can be preferably 1-20 mass % with respect to the total mass of the liquid crystal composition of the present invention, in consideration of the solubility at a low temperature, transition temperature, and electric reliability. In particular, it is preferably 2-16 mass %; and more preferably, it is 6-12 mass %; and more preferably, it is 6-10 mass %.

Furthermore, the compound represented by formula (X-1-2) used in the liquid crystal composition of the present invention is preferably a compound represented by formula (37.1) to formula (37.4). In particular, it is preferably the compound represented by formula (37.2).

Chemical Formula 102:

(37.1)
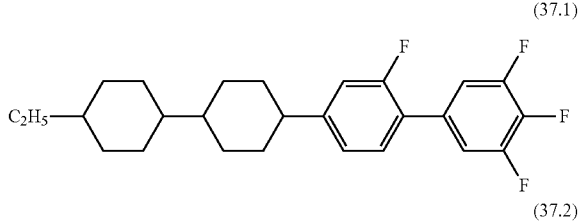

(37.2)
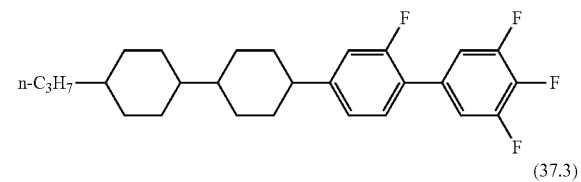

(37.3)
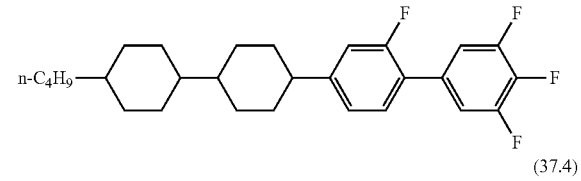

(37.4)
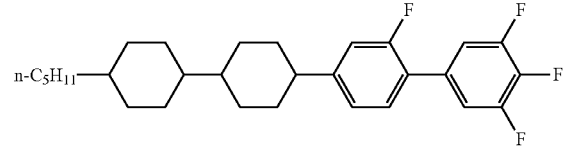

The content of a compound represented by formula (37.2) can be preferably 1-20 mass %, or less, with respect to the total mass of the liquid crystal composition of the present invention, in consideration of the solubility at a low temperature, transition temperature, and electric reliability. In particular, it can be preferably 2-15 mass %, or less; further preferably, it can be 2-10 mass %, or less; specifically, it can be preferably 2-7 mass %, or less.

Furthermore, the compound represented by formula (X-1) is preferably a compound represented by formula (X-1-3).

Chemical Formula 103:

(X-1-3)
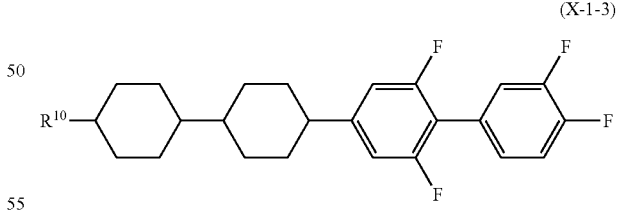

In the formula, $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate.

With respect to the total mass of the liquid crystal composition of the present invention, the content of the compound represented by formula (X-1-3) is preferably 1 mass % or more; more preferably 2 mass % more; and more preferably 6 mass % or more. In addition, in consideration of solubility at a low temperature, transition temperature, and electric reliability, the maximum ratio is preferably 20 mass % or less; and further preferably 16 mass % or less; more preferably 12 mass % or less; specifically preferably 10 mass % or less.

Furthermore, the compound represented by formula (X-1-3) used in the liquid crystal composition of the present invention is preferably a compound represented by formula (38.1) to formula (38.4). In particular, it is preferable to include the compound represented by formula (38.2).

Chemical Formula 104

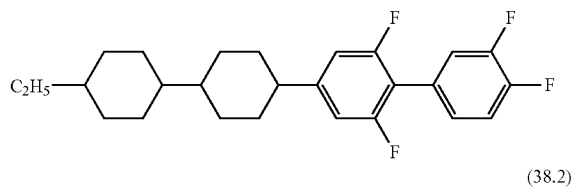
(38.1)

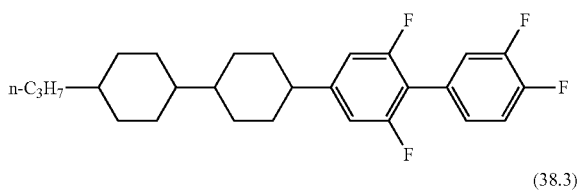
(38.2)

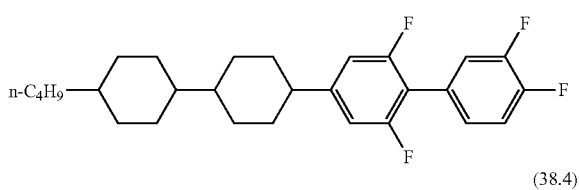
(38.3)

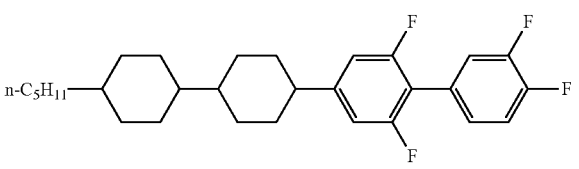
(38.4)

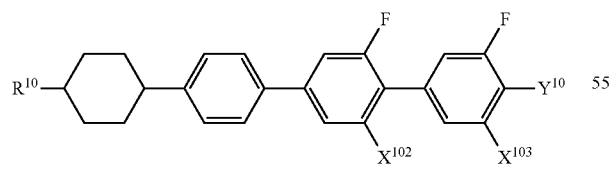

The compound represented by formula (X) is preferably a compound represented by formula (X-2).

Chemical Formula 105:

(X-2)

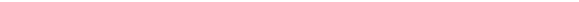

In the formula, each of $X^{102}$ and $X^{103}$ independently represents fluorine atom or hydrogen atom; $Y^{10}$ represents fluorine atom, chlorine atom, or —$OCF_3$; and $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate.

Furthermore, the compound represented by formula (X-2) used in the liquid crystal composition of the present invention is preferably a compound represented by formula (X-2-1).

Chemical Formula 106:

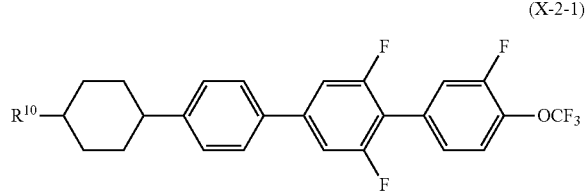
(X-2-1)

In the formula, $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to three or more kinds can be combined in consideration of solubility at a low temperature, transition temperature, electric reliability, and birefringence rate. In particular, one to three kinds can be preferably combined.

The content of a compound represented in a formula (X-2-1) can be preferably 3-20 mass % with respect to the total mass of the liquid crystal composition of the present invention, in consideration of the solubility at a low temperature, transition temperature, and electric reliability. In particular, it is preferably 6-16 mass %; and more preferably, it is 9-12 mass %; yet more preferably, it is 9-10 mass %.

Furthermore, the compound represented by formula (X-2-1) used in the liquid crystal composition of the present invention is preferably a compound represented by formula (39.1) to formula (39.4). In particular, it is preferable to include the compound represented by formula (39.2).

Chemical Formula 107

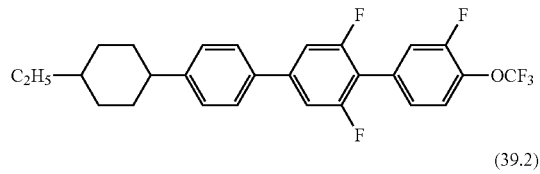
(39.1)

(39.2)
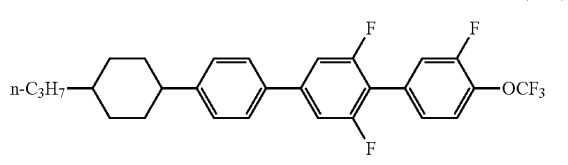

(39.3)
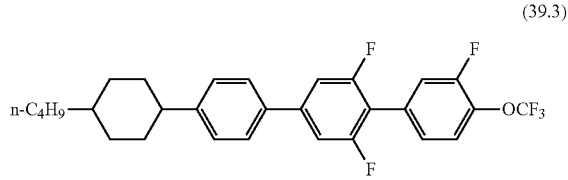

(39.4)

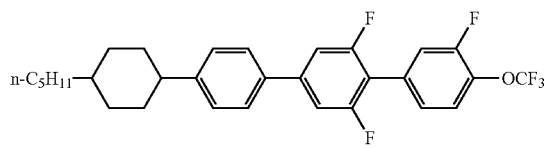

In the liquid crystal composition of the present invention, the content of the compound represented by formula (39.2) can be preferably 1-35 mass % with respect to the total mass of the liquid crystal composition of the present invention. In particular, it is preferably 2-25 mass %; and more preferably 3-20 mass %; and more preferably 3-15 mass %; and further preferably 3-10 mass %; and further preferably 4-10 mass %.

Furthermore, the compound represented by formula (X-2) is preferably a compound represented by formula (X-2-2).

Chemical Formula 108:

(X-2-2)

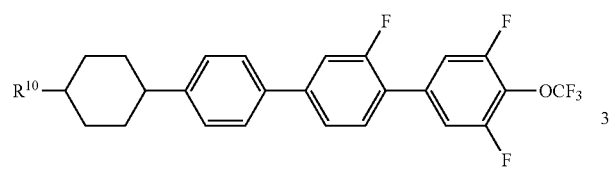

In the formula, $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two kinds can be combined in consideration of solubility at a low temperature, transition temperature, electric reliability, and birefringence rate. The content of a compound represented in a formula (X-2-2) can be preferably 3-20 mass % with respect to the total mass of the liquid crystal composition of the present invention, in consideration of the solubility at a low temperature, transition temperature, and electric reliability. In particular, it can be preferably 6-16 mass %; and more preferably 9-12 mass %; and further preferably 9-10 mass %.

Furthermore, the compound represented by formula (X-2-2) used in the liquid crystal composition of the present invention is preferably a compound represented by formula (40.1) to formula (40.4). In particular, it is preferably the compound represented by formula (40.2).

Chemical Formula 109:

(40.1)

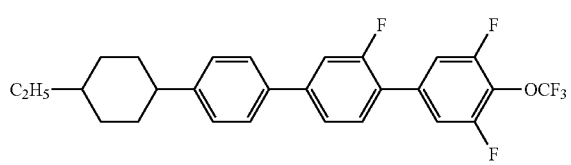

(40.2)

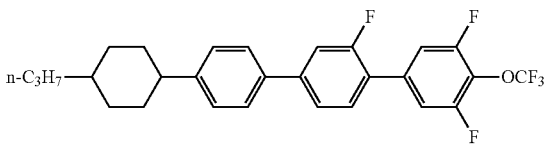

(40.3)

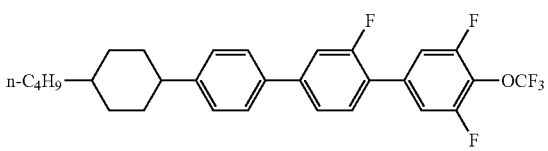

(40.4)

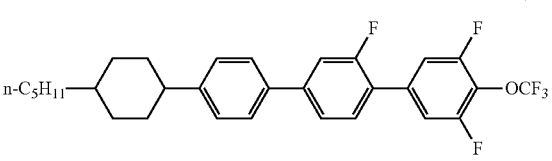

Furthermore, the compound represented by formula (X) is preferably a compound represented by formula (X-3).

Chemical Formula 110:

(X-3)

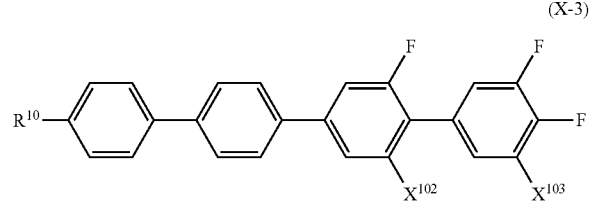

In the formula, each of $X^{102}$ and $X^{103}$ independently represents fluorine atom or hydrogen atom; and $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two or more kinds can be combined in consideration of solubility at a low temperature, transition temperature, electric reliability, and birefringence rate.

Furthermore, the compound represented by formula (X-3) used in the liquid crystal composition of the present invention is preferably a compound represented by formula (X-3-1).

Chemical Formula 111:

(X-3-1)

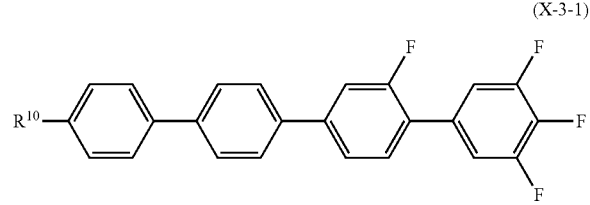

In the formula, $R^{10}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate.

With respect to the total mass of the liquid crystal composition of the present invention, the compound represented by formula (X-3-1) is preferably included at a content of 1 mass % or more; more preferably at a content of 2 mass % more; further preferably at a content of 3 mass % or more. In addition, in consideration of solubility at a low temperature, transition temperature, and electric reliability, the maximum ratio is preferably 10 mass % or less; further preferably, it can be 8 mass %; and further preferably, it can be preferably 6 mass %; and specifically, it can be preferably 4 mass %.

Furthermore, the compound represented by formula (X-3-1) used in the liquid crystal composition of the present invention is preferably a compound represented by formula (41.1) to formula (41.4). In particular, it is preferable to include the compound represented by formula (41.2).

Chemical Formula 112:

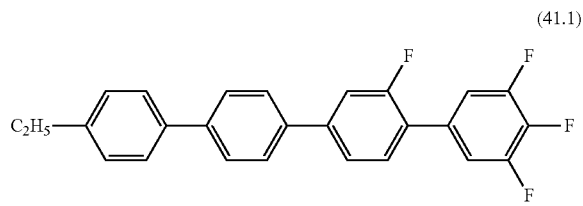

(41.1)

(41.2)

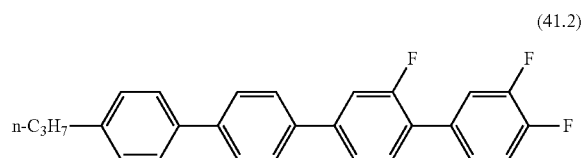

(41.3)

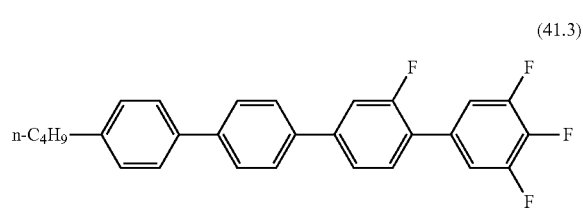

(41.4)

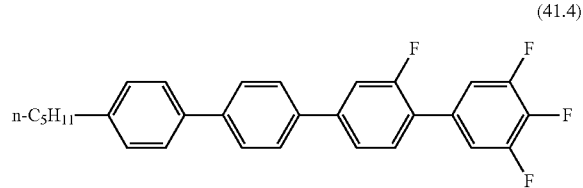

Furthermore, the compound represented by formula (X) is preferably a compound represented by formula (X-4).

Chemical Formula 113:

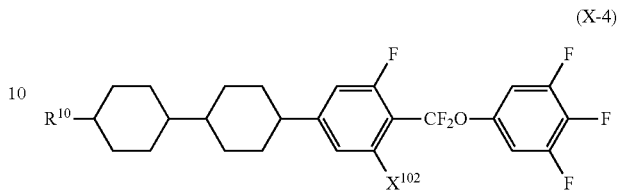

(X-4)

In the formula, $X^{102}$ represents fluorine atom or hydrogen atom; and $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two or more kinds can be combined in consideration of solubility at a low temperature, transition temperature, electric reliability, and birefringence rate. In particular, one to three kinds can be preferably combined.

Furthermore, the compound represented by formula (X-4) used in the liquid crystal composition of the present invention is preferably a compound represented by formula (X-4-1).

Chemical Formula 114:

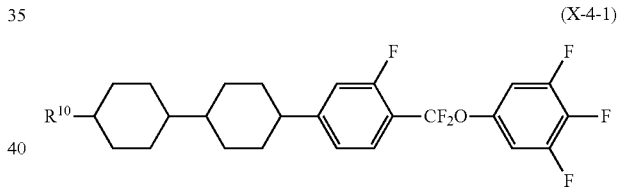

(X-4-1)

In the formula, $R^{10}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate. In particular, one to three kinds can be preferably combined.

The content of a compound represented in a formula (X-4-1) can be preferably 2-20 mass % with respect to the total mass of the liquid crystal composition of the present invention, in consideration of the solubility at a low temperature, transition temperature, and electric reliability. In particular, it can be preferably 5-17 mass %; and more preferably 10-15 mass %; and further preferably 10-13 mass %.

Furthermore, the compound represented by formula (X-4-1) used in the liquid crystal composition of the present invention is preferably a compound represented by formula (42.1) to formula (42.4). In particular, it is preferable to include the compound represented by formula (42.2).

Chemical Formula 115:

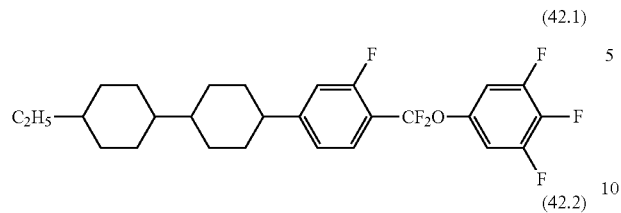

(42.1)
(42.2)
(42.3)
(42.4)

Chemical Formula 117:

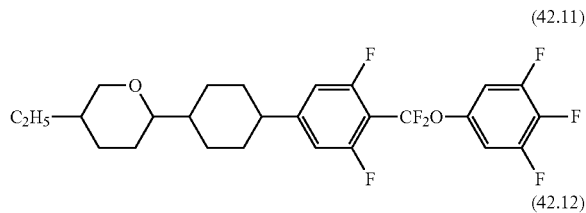

(42.11)
(42.12)
(42.13)
(42.14)

Furthermore, the compound represented by formula (X) is preferably a compound represented by formula (X-4-2).

Chemical Formula 116:

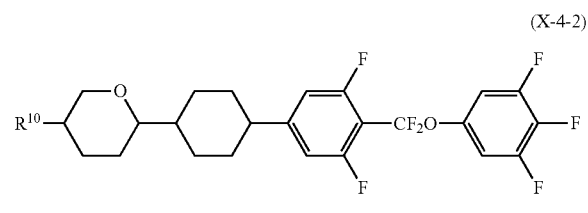

(X-4-2)

In the formula, $R^{10}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate. In particular, one to three kinds can be preferably combined.

The content of a compound represented in a formula (X-4-2) can be preferably 2-20 mass % with respect to the total mass of the liquid crystal composition of the present invention, in consideration of the solubility at a low temperature, transition temperature, and electric reliability. In particular, it can be preferably 5-17 mass %; and more preferably 10-15 mass %; and further preferably 10-13 mass %.

Furthermore, the compound represented by formula (X-4-2) used in the liquid crystal composition of the present invention is preferably a compound represented by formula (42.11) to formula (42.14). In particular, it is preferable to include the compound represented by formula (42.13) or formula (42.14).

Furthermore, the compound represented by formula (X) used in the liquid crystal composition of the present invention is preferably a compound represented by formula (X-4-3).

Chemical Formula 118

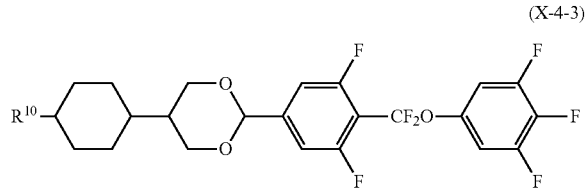

(X-4-3)

In the formula, $R^{10}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate. In particular, one to three or more kinds can be preferably combined.

The content of a compound represented in a formula (X-4-3) can be preferably 2-20 mass % with respect to the total mass of the liquid crystal composition of the present invention, in consideration of the solubility at a low temperature, transition temperature, and electric reliability. In particular, it can be preferably 5-17 mass %; and more preferably 10-15 mass %; and further preferably 10-13 mass %.

Furthermore, the compound represented by formula (X-4-3) used in the liquid crystal composition of the present invention is preferably a compound represented by formula (42.21)

to formula (42.24). In particular, it is preferable to include the compound represented by formula (42.22).

Chemical Formula 119

(42.21)

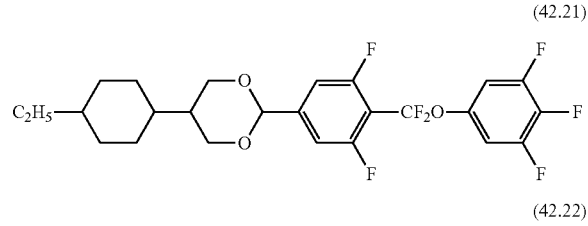

(42.22)

(42.23)

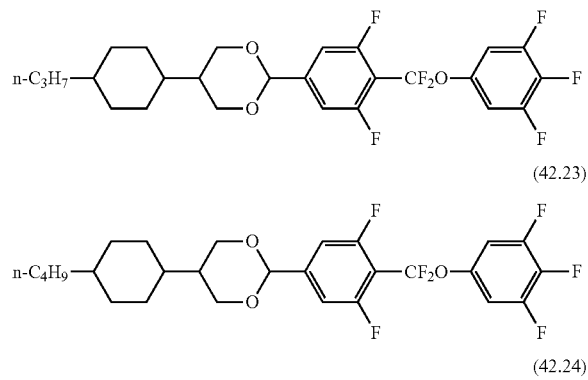

(42.24)

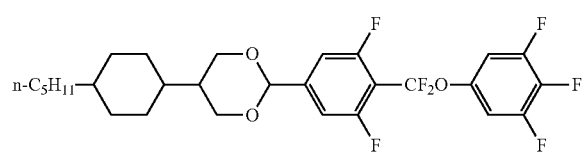

Furthermore, the compound represented by formula (X) is preferably a compound represented by formula (X-5).

Chemical Formula 120:

(X-5)

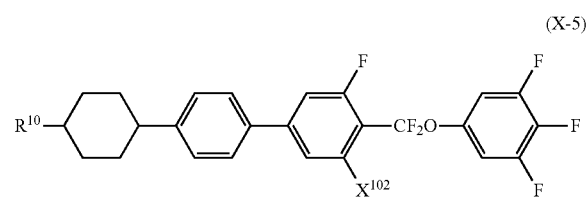

In the formula, $X^{102}$ represents fluorine atom or hydrogen atom; and $R^{10}$ represents an alkyl group having a carbon atom number of 1-5, an alkenyl group having a carbon atom number of 2-5 or an alkoxy group having a carbon atom number 1-4.

The compounds to be combined are not in particular limited, and one to two or more kinds can be combined in consideration of solubility at a low temperature, transition temperature, electric reliability, and birefringence rate. In particular, one to three or more kinds can be preferably combined.

Furthermore, the compound represented by formula (X-5) used in the liquid crystal composition of the present invention is preferably a compound represented by formula (X-5-1).

Chemical Formula 121

(X-5-1)

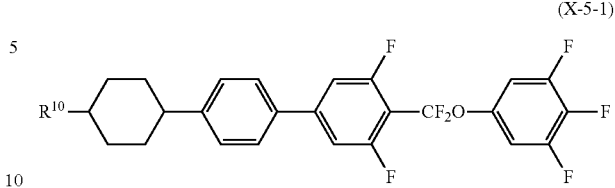

In the formula, $R^{10}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate. In particular, one to three or more kinds can be preferably combined.

Furthermore, the compound represented by formula (X-5-1) used in the liquid crystal composition of the present invention is preferably a compound represented by formula (43.1) to formula (43.4). In particular, it is preferably the compound represented by formula (43.2).

Chemical Formula 122

(43.1)

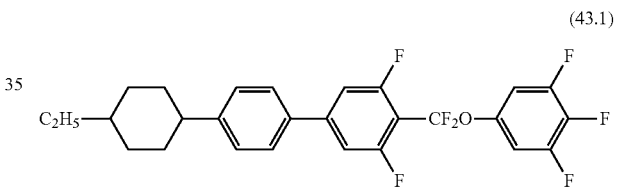

(43.2)

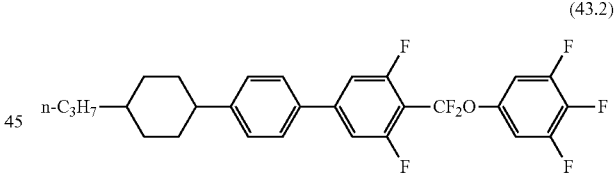

(43.3)

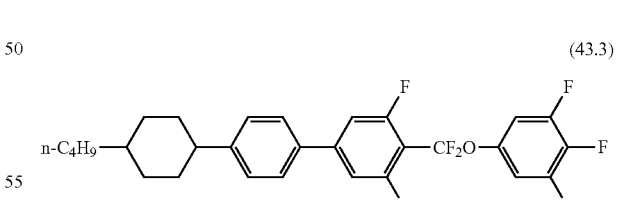

(43.4)

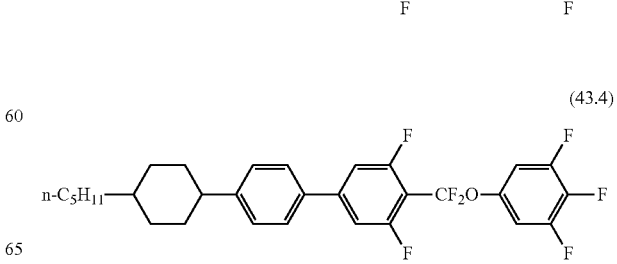

The compound represented by formula (X) is preferably a compound represented by formula (X-6).

Chemical Formula 123

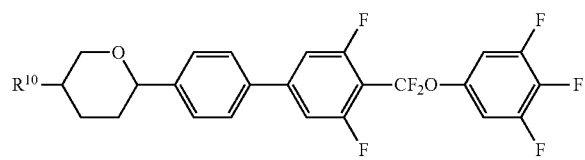

(X-6)

In the formula, $R^{10}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate.

As to the content of the compound represented by formula (X-6), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound can be 4-30 mass % in one embodiment of the present invention; and another embodiment includes 5-30 mass %; yet another embodiment includes 6-30 mass %; and yet different embodiment includes 8-30 mass %.

Also, for example, one embodiment of the present invention can include the compound at a content of 1-30 mass % with respect to the total mass of the liquid crystal composition of the present invention. Another embodiment includes 1-20 mass %, yet another embodiment includes 1-13 mass %; and further different embodiment includes 1-10 mass %.

Furthermore, the compound represented by formula (X-6) used in the liquid crystal composition of the present invention is preferably a compound represented by formula (44.1) to formula (44.4). In particular, it is preferable to include the compound represented by formula (44.1) and/or formula (44.2).

Chemical Formula 124

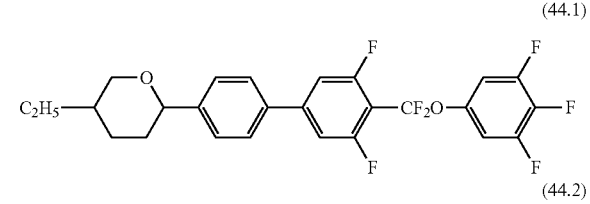

(44.1)

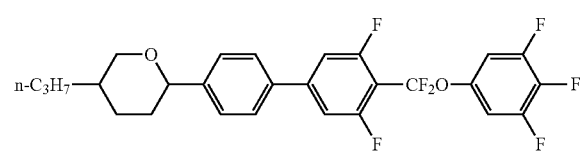

(44.2)

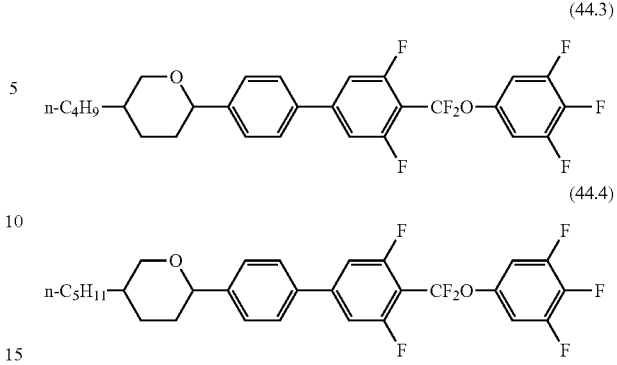

(44.3)

(44.4)

Also, the liquid crystal compound of the present invention can include a compound represented by formula (X-7), that is similar to the compound represented by formula (X).

Chemical Formula 125

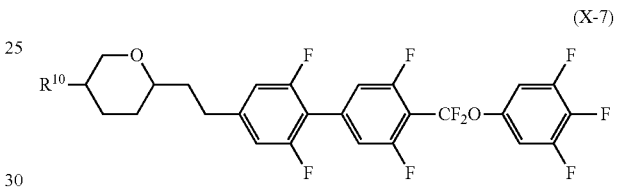

(X-7)

In the formula, $R^{10}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate.

As to the content of the compound represented by formula (X-7), there are an upper limit and a lower limit in each embodiment in consideration of the characteristics such as solubility at a low temperature, transition temperature, electric reliability, and birefringence rate.

For example, with respect to the total mass of the liquid crystal composition of the present invention, the content of the compound can be 4-30 mass % in one embodiment of the present invention. The content of the compound can be 5-30 mass % in another embodiment. The content of the compound can be 6-30 mass % in yet further different embodiment. The content of the compound can be 8-30 mass % in yet further different embodiment. The content of the compound can be 9-30 mass % in yet further different embodiment. The content of the compound can be 11-30 mass % in yet further different embodiment. The content of the compound can be 14-30 mass % in yet further different embodiment. The content of the compound can be 18-30 mass % in yet further different embodiment.

Also, for example, with respect to the total mass above, the content of the compound includes 4-30 mass % in one embodiment of the present invention. The content of the compound can be 4-20 mass % in another embodiment. Furthermore, the content of the compound can be 4-13 mass % in further different embodiment. Furthermore, the content of the compound can be 4-10 mass % in further different embodiment. Furthermore, the content of the compound can be 4-7 mass % in further different embodiment. Also, yet another embodiment can include it at a content of 3 mass %.

Furthermore, the compound represented by formula (X-7) used in the liquid crystal composition of the present invention is preferably a compound represented by formula (44.11) to formula (44.14). In particular, it is preferable to include the compound represented by formula (44.13).

Chemical Formula 126

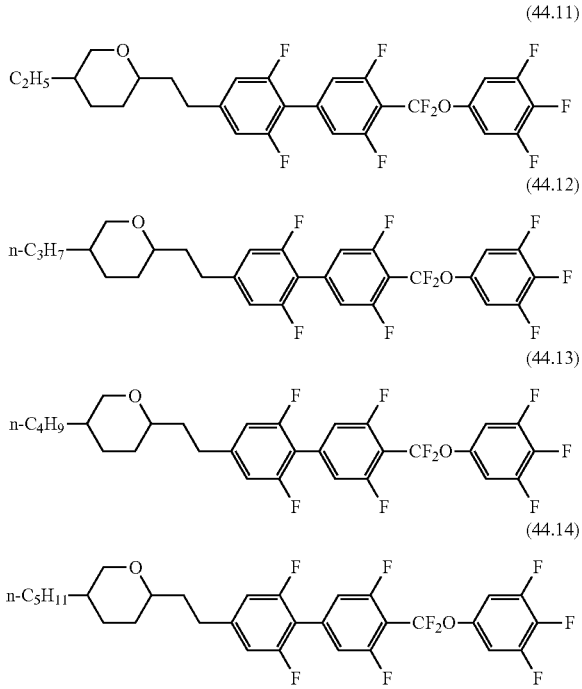

Furthermore, it is preferable that the compound represented by formula (X) is selected from the group represented by formula (XI).

Chemical Formula 127

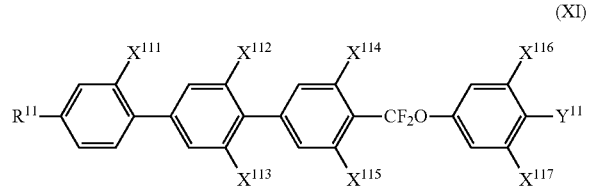

In the formula, each of $X^{111}$ to $X^{117}$ independently represents fluorine atom or hydrogen atom; and at least one of $X^{111}$ to $X^{117}$ represents fluorine atom; $R^{11}$ represents an alkyl group having a carbon atom number of 1-5, an alkenyl group having a carbon atom number of 2-5 or an alkoxy group having a carbon atom number 1-4; and $Y^{11}$ represents fluorine atom or —$OCF_3$.

The compounds to be combined are not in particular limited, and one to three or more kinds can be combined in consideration of solubility at a low temperature, transition temperature, electric reliability, and birefringence rate.

As to the content of the compound represented by formula (XI), there are an upper limit and a lower limit in each embodiment in consideration of the characteristics such as solubility at a low temperature, transition temperature, electric reliability, and birefringence rate. For example, with respect to the total mass of the liquid crystal composition of the present invention, the content of the compound can be 2-30 mass % in one embodiment of the present invention. The content of the compound can be 4-30 mass % in another embodiment. The content of the compound can be 5-30 mass % in yet further different embodiment. The content of the compound can be 7-30 mass % in yet further different embodiment. The content of the compound can be 9-30 mass % in yet further different embodiment. The content of the compound can be 10-30 mass % in yet further different embodiment. The content of the compound can be 12-30 mass % in yet further different embodiment. The content of the compound can be 13-30 mass % in yet further different embodiment. The content of the compound can be 15-30 mass % in yet further different embodiment. The content of the compound can be 18-30 mass % in yet further different embodiment.

Also, for example, with respect to the total mass above, the content of the compound includes 2-30 mass % in one embodiment of the present invention. The content of the compound can be 2-25 mass % in another embodiment. Furthermore, the content of the compound can be 2-20 mass % in further different embodiment. Furthermore, the content of the compound can be 2-15 mass % in further different embodiment. Furthermore, the content of the compound can be 2-10 mass % in further different embodiment. Furthermore, the content of the compound can be 2-5 mass % in yet further different embodiment.

When the liquid crystal composition of the present invention is applied into a liquid crystal display element with a small cell gap, it is suitable to include the compound represented by formula (XI) at a relatively large content. When it is applied into a liquid crystal display element with small drive voltage, it is suitable to include the compound represented by formula (XI) at a relatively large content. When it is applied into a liquid crystal display element used in low temperature environment, it is suitable to include the compound represented by formula (XI) at a relatively small content. When it is applied into a liquid crystal composition used into a liquid crystal display element with fast response speed, it is suitable to include the compound represented by formula (XI) at relatively small content.

Furthermore, the compound represented by formula (XI) used in the liquid crystal composition of the present invention is preferably a compound represented by formula (XI-1).

Chemical Formula 128

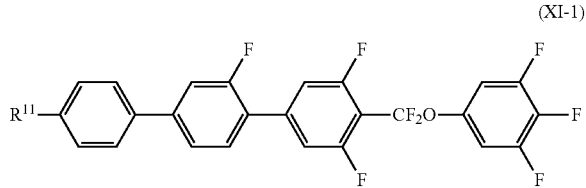

In the formula, $R^{11}$ represents an alkyl group having a carbon atom number of 1-5, an alkenyl group having a carbon atom number of 2-5 or an alkoxy group having a carbon atom number of 1-4.

The compounds to be combined are not in particular limited, and one to two kinds can be combined in consideration of solubility at a low temperature, transition temperature, electric reliability, and birefringence rate. For example, one embodiment of the present invention includes one kind; another embodiment includes two kinds; and still different embodiment includes three or more kinds.

The content of a compound represented in a formula (XI-1) can be preferably 1-20 mass % with respect to the total mass of the liquid crystal composition of the present invention, in consideration of the solubility at a low temperature, transition temperature, and electric reliability. In particular, it is preferably 3-20 mass %; and more preferably, it is 4-20 mass %; and more preferably, it is 6-15 mass %; yet more preferably, it is 9-12 mass %.

Furthermore, the compound represented by formula (XI-1) used in the liquid crystal composition of the present invention is preferably a compound represented by formula (45.1) to formula (45.4). In particular, it is preferable to include the compound represented by formula (45.2) to formula (45.4). Furthermore, it is preferable to include the compound represented by formula (45.2).

Chemical Formula 129

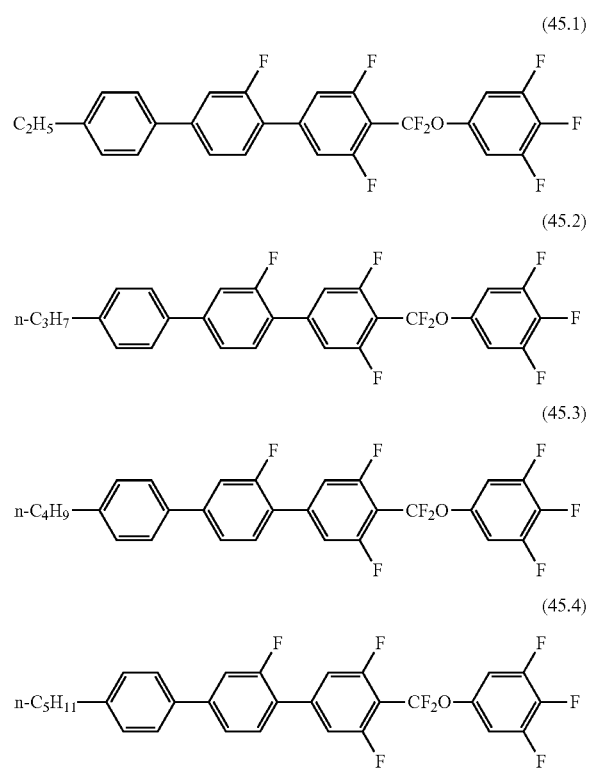

The content of a compound represented by formula (45.2) can be preferably 1-25 mass % with respect to the total mass of the liquid crystal composition of the present invention, in consideration of the solubility at a low temperature, transition temperature, electric reliability and birefringent rate. In particular, it can be preferably 2 to 20 mass %; and more preferably 2-15 mass %; and further preferably 2-10 mass %.

Furthermore, the compound represented by formula (XI) used in the liquid crystal composition of the present invention is preferably a compound represented by formula (XI-2).

Chemical Formula 130

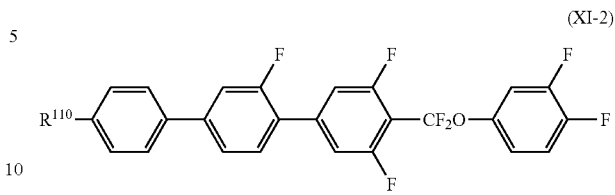

In the formula, $R^{110}$ represents an alkyl group having a carbon atom number of 1-5, an alkenyl group having a carbon atom number of 2-5 or an alkoxy group having a carbon atom number of 1-4.

The compounds to be combined are not in particular limited, and one to two kinds can be combined in consideration of solubility at a low temperature, transition temperature, electric reliability, and birefringence rate. For example, one embodiment of the present invention includes one kind; another embodiment includes two kinds; and still different embodiment includes three or more kinds.

The content of a compound represented in a formula (XI-2) can be preferably 1-20 mass % with respect to the total mass of the liquid crystal composition of the present invention, in consideration of the solubility at a low temperature, transition temperature, and electric reliability. In particular, it is preferably 3-20 mass %; and more preferably, it is 4-20 mass %; and more preferably, it is 6-15 mass %; yet more preferably, it is 9-12 mass %.

Furthermore, the compound represented by formula (XI-2) used in the liquid crystal composition of the present invention is preferably a compound represented by formula (45.11) to formula (45.14). In particular, it is preferable to include the compound represented by formula (45.12) to formula (45.14). Furthermore, it is preferable to include the compound represented by formula (45.12).

Chemical Formula 131

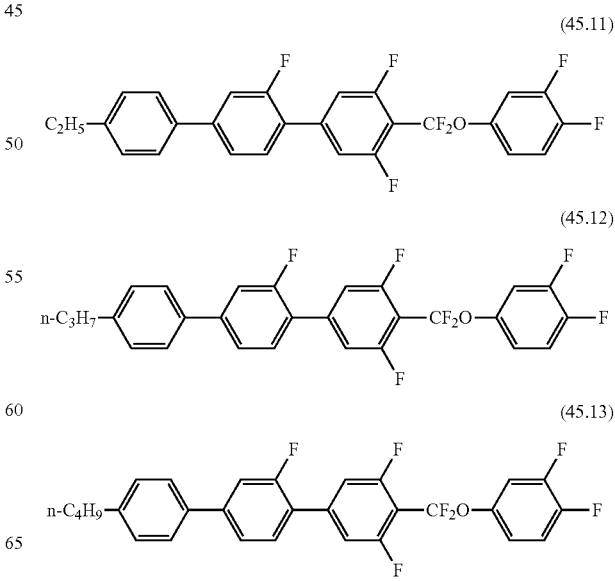

-continued (45.14)

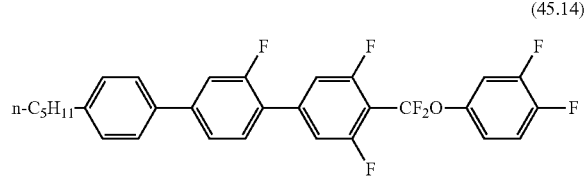

Furthermore, it is preferable that the compound represented by formula (X) is selected from the group represented by formula (XII).

Chemical Formula 132

(XII)

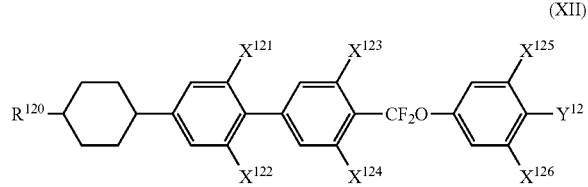

In the formula, each of $X^{121}$ to $X^{126}$ independently represents fluorine atom or hydrogen atom; $R^{120}$ represents an alkyl group having a carbon atom number of 1-5, an alkenyl group having a carbon atom number of 2-5 or an alkoxy group having a carbon atom number 1-4; and $Y^{12}$ represents fluorine atom or —$OCF_3$.

The compounds to be combined are not in particular limited, and one to three or more kinds can be combined in consideration of solubility at a low temperature, transition temperature, electric reliability, and birefringence rate. In particular, one to four or more kinds can be preferably combined.

Furthermore, the compound represented by formula (XII) used in the liquid crystal composition of the present invention is preferably a compound represented by formula (XII-1).

Chemical Formula 133

(XII-1)

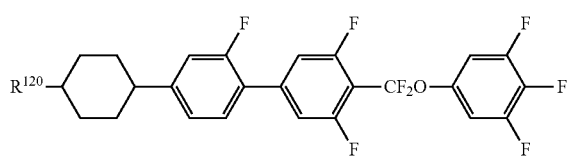

In the formula, $R^{120}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate. In particular, one to three or more kinds can be preferably combined.

The content of a compound represented in a formula (XII-1) can be preferably 1-15 mass % with respect to the total mass of the liquid crystal composition of the present invention, in consideration of the solubility at a low temperature, transition temperature, and electric reliability. In particular, it can be preferably 2-10 mass %; and more preferably 3-8 mass %; and further preferably 4-6 mass %.

Furthermore, the compound represented by formula (XII-1) used in the liquid crystal composition of the present invention is preferably a compound represented by formula (46.1) to formula (46.4). In particular, it is preferable to include the compound represented by formula (46.2) to formula (46.4).

Chemical Formula 134

(46.1)

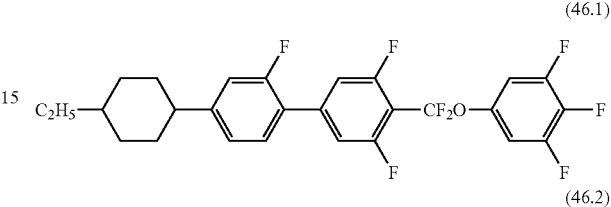

(46.2)

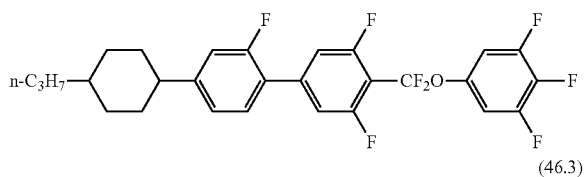

(46.3)

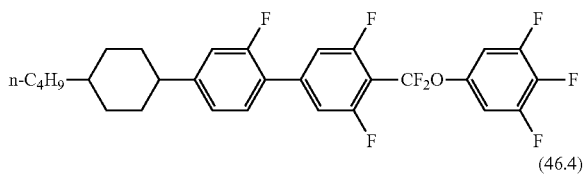

(46.4)

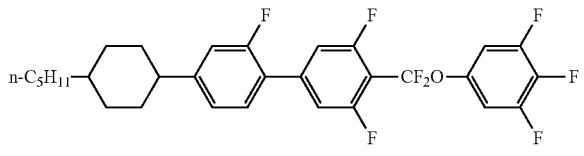

Furthermore, the compound represented by formula (XII) is preferably a compound represented by formula (XII-2).

Chemical Formula 135

(XII-2)

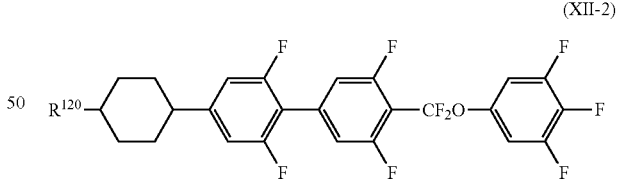

In the formula, $R^{120}$ represents an alkyl group having a carbon atom number of 1-5, an alkenyl group having a carbon atom number of 2-5 or an alkoxy group having a carbon atom number of 1-4.

The compounds to be combined are not in particular limited, and one to two or more kinds can be combined in consideration of solubility at a low temperature, transition temperature, electric reliability, and birefringence rate. In particular, one to three or more kinds can be preferably combined.

The content of a compound represented in a formula (XII-2) can be preferably 1-20 mass % with respect to the total mass of the liquid crystal composition of the present invention, in consideration of the solubility at a low temperature, transition temperature, and electric reliability. In particular, it is preferably 3-20 mass %; and more preferably, it is 4-17 mass %; and more preferably, it is 6-15 mass %; yet more preferably, it is 9-13 mass %.

Furthermore, the compound represented by formula (XII-2) used in the liquid crystal composition of the present invention is preferably a compound represented by formula (47.1) to formula (47.4). In particular, it is preferable to include the compound represented by formula (47.2) to formula (47.4).

Chemical Formula 136

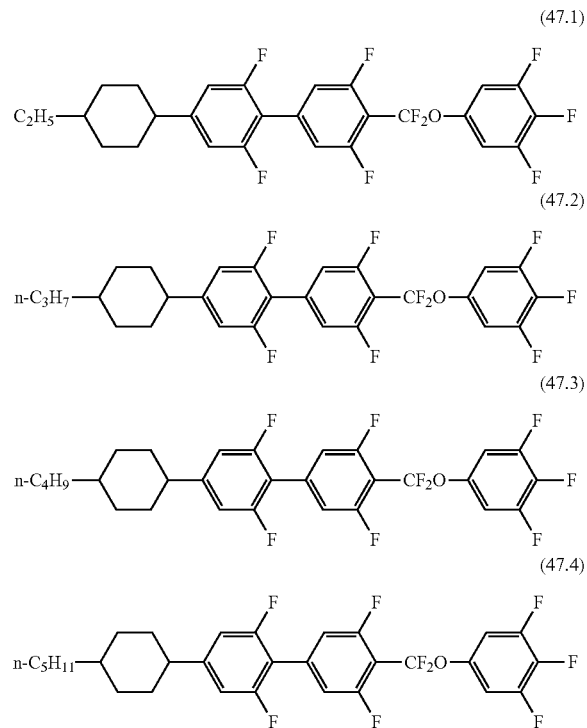

Furthermore, the compound represented by formula (M) is preferably a compound selected from the compounds represented by, for example, formula (XIII).

Chemical Formula 137

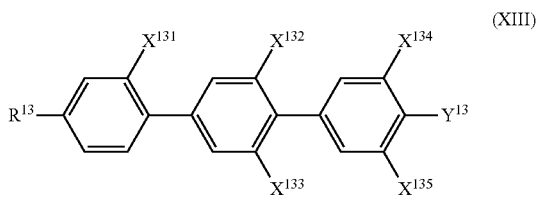

In the formula, each of $X^{131}$ to $X^{135}$ independently represents fluorine atom or hydrogen atom; and $R^{13}$ represents an alkyl group having a carbon atom number of 1-5, an alkenyl group having a carbon atom number of 2-5 or an alkoxy group having a carbon atom number 1-4; and $Y^{13}$ represents fluorine atom or —$OCF_3$. Here, the compound represented by formula (i) is excluded.

The kinds of the compounds to be combined are not particularly restricted, and one to two kinds of these compounds can be preferably used; and one to three kinds of these compounds can be more preferably used, and furthermore, one to four kinds of them can be yet more preferably used.

As to the content of the compound represented by formula (XIII), there are an upper limit and a lower limit in each embodiment in consideration of the characteristics such as solubility at a low temperature, transition temperature, electric reliability, and birefringence rate.

For example, with respect to the total mass of the liquid crystal composition of the present invention, the content of the compound can be 2-30 mass % in one embodiment of the present invention. The content of the compound can be 4-30 mass % in another embodiment. The content of the compound can be 5-30 mass % in yet further different embodiment. The content of the compound can be 7-30 mass % in yet further different embodiment. The content of the compound can be 9-30 mass % in yet further different embodiment. The content of the compound can be 11-30 mass % in yet further different embodiment. The content of the compound can be 13-30 mass % in yet further different embodiment. The content of the compound can be 14-30 mass % in yet further different embodiment. The content of the compound can be 16-30 mass % in yet further different embodiment. The content of the compound can be 20-30 mass % in yet further different embodiment.

Also, for example, with respect to the total mass above, the content of the compound includes 2-30 mass % in one embodiment of the present invention. The content of the compound can be 2-25 mass % in another embodiment. Furthermore, the content of the compound can be 2-20 mass % in further different embodiment. Furthermore, the content of the compound can be 2-15 mass % in further different embodiment. Furthermore, the content of the compound can be 2-10 mass % in further different embodiment. Furthermore, the content of the compound can be 2-5 mass % in yet further different embodiment.

When the liquid crystal composition of the present invention is applied into a liquid crystal display element with a small cell gap, it is suitable to include the compound represented by formula (XIII) at a relatively large content. When it is applied into a liquid crystal display element with small drive voltage, it is suitable to include the compound represented by formula (XIII) at a relatively large content. When it is applied into a liquid crystal display element used in low temperature environment, it is suitable to include the compound represented by formula (XIII) at a relatively small content. When it is applied into a liquid crystal composition used into a liquid crystal display element with fast response speed, it is suitable to include the compound represented by formula (XIII) at relatively small content.

Furthermore, the compound represented by formula (XIII) is preferably a compound represented by formula (XIII-1).

Chemical Formula 138

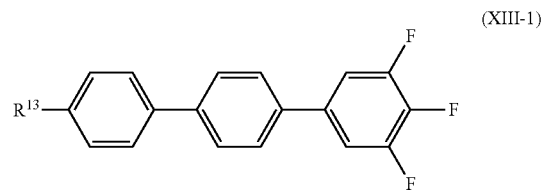

In the formula, $R^{13}$ represents an alkyl group having a carbon atom number of 1-5, an alkenyl group having a carbon atom number of 2-5 or an alkoxy group having a carbon atom number of 1-4.

With respect to the total mass of the liquid crystal composition of the present invention, the compound represented by formula (VIII-1) is preferably included at a content of 1-25 mass %; and more preferably at 3-25 mass %; and more preferably at 5-20 mass %; and further preferably at a content of 10-15 mass %.

Furthermore, the compound represented by formula (XIII-1) is a compound represented by formula (48.1) to formula (48.4). In particular, it is preferably the compound represented by formula (48.2).

Chemical Formula 139

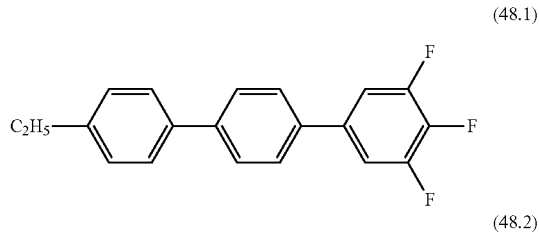

(48.1)

(48.2)

(48.3)

(48.4)

Furthermore, the compound represented by formula (XIII) is preferably a compound represented by formula (XIII-2).

Chemical Formula 140

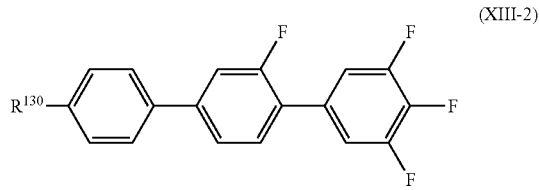

(XIII-2)

In the formula, $R^{130}$ represents an alkyl group having a carbon atom number of 1-5, an alkenyl group having a carbon atom number of 2-5 or an alkoxy group having a carbon atom number of 1-4.

The kinds of the compounds to be combined are not particularly restricted, and one to two or more kinds of these compounds can be preferably used.

With respect to the total mass of the liquid crystal composition of the present invention, the compound represented by formula (VIII-2) is preferably included at a content of 5-25 mass %; and more preferably at 6-25 mass %; and more preferably at 8-20 mass %; and further preferably at a content of 10-15 mass %.

Furthermore, the compound represented by formula (XIII-2) is a compound represented by formula (49.1) to formula (49.4). In particular, it is preferably the compound represented by formula (49.1) or formula (49.2).

Chemical Formula 141

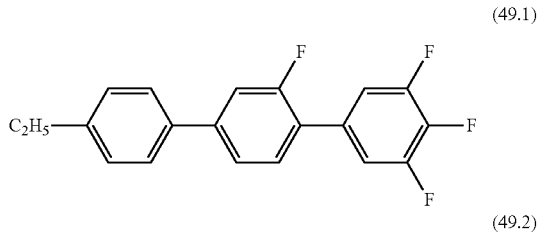

(49.1)

(49.2)

(49.3)

(49.4)

Furthermore, the compound represented by formula (XIII) is preferably a compound represented by formula (XIII-3).

Chemical Formula 142

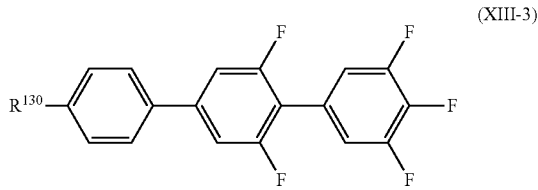

(XIII-3)

In the formula, $R^{130}$ represents an alkyl group having a carbon atom number of 1-5, an alkenyl group having a carbon atom number of 2-5 or an alkoxy group having a carbon atom number of 1-4.

The kinds of the compounds to be combined are not particularly restricted, and one to two kinds of these compounds can be preferably used.

With respect to the total mass of the liquid crystal composition of the present invention, the compound represented by formula (XIII-3) is preferably included at a content of 2-20 mass %; and further preferably at a content of 4-20 mass %; and further preferably at a content of 9-17 mass %; and further preferably at a content of 11-14 mass %.

Furthermore, the compound represented by formula (XIII-3) is a compound represented by formula (50.1) to formula (50.4). In particular, it is preferably the compound represented by formula (50.1) or formula (50.2).

Chemical Formula 143

(50.1)

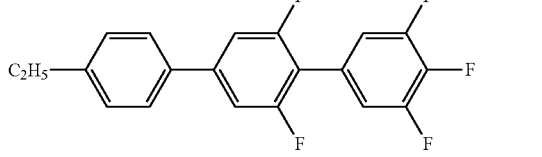
(50.2)

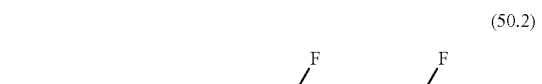
(50.3)

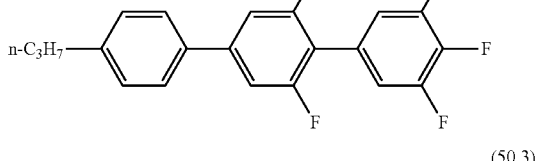
(50.4)

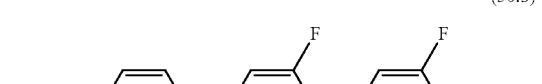

Furthermore, the compound represented by formula (M) is preferably a compound selected from the compounds represented by formula (XIV).

Chemical Formula 144

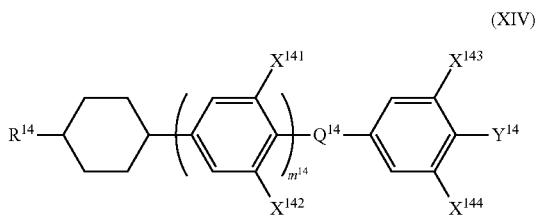
(XIV)

In the formula, $R^{14}$ represents an alkyl group having a carbon atom number of 1-5, an alkenyl group having a carbon atom number of 2-5 or an alkoxy group having a carbon atom number 1-4; each of $X^{141}$ to $X^{144}$ independently represents fluorine atom or hydrogen atom; $Y^{14}$ represents fluorine atom, chlorine atom or —$OCF_3$; $Q^{14}$ represents a single bond, —COO— or —$CF_2O$—; $m^{14}$ is 0 or 1.

The compounds to be combined are not in particular limited, but appropriately combined depending on each embodiment, in consideration of solubility at a low temperature, transition temperature, electric reliability, and birefringence rate. For example, one embodiment of the present invention includes one kind. Furthermore, another embodiment of the present invention can include two kinds. Alternatively, yet another embodiment of the present invention can include three kinds. Also, yet another embodiment of the present invention can include four kinds. Alternatively, yet another embodiment of the present invention can include five kinds. Alternatively, yet another embodiment of the present invention can include six kinds or more.

As to the content of the compound represented by formula (XIV), there are an upper limit and a lower limit in each embodiment in consideration of the characteristics such as solubility at a low temperature, transition temperature, electric reliability, and birefringence rate.

For example, with respect to the total mass of the liquid crystal composition of the present invention, the content of the compound can be 3-40 mass % in one embodiment of the present invention. The content of the compound can be 7-40 mass % in another embodiment. The content of the compound can be 8-40 mass % in yet further different embodiment. The content of the compound can be 11-40 mass % in yet further different embodiment. The content of the compound can be 12-40 mass % in yet further different embodiment. The content of the compound can be 16-40 mass % in yet further different embodiment. The content of the compound can be 18-40 mass % in yet further different embodiment. The content of the compound can be 19-40 mass % in yet further different embodiment. The content of the compound can be 22-40 mass % in yet further different embodiment. The content of the compound can be 25-40 mass % in yet further different embodiment.

Also, for example, with respect to the total mass above, the content of the compound includes 3-40 mass % in one embodiment of the present invention. The content of the compound can be 3-35 mass % in another embodiment. Furthermore, the content of the compound can be 3-30 mass % in further different embodiment. Furthermore, the content of the compound can be 3-25 mass % in further different embodiment. Furthermore, the content of the compound can be 3-20 mass % in further different embodiment. Furthermore, the content of the compound can be 3-15 mass % in yet further different embodiment.

When the liquid crystal composition of the present invention is applied into a liquid crystal display element with small drive voltage, it is suitable to add the compound represented by formula (XIV) at a relatively large content. When it is applied into a liquid crystal composition used into a liquid crystal display element with fast response speed, it is suitable to include the compound represented by formula (XIV) at relatively small content.

Furthermore, the compound represented by formula (XIV) is preferably a compound represented by formula (XIV-1).

Chemical Formula 145

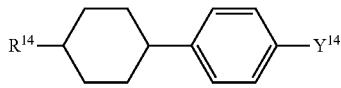
(XIV-1)

In the formula, $R^{14}$ represents an alkyl group having a carbon atom number of 1-7, an alkenyl group having a carbon atom number of 2-7 or an alkoxy group having a carbon atom number 1-7; and $Y^{14}$ represents fluorine atom, chlorine atom or —$OCF_3$.

The compounds to be combined are not in particular limited, and one to three kinds can be combined in consideration of solubility at a low temperature, transition temperature, electric reliability, and birefringence rate.

Furthermore, the compound represented by formula (XIV-1) is preferably a compound represented by formula (XIV-1-1).

Chemical Formula 146

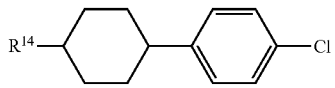
(XIV-1-1)

In the formula, $R^{14}$ represents an alkyl group having a carbon atom number of 1-7, an alkenyl group having a carbon atom number of 2-7 or an alkoxy group having a carbon atom number 1-7.

With respect to the total mass of the liquid crystal composition of the present invention, the content of the compound represented by formula (XIV-1) is preferably 2 mass % or more; more preferably 4 mass % more; and further preferably 7 mass % or more; and furthermore preferably 10 mass % or more; and specifically preferably 18 mass % or more. In addition, in consideration of solubility at a low temperature, transition temperature, and electric reliability, the maximum ratio is preferably 30 mass % or less; further preferably 27 mass % or less; furthermore preferably 24 mass % or less; and specifically preferably less than 21 mass %.

Furthermore, the compound represented by formula (XIV-1-1) used in the liquid crystal composition of the present invention is preferably a compound represented by formula (51.1) to formula (51.4). In particular, it is preferable to include the compound represented by formula (51.1).

Chemical Formula 147

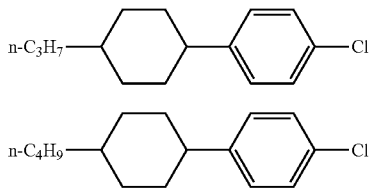
(51.1)

(51.2)

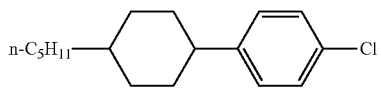
(51.3)

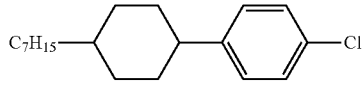
(51.4)

Furthermore, the compound represented by formula (XIV) is preferably a compound represented by formula (XIV-1-2).

Chemical Formula 148

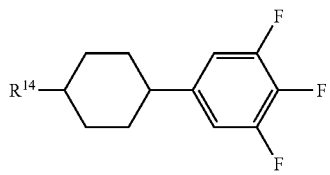
(XIV-1-2)

In the formula, $R^{14}$ represents an alkyl group having a carbon atom number of 1-7, an alkenyl group having a carbon atom number of 2-7 or an alkoxy group having a carbon atom number 1-7.

The content of a compound represented in a formula (XIV-1-2) can be preferably 1-15 mass % with respect to the total mass of the liquid crystal composition of the present invention, in consideration of the solubility at a low temperature, transition temperature, and electric reliability. In particular, it is preferably 3-13 mass %; and more preferably, it is 5-11 mass %; specifically, it is preferably 7-9 mass %.

Furthermore, the compound represented by formula (XIV-1-2) used in the liquid crystal composition of the present invention is preferably a compound represented by formula (52.1) to formula (52.4). In particular, it is preferable to include the compound represented by formula (52.4).

Chemical Formula 149

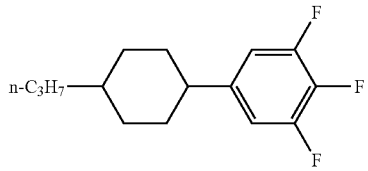
(52.1)

(52.2)

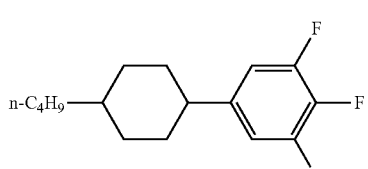
(52.3)

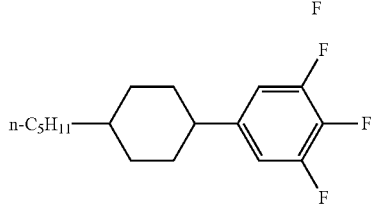

-continued

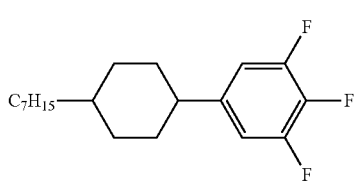

(52.4)

Furthermore, the compound represented by formula (XIV) is preferably a compound represented by formula (XIV-2).

Chemical Formula 150

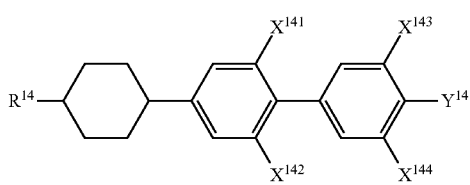

(XIV-2)

In the formula, $R^{14}$ represents an alkyl group having a carbon atom number of 1-5, an alkenyl group having a carbon atom number of 2-5 or an alkoxy group having a carbon atom number 1-4; each of $X^{141}$ to $X^{144}$ independently represents fluorine atom or hydrogen atom; and and $Y^{14}$ represents fluorine atom, chlorine atom or —OCF$_3$.

The compounds to be combined are not in particular limited, but appropriately combined depending on each embodiment, in consideration of solubility at a low temperature, transition temperature, electric reliability, and birefringence rate. For example, one embodiment of the present invention includes one kind. Furthermore, another embodiment of the present invention can include two kinds. Alternatively, yet another embodiment of the present invention can include three kinds. Also, yet another embodiment of the present invention can include four kinds. Alternatively, yet another embodiment of the present invention can include five kinds or more.

As to the content of the compound represented by formula (XIV-2), there are an upper limit and a lower limit in each embodiment in consideration of the characteristics such as solubility at a low temperature, transition temperature, electric reliability, and birefringence rate.

For example, with respect to the total mass of the liquid crystal composition of the present invention, the content of the compound can be 3-40 mass % in one embodiment of the present invention. The content of the compound can be 7-40 mass % in another embodiment. The content of the compound can be 8-40 mass % in yet further different embodiment. The content of the compound can be 10-40 mass % in yet further different embodiment. The content of the compound can be 11-40 mass % in yet further different embodiment. The content of the compound can be 12-40 mass % in yet further different embodiment. The content of the compound can be 18-40 mass % in yet further different embodiment. The content of the compound can be 19-40 mass % in yet further different embodiment. The content of the compound can be 21-40 mass % in yet further different embodiment. The content of the compound can be 22-40 mass % in yet further different embodiment.

Also, for example, with respect to the total mass above, the content of the compound includes 3-40 mass % in one embodiment of the present invention. The content of the compound can be 3-35 mass % in another embodiment. Furthermore, the content of the compound can be 3-25 mass % in further different embodiment. Furthermore, the content of the compound can be 3-20 mass % in further different embodiment. Furthermore, the content of the compound can be 3-15 mass % in further different embodiment. Furthermore, the content of the compound can be 3-10 mass % in yet further different embodiment.

When the liquid crystal composition of the present invention is applied into a liquid crystal display element with small drive voltage, it is suitable to add the compound represented by formula (XIV-2) at a relatively large content. When it is applied into a liquid crystal composition used into a liquid crystal display element with fast response speed, it is suitable to include the compound represented by formula (XIV-2) at relatively small content.

Furthermore, the compound represented by formula (XIV-2) is preferably a compound represented by formula (XIV-2-1).

Chemical Formula 151

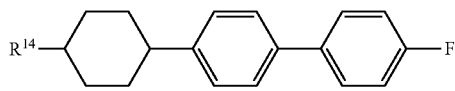

(XIV-2-1)

In the formula, $R^{14}$ represents an alkyl group having a carbon atom number of 1-5, an alkenyl group having a carbon atom number of 2-5 or an alkoxy group having a carbon atom number of 1-4.

The content of a compound represented in a formula (XIV-2-1) can be preferably 1-15 mass % with respect to the total mass of the liquid crystal composition of the present invention, in consideration of the solubility at a low temperature, transition temperature, and electric reliability. In particular, it is preferably 3-13 mass %; and more preferably, it is 5-11 mass %; specifically, it is preferably 7-9 mass %.

Furthermore, the compound represented by formula (XIV-2-1) used in the liquid crystal composition of the present invention is preferably a compound represented by formula (53.1) to formula (53.4). In particular, it is preferable to include the compound represented by formula (53.4).

Chemical Formula 152

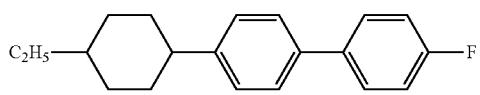

(53.1)

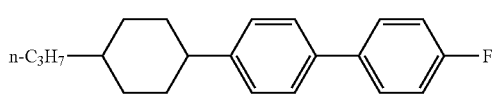

(53.2)

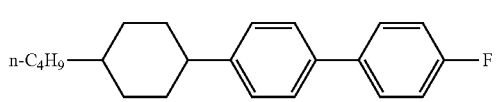

(53.3)

-continued (53.4)

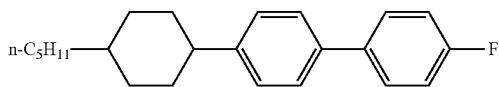

Furthermore, the compound represented by formula (XIV-2) is preferably a compound represented by formula (XIV-2-2).

Chemical Formula 153

(XIV-2-2)

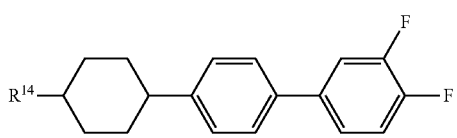

In the formula, $R^{14}$ represents an alkyl group having a carbon atom number of 1-5, an alkenyl group having a carbon atom number of 2-5 or an alkoxy group having a carbon atom number of 1-4.

The content of a compound represented in a formula (XIV-2-2) can be preferably 3-20 mass % with respect to the total mass of the liquid crystal composition of the present invention, in consideration of the solubility at a low temperature, transition temperature, and electric reliability. In particular, it is preferably 6-17 mass %; and more preferably, it is 9-15 mass %; specifically, it is preferably 12-14 mass %.

Furthermore, the compound represented by formula (XIV-2-2) used in the liquid crystal composition of the present invention is preferably a compound represented by formula (54.1) to formula (54.4). In particular, it is preferable to include the compound represented by formula (54.2) and/or formula (54.4).

Chemical Formula 154

(54.1)

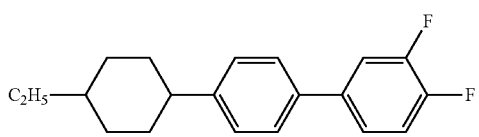

(54.2)

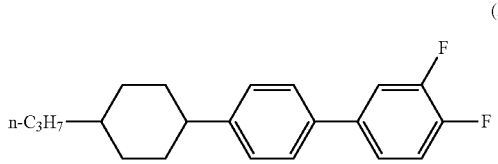

(54.3)

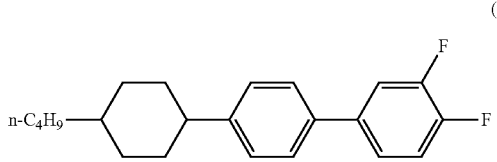

-continued (54.4)

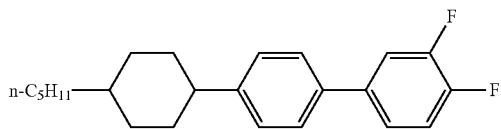

Furthermore, the compound represented by formula (XIV-2) is preferably a compound represented by formula (XIV-2-3).

Chemical Formula 155

(XIV-2-3)

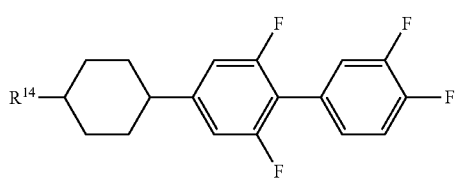

In the formula, $R^{14}$ represents an alkyl group having a carbon atom number of 1-5, an alkenyl group having a carbon atom number of 2-5 or an alkoxy group having a carbon atom number of 1-4.

The content of a compound represented in a formula (XIV-2-3) can be preferably 5-30 mass % with respect to the total mass of the liquid crystal composition of the present invention, in consideration of the solubility at a low temperature, transition temperature, and electric reliability. In particular, it is preferably 9-27 mass %; and more preferably, it is 12-24 mass %; specifically, it is preferably 12-20 mass %.

Furthermore, the compound represented by formula (XIV-2-3) used in the liquid crystal composition of the present invention is preferably a compound represented by formula (55.1) to formula (55.4). In particular, it is preferable to include the compound represented by formula (55.2) and/or formula (55.4).

Chemical Formula 156

(55.1)

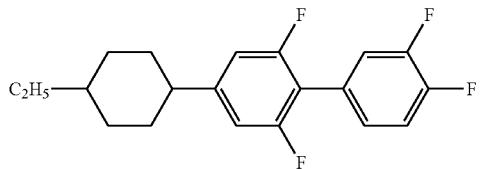

(55.2)

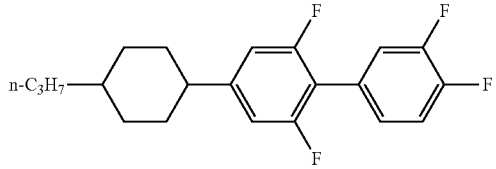

(55.3)

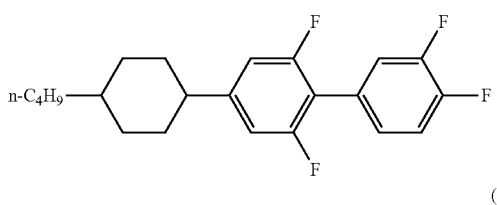

(55.4)

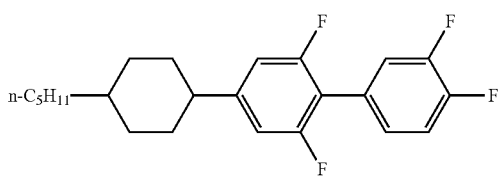

Furthermore, the compound represented by formula (XIV-2) is preferably a compound represented by formula (XIV-2-4).

Chemical Formula 157

(XIV-2-4)

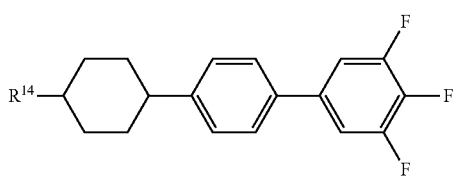

In the formula, $R^{14}$ represents an alkyl group having a carbon atom number of 1-5, an alkenyl group having a carbon atom number of 2-5 or an alkoxy group having a carbon atom number of 1-4.

The compounds to be combined are not in particular limited, but appropriately combined depending on each embodiment, in consideration of solubility at a low temperature, transition temperature, electric reliability, and birefringence rate. For example, one embodiment of the present invention includes one kind. Furthermore, another embodiment of the present invention can include two kinds. Alternatively, yet another embodiment of the present invention can include three kinds or more.

As to the content of the compound represented by formula (XIV-2-4), there are an upper limit and a lower limit in each embodiment in consideration of the characteristics such as solubility at a low temperature, transition temperature, electric reliability, and birefringence rate.

For example, with respect to the total mass of the liquid crystal composition of the present invention, the content of the compound can be 2-35 mass % in one embodiment of the present invention. The content of the compound can be 5-35 mass % in another embodiment. The content of the compound can be 8-35 mass % in yet further different embodiment. The content of the compound can be 9-35 mass % in yet further different embodiment. The content of the compound can be 10-35 mass % in yet further different embodiment. The content of the compound can be 18-35 mass % in yet further different embodiment. The content of the compound can be 21-35 mass % in yet further different embodiment. The content of the compound can be 22-35 mass % in yet further different embodiment. The content of the compound can be 24-35 mass % in yet further different embodiment.

Also, for example, with respect to the total mass above, the content of the compound includes 2-35 mass % in one embodiment of the present invention. The content of the compound can be 2-30 mass % in another embodiment. Furthermore, the content of the compound can be 2-25 mass % in further different embodiment. Furthermore, the content of the compound can be 2-20 mass % in further different embodiment. Furthermore, the content of the compound can be 2-15 mass % in further different embodiment. Furthermore, the content of the compound can be 2-10 mass % in yet further different embodiment.

When the liquid crystal composition of the present invention is applied into a liquid crystal display element with small drive voltage, it is suitable to add the compound represented by formula (XIV-2-4) at a relatively large content. When it is applied into a liquid crystal composition used into a liquid crystal display element with fast response speed, it is suitable to include the compound represented by formula (XIV-2-4) at relatively small content.

Furthermore, the compound represented by formula (XIV-2-4) used in the liquid crystal composition of the present invention is preferably a compound represented by formula (56.1) to formula (56.4). In particular, it is preferable to include the compound represented by formula (56.1), formula (56.2) or formula (56.4).

Chemical Formula 158

(56.1)

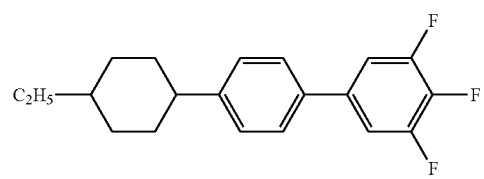

(56.2)

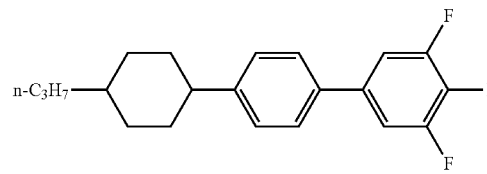

(56.3)

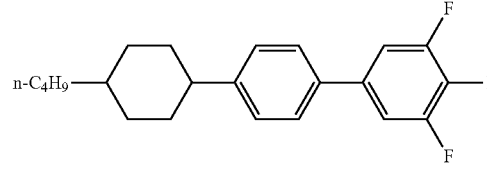

(56.4)

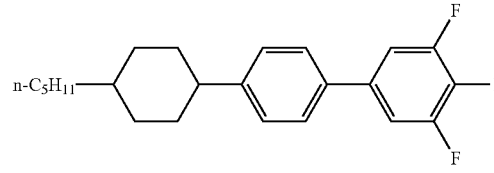

The content of a compound represented in a formula (56.2) can be preferably 3-20 mass % with respect to the total mass of the liquid crystal composition of the present invention, in consideration of the solubility at a low temperature, transition temperature, electric reliability and birefringent rate. In particular, it is preferably 6-17 mass %; and more preferably, it is 7-15 mass %; specifically, it is preferably 8-14 mass %.

Furthermore, the compound represented by formula (XIV-2) is preferably a compound represented by formula (XIV-2-5).

Chemical Formula 159

(XIV-2-5)

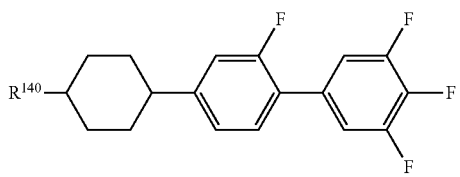

In the formula, $R^{140}$ represents an alkyl group having a carbon atom number of 1-5, an alkenyl group having a carbon atom number of 2-5 or an alkoxy group having a carbon atom number of 1-4.

The content of a compound represented in a formula (XIV-2-5) can be preferably 5-25 mass % with respect to the total mass of the liquid crystal composition of the present invention, in consideration of the solubility at a low temperature, transition temperature, and electric reliability. In particular, it is preferably 10-22 mass %; and more preferably, it is 13-18 mass %; specifically, it is preferably 13-15 mass %.

Furthermore, the compound represented by formula (XIV-2-5) is specifically a compound represented by formula (57.1) to formula (57.4). In particular, it is preferably the compound represented by formula (57.1).

Chemical Formula 160

(57.1)

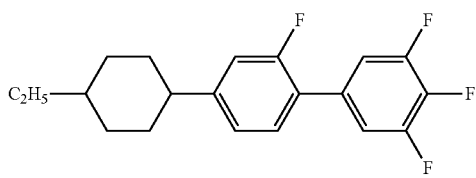

(57.2)

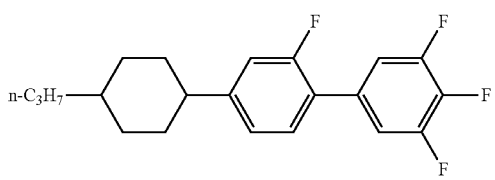

(57.3)

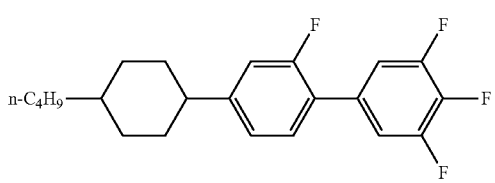

(57.4)

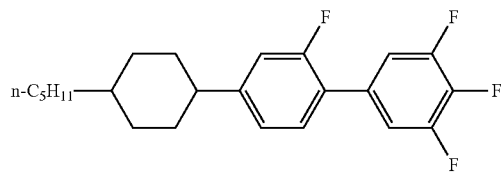

Furthermore, the compound represented by formula (XIV-2) is preferably a compound represented by formula (XIV-2-6).

Chemical Formula 161

(XIV-2-6)

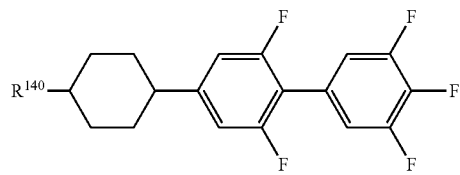

In the formula, $R^{140}$ represents an alkyl group having a carbon atom number of 1-5, an alkenyl group having a carbon atom number of 2-5 or an alkoxy group having a carbon atom number of 1-4.

The content of a compound represented in a formula (XIV-2-6) can be preferably 5 mass % or more, and 25 mass % or less, with respect to the total mass of the liquid crystal composition of the present invention, in consideration of the solubility at a low temperature, transition temperature, and electric reliability. In particular, it is 10 mass % or more, and 22 mass % or less; furthermore, it is 15 mass % or more, and 20 mass % or less; specifically preferably, it is 15 mass % or more, and 17 mass % or less.

Furthermore, the compound represented by formula (XIV-2-6) used in the liquid crystal composition of the present invention is preferably a compound represented by formula (58.1) to formula (58.4). In particular, it is preferable to include the compound represented by formula (58.2).

Chemical Formula 162

(58.1)

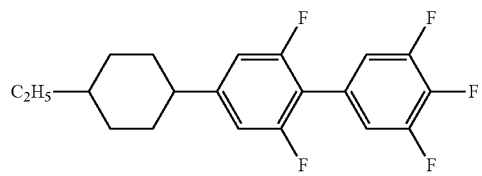

(58.2)

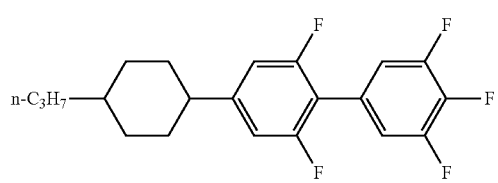

-continued

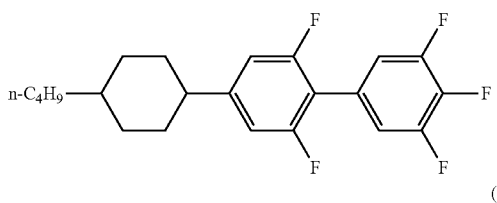

(58.3)

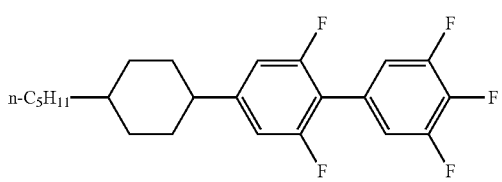

(58.4)

The liquid crystal composition of the present invention preferably use at least ten kinds among the compounds represented by formula (1.3), formula (1.1), formula (28.3), formula (37.2), formula (2.4), formula (28.5), formula (56.2), formula (34.3), formula (34.2), formula (54.2), formula (34.5), formula (13.3), formula (i-1-1.1), formula (i-1-1.2) and formula (ii-1.3). In particular, it is preferable to use more than twelve kinds, and more preferably to use more than 14 kinds. When using the compound selected from the compound group above, the content of the total of the compounds is preferably 85 mass % or more with respect to the total mass of the liquid crystal composition of the present invention. In particular, it is preferably 90 mass % or more, and more preferably 95 mass % or more, and more preferably 98 mass % or more, and still more preferably 99 mass % or more. The liquid crystal composition of the present invention preferably does not include a compound having a structure in which oxygen atoms connect to each other like a peroxy acid structure (—CO—OO—) in the molecule.

When giving weight on the reliability and the long-term stability of the liquid crystal composition, the content of the compound having carbonyl group is preferably 5 mass % or less, and more favorably 3 mass % or less, and yet more favorably 1 mass % or less, and more preferably it is not substantially included.

When giving weight on the stability by UV irradiation, the content of the compound in which chlorine atom is substituted is 15 mass % or less, and more favorably 10 mass % or less, and more favorably 5 mass % or less, and more preferably it is not substantially included.

It is preferable that the content of the compound in which all the intramolecular ring structure is a 6-membered ring is as much as possible. The content of the compound in which all the intramolecular ring structure is a 6-membered ring is preferably 80 mass % or more; and more preferably 90 mass % or more; and more preferably 95 mass % or more; and yet preferably the liquid crystal composition is constituted substantially only by the compound in which all the intramolecular ring structure is a 6-membered ring.

In order to suppress the deterioration caused by oxidation of the liquid crystal composition, it is preferable that the content of the compound having a cyclohexenylene group as a ring structure as little as possible. The content of the compound having a cyclohexenylene group is preferably 10 mass % or less, and more favorably 5 mass % or less; and more preferably it is not substantially included.

When considering the improvement of the viscosity and the improvement of Tni, the content of a compound having 2-methyl benzene-1,4-diyl group, in which the hydrogen atom in the molecule can be substituted with halogen, is as little as possible. The content of the compound having 2-methyl benzene-1,4-diyl group in which the hydrogen atom in the molecule can be substituted with halogen, is preferably 10 mass % or less; and more favorably 5 mass % or less; and more preferably it is not substantially included.

When an alkenyl group is substituted as a side-chain of the compound of the present application, and when an alkenyl group binds to cyclohexane, the alkenyl group preferably has a carbon atom number of 2-5. When the alkenyl group binds to benzene, the alkenyl group preferably has a carbon atom number of 4-5, and the unsaturated bond of the alkenyl group preferably does not directly bind to benzene.

The liquid crystal composition of the present invention can include a polymerizable compound in order to manufacture a liquid crystal display element such as PS mode, horizontal electric field type PSA mode and the horizontal electric field type PSVA mode. The polymerizable compounds which can be used include a photopolymerizability monomer in which polymerization progresses by energy line such as light. For example, such a structure includes a polymerizable compound having a liquid crystalline frame in which plural six-membered rings such as biphenyl derivatives or terphenyl derivative are connected. More specifically, it can be represented by formula (XX), that is, a two functional monomer.

Chemical Formula 163

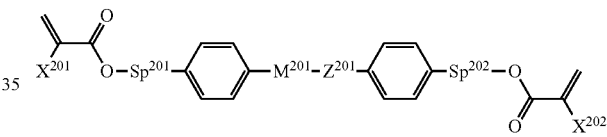

(XX)

In the formula, each of $X^{201}$ and $X^{202}$ independently represents hydrogen atom or methyl group;

each of $Sp^{201}$ and $Sp^{202}$ independently represents a single bond, alkylene group having a carbon atom number of 1-8, or —O—$(CH_2)_s$— (In the formula, s represents an integer of 2 to 7, and oxygen atom shall bind to the aromatic ring.);

$Z^{201}$ is —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (each of Y$^1$ and Y$^2$ independently represents fluorine atom or hydrogen atom.), —C≡C— or a single bond;

$M^{201}$ represents 1,4-phenylene group, trans-1,4-cyclohexylene group or a single bond. As to all the 1,4-phenylene group in the formula, an arbitrary hydrogen atom may be substituted with fluorine atom.

Both of $X^{201}$ and $X^{202}$ can be preferably hydrogen atom to be a diacrylate derivative or methyl group to be a dimethacrylate derivative. Alternatively, it is also preferable that one can be hydrogen atom, and there can be methyl group. As to the polymerization rate of these compounds, the diacrylate derivative is the fastest, the dimethacrylate derivative is slower, and an asymmetry compound is middling, and a preferable embodiment can be used depending on the use. For the application of a PSA display element, a dimethacrylate derivative is particularly preferable.

Each of $Sp^{201}$ and $Sp^{202}$ independently represents a single bond, alkylene group having a carbon atom number of 1-8, or —O—$(CH_2)_s$—, and for the PSA display element, one at least one of them can be preferably a single bond. The preferable embodiment includes a compound in which both are single bonds, or the one is single bond and the other is alkylene group having a carbon atom number of 1-8 or —O—$(CH_2)_s$—. In this case, 1-4 alkyl groups are preferable, and, s is preferably 1-4.

$Z^{201}$ preferably represents —$OCH_2$—, —$CH_2O$—, —COO—, —OCO—, —$CF_2O$—, —$OCF_2$—, —$CH_2CH_2$—, —$CF_2CF_2$— or a single bond, and more preferably —COO—, —OCO— or a single bond, and in particular, a single bond is preferable.

$M^{201}$ represents 1,4-phenylene group, trans-1,4-cyclohexylene group or a single bond, in which any hydrogen atom may be substituted with fluorine atom. In particular, 1,4-phenylene group or a single bond is preferable. When $M^{201}$ represents a ring structure other than single bond, $Z^{201}$ preferably represents a connection group except for a single bond. When $M^{201}$ is a single bond, $Z^{201}$ is preferably a single bond.

From these points, in formula (XX), the ring structure between $Sp^{201}$ and $Sp^{202}$ can be specifically the structure listed next.

When the compound of formula (XX) includes two ring structures in case where $M^{201}$ is a single bond, it is preferably to include the structure represented by formula (XXa-1) to formula (XXa-5). In particular, it is preferable to include the structure represented by formula (XXa-1) to formula (XXa-3), and yet more preferably formula (XXa-1).

Chemical Formula 164

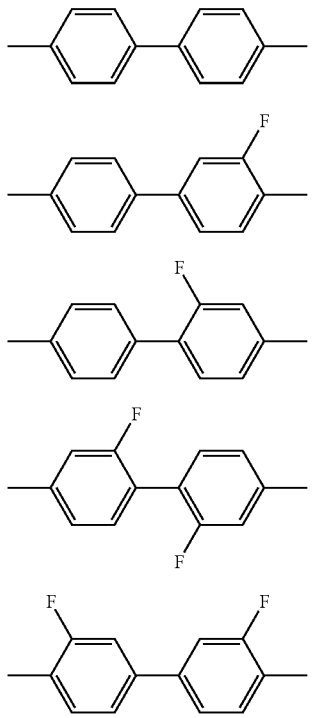

(XXa-1)
(XXa-2)
(XXa-3)
(XXa-4)
(XXa-5)

In the formula, the both ends shall bind to $Sp^{201}$ or $Sp^{202}$.

The polymerizable compound including the frames can be provided with, after the polymerization, an orientation control ability suitable for PSA type liquid crystal display elements, thereby producing good orientation state. Thus, the indication irregularity can be restrained or even does not occur at all.

In view of the above, the polymerizable monomer is preferably represented by formula (XX-1) to formula (XX-4), and particularly preferably formula (XX-2).

Chemical Formula 165

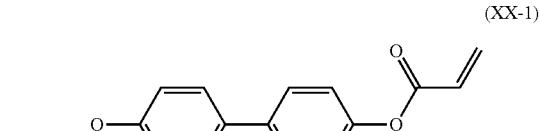

(XX-1)

(XX-2)

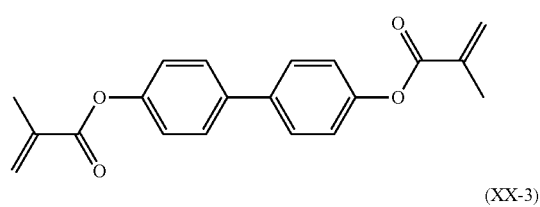

(XX-3)

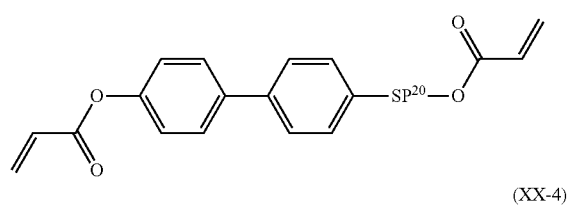

(XX-4)

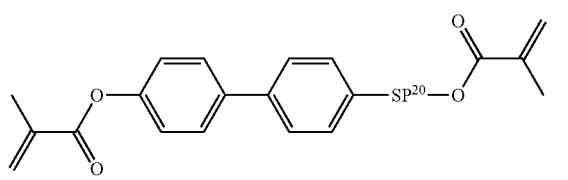

In the formula, $Sp^{20}$ represents an alkylene group having a carbon atom number of 2 to 5.

When a monomer is added in the liquid crystal composition of the present invention, the polymerization can progress even in the absence of a polymerization initiator, but can include a polymerization initiator to promote the polymerization. The polymerization initiator can include benzoin ethers, benzophenones, acetophenones, benzyl ketals, and acyl phosphine oxides.

The liquid crystal composition of the present invention can further include a compound represented by formula (Q).

Chemical Formula 166

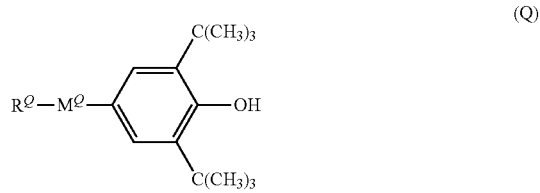

(Q)

In the formula, $R^Q$ represents a linear alkyl group or a branched alkyl group having a carbon atom number of 1 to 22; one or two or more of the $CH_2$ group in the alkyl group may be substituted with —O—, —CH=CH—, —CO—, —OCO—, —COO—, —C≡C—, —CF$_2$O—, or —OCF$_2$— such that the oxygen atoms are not directly adjacent; and $M^Q$ represents trans-1,4-cyclohexylene group, 1,4-phenylene group or a single bond.

$R^Q$ represents a linear alkyl group or a branched alkyl group having a carbon atom number of 1 to 22. Here, one or two or more of the $CH_2$ group in the alkyl group may be substituted with —O—, —CH=CH—, —CO—, —OCO—, —COO—, —C≡C—, —CF$_2$O—, or —OCF$_2$—. Preferably, it has a carbon atom number of 1 to 10, including a linear alkyl group; a linear alkoxy group; a linear alkyl group in which one $CH_2$ group is substituted with —OCO— or —COO—; a branched alkyl group; a branch alkoxy group; or a branched alkyl group in which one $CH_2$ group is substituted with —OCO— or —COO—. More preferably, it has a carbon atom number of 1 to 20, including a linear alkyl group; a linear alkyl group in which one $CH_2$ group is substituted with —OCO— or —COO—; a branched alkyl group; a branch alkoxy group; or a branched alkyl group in which one $CH_2$ group is substituted with —OCO— or —COO—. $M^Q$ represents trans-1,4-cyclohexylene group, 1,4-phenylene group or a single bond. Preferably, it represents trans-1,4-cyclohexylene group or 1,4-phenylene group.

Specifically, the compound represented by formula (Q) is the compound represented by formula (Q-a) to formula (Q-d).

Chemical Formula 167

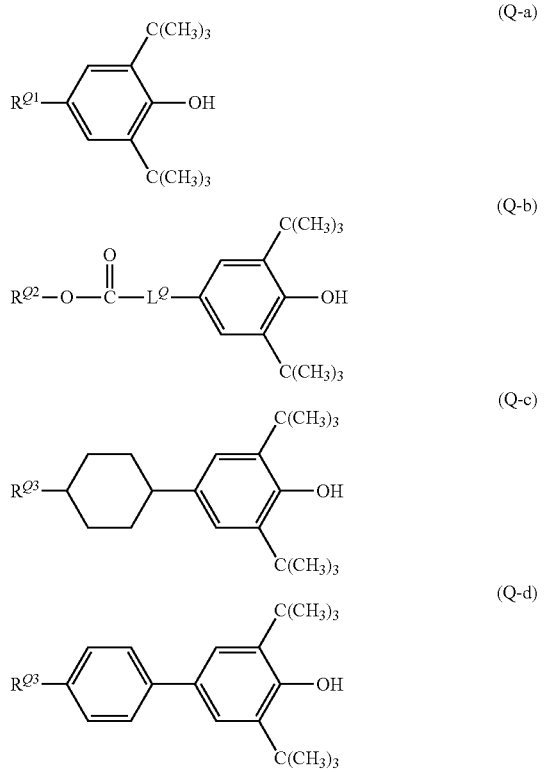

(Q-a)
(Q-b)
(Q-c)
(Q-d)

In the formula, $R^{Q1}$ preferably represents a linear alkyl group or a branched alkyl group having a carbon atom number of 1 to 10. $R^{Q2}$ preferably represents a linear alkyl group or a branched alkyl group having a carbon atom number of 1 to 20. $R^{Q3}$ preferably represents a linear alkyl group, a branched chain alkyl group, a linear alkoxy group or a branched chain alkoxy group, having a carbon atom number of 1 to 8. $L^Q$ preferably represents a linear alkylene group or a branched alkylene group having a carbon atom number of 1 to 8. Among the compounds represented by formula (Q-a) to formula (Q-d), it is further preferably the compound represented by formula (Q-c) and formula (Q-d).

In the liquid crystal composition of the present invention, it is preferable to include one or two kinds of the compounds represented by formula (Q). It is more preferable to include one kind to five kinds thereof. The content is preferably 0.001 to 1 mass %; and more preferably 0.001 to 0.1 mass %; and specifically preferable 0.001 to 0.05 mass %.

<Liquid Crystal Display Element>

The liquid crystal composition including the polymerizable compound of the present invention is given liquid crystalline orientation ability by polymerizing the polymerizable compound by ultraviolet irradiation. Using the birefringence of the liquid crystal composition, it can be used into a liquid crystal display element which controls the light transmission volume. As the liquid crystal display element, it is useful for AM-LCD (active matrix liquid crystal display element), TN (nematic liquid crystal indicating element), STN-LCD (super twisted nematic liquid crystal indicating element), OCB-LCD and IPS-LCD (in-plane switching liquid crystal display element), but it is particularly useful for AM-LCD, and can be used in a liquid crystal display element in a type of transmission or reflection.

Two substrates of liquid crystalline cell used for the liquid crystal display element can a flexible and transparent material such as glass or resin, and one of them can be an opaque material such as silicon. For example, a transparent substrate having a transparent electrode layer can be obtained by sputtering indium tin oxide (ITO) on a transparent substrate such as a glass plate.

For example, the color filter can be made by the pigment dispersion method, printing method, electrodeposition method, or dyeing method. Here, the preparation method of a color filter by the pigment dispersion method is explained, for example. A curable coloration composition for color filter is applied on the transparence substrate, and then a patterning processing is applied, which is then cured by heating or light irradiation. Each process is performed for three colors of red, green, blue to form pixel parts for the color filter. In addition, on the said substrate, a pixel electrode having an active element such as TFT and thin-film diode can be provided.

The substrates are opposed to each other such that the transparent electrode layers are located inside. At that time, the distance of the substrates can be regulated by a spacer therebetween. Here, it is preferable to adjust the color adjustment layer having a thickness of 1-100 μm. It is more preferably 1.5 to 10 μm. When a polarizing plate is used, it is preferable to adjust the product of the refractive index anisotropy Δn and the cell thickness d of the liquid crystal in order to maximize the contrast. In addition, in case of two polarizing plates, the polarization axis of each polarizing plate can be adjusted in order to make the view angle and contrast good. Furthermore, a phase difference film can be used in order to widen the view angle. For example, the spacer can include a columnar spacer of glass particle, resin particle, alumina particle, and photoresist material. Thereafter, the sealant such as epoxy type thermosetting composition is screen-printed on the substrate such that an injection hole for liquid crystal is provided, and the substrates are attached to each other, which are then heated to thermally cure the sealant.

The liquid crystal composition including the polymerizable compound can be intervened between two substrates by means of normal vacuum injection method and ODF method. However, there is a problem in the vacuum injection method since a trace of the injection can be left while a drip trace does not occur. The present invention is more suitable for the display element which is manufactured by means of the ODF method. In the liquid crystal display element manufacturing process by means of the ODF method, either one substrate of the back plane or the front plane is applied with a sealant such as epoxy type light/heat curable agent to draw a closed-loop embankment form by using a dispenser, into which the liquid crystal composition is dropped at a specified amount under deairing, and then, the back plane and the front plane are joined to each other to produce a liquid crystal display element. The liquid crystal composition of the present invention can stably drop the liquid crystal composition during the ODF process, and is suitably useful.

For the method to polymerize a polymerizable compound, appropriate polymerization rate is desirable to obtain good orientation performance of the liquid crystal, so that a method to polymerize it by irradiating active energy lines such as ultraviolet rays or electron beams alone or in combination thereof. When using ultraviolet rays, a polarization light source can be used, or an unpolarized light source can be used. When the liquid crystal composition including a polymerizable compound is polymerized in a state that it is placed between the two substrates, at least one of the substrates located at the side of the irradiation surface shall be suitably transparent to the active energy lines. Also, after having polymerized only a specific moiety by using a mask at the time of light irradiation, the condition such as electric field, magnetic field or temperature is changed such that the orientation state of the non-polymerized portion is changed, and then, polymerization is performed by further irradiating the active energy lines. In particular, when ultraviolet rays are exposed, the liquid crystal composition including a polymerizable compound is preferably applied with alternative electric field while exposed to ultraviolet rays. The alternative electric field to be applied is preferably alternative current with a frequency of 10 Hz to 10 kHz, and more preferably 60 Hz to 10 kHz. The voltage is selected depending on the desired pretilt angle of the liquid crystal display element. In other words, the pretilt angle of the liquid crystal display element can be controlled by the voltage to be applied. In the liquid crystal display element of the horizontal electric field type MVA mode, the pretilt angle can be preferably controlled at 80 degrees to 89.9 degrees in view of the orientation stability and contrast.

The temperature at the time of the irradiation is preferably within the temperature range where the liquid crystalline state of the liquid crystal composition of the present invention can be maintained. It is preferable to typically polymerize at a temperature that is close to the room temperature, namely a temperature of 15-35° C. The lamp generating the ultraviolet rays to be used can include metal halide lamp, high pressure mercury lamp, and super-high pressure mercury lamp. Also, with respect to the wavelength of the ultraviolet rays to be irradiated, it is preferable to irradiate ultraviolet lights having a wavelength range that does not overlap with the absorption wavelength band of the liquid crystal composition. If necessary, the ultraviolet rays are trimmed to be used. The strength of the ultraviolet rays to be irradiated is preferably 0.1 $mW/cm^2$ to 100 $W/cm^2$, and more preferably 2 $mW/cm^2$ to 50 $W/cm^2$. The energy amount of the ultraviolet rays to be irradiated can be appropriately adjusted, and it is preferably 10 $mJ/cm^2$ to 500 $J/cm^2$, more preferably 100 $mJ/cm^2$ to 200 $J/cm^2$. When irradiating ultraviolet rays, the strength can be changed. The period to irradiate ultraviolet rays can be appropriately adjusted depending on the strength of the ultraviolet rays to be irradiated, and it is preferably 10 to 3,600 seconds, and more preferably 10 to 600 seconds.

The liquid crystal display element using the liquid crystal composition of the present invention is useful in accomplishing both the high speed response and the restraint of the display defectiveness. It is particularly useful for the liquid crystal display elements for active matrix drive, and applicable to liquid crystal display elements for VA mode, PSVA mode, PSA mode, IPS (in-plane switching) mode, VA-IPS mode, FFS (fringe field switching) mode or ECB modes.

Hereinafter, with reference to the drawing, the preferable embodiment of the liquid crystal display device of the present invention is explained in detail.

FIG. 1 is a cross section of the liquid crystal display element comprising a seal material provided between two substrates opposed to each other, and a liquid crystal enclosed in the sealed region surrounded by seal material.

In details, there is provided a backplane in which TFT layer 102 and pixel electrode 103 are provided on first substrate 100, onto which passivation film 104 and first oriented film 105 are provided. On the second substrate 200, black matrix 202, color filter 203, flattened film (overcoat layer) 201, transparent electrode 204 are provided, onto which second oriented film 205 is provided. The back plane is opposed to the front plane. Seal material 301 is provided between the substrates. Liquid crystal layer 303 is enclosed in the sealed region surrounded by the seal material. Projections (columnar spacer) 302,304 are provided on the substrate surface with which seal material 301. In this way, the details of the liquid crystal display element are provided.

The first substrate or the second substrate is not particularly limited in its material, if it is substantially transparent. The example can include glass, ceramics, and resin. The resin substrate can include cellulose and cellulose derivative such as triacetylcellulose and diacetyl cellulose; polycycloolefin derivative, polyester such as polyethylene terephthalate and polyethylenenaphthalate; polyolefin such as polypropylene and polyethylene; polycarbonate, polyvinyl alcohol, polyvinyl chloride, polyvinylidene chloride, polyamide, polyimide, polyimide amide, polystyrene, acrylics, polymethyl methacrylate, polyethersulfone, and polyarylate, and furthermore, inorganic-organic composite material such as fiberglass-epoxy resin, and fiberglass-acrylic resin.

In addition, a barrier film is preferably provided when a resin substrate is used. The function of the barrier film is to reduce the moisture permeability of the resin substrate and to improve the reliability of the electrical characteristics of the liquid crystal display element. The barrier film is not particular limited so long as it has high transparency and small vapor-permeability. It is generally formed by vapor deposition, sputtering and chemical vapor deposition method (CVD method) using inorganic material such as silicon oxide.

In the present invention, the first substrate and the second substrate can be made of either the same material or different material, and not particularly limited. If using a glass substrate, the liquid crystal display element can be provided with excellent heat resistance and dimensional stability, so it is preferable. Alternatively, if using a resin substrate, it is suitable for the manufacturing method by the roll-to-roll process as well as suitable for reducing the weight or making flexible. Also, if aiming for flatness and thermal stabilization, favorable results can be obtained by combining a glass substrate with a resin substrate. In addition, in the later Example, a substrate is used as material of the first substrate 100 or the second substrate 200.

As the back-plane, TFT layer 102 and pixel electrode 103 are provided on the first substrate 100. These are prepared by normal array process. Thereon, passivation film 104 and first oriented film 105 are provided to obtain the back-plane.

The passivation film 104 (it is also called as an inorganic protection film) is a film to protect the TFT layer, which is usually formed by chemical vapor phase epitaxy (CVD) techniques of nitride film (SiNx), oxide film (SiOx) and etc.

Also, the first oriented film 105 is a film having a function to make the liquid crystal oriented, and such material often used is usually high polymeric material such as polyimide. As an application liquid, used is an orientation agent solution including polymer material and a solvent. The oriented film might inhibit the adhesive force with the seal material, so that it applied as a pattern in the sealed region. The application method to be used can include a printing method such as flexo printing method, or a droplet discharge method such as ink jet. Thereby applied orientation agent solution is temporarily dried to evaporate the solvent, and then, baked to crosslinking curing. Then, an orientation processing is performed to exhibit the orientation function.

The orientation processing is usually carried out by means of rubbing method. On the polymer membrane formed as explained before, a rubbing cloth made of fiber such as rayon is used such that it is rubbed in one direction to generate the liquid crystalline orientation ability.

In addition, a light orientation method can be used. The light orientation method is a method to produce the orientation ability by irradiating polarization on the oriented film including an organic material having photosensitivity. This method does not produce wound or dust on the substrate unlike the rubbing method. The example of the organic material in the light orientation method can include materials including dichromatic dye. The dichromatic dye can include a group to cause orientation induction of the molecule due to the Weigert Effect resulting in the photodichroism; or a group to cause photoreaction which results in the liquid crystalline orientation ability (which is hereinafter referred to as light orientation group) such as isomerization reaction (e.g., azobenzene group), dimerization reaction (e.g., cinnamoyl group), photocrosslinking reaction (e.g., benzophenone group), or photolysis reaction (e.g., polyimido group). After the solvent is evaporated by temporary drying, the orientation agent solution as applied is exposed to light (polarization) having any inclination so as to produce an oriented film having an orientation ability in any direction.

One front-plane is provided with black matrix 202, color filter 203, flattened film 201, transparent electrode 204, and second oriented film 205 on the second substrate 200.

For example, the black matrix 202 is made by a pigment dispersion method. In detail, on the second substrate 200 having the barrier film 201, color resin liquid which uniformly disperses black colorant for forming the black matrix is applied so as to form the color layer. Then, the color layer is baked to cure. Thereon, a photoresist is applied, and prebake is carried out. The photoresist is exposed to light through a mask pattern, and then it is developed to pattern the color layer. Then, the photoresist layer is exfoliated, and the color layer is baked to complete the black matrix 202.

Alternatively, a pigment dispersion liquid of a photoresist type can be used. In this case, the pigment dispersion liquid of the photoresist type is applied and prebake is carried out, which is then exposed to light through a mask pattern, and thereafter, it is developed so as to pattern the color layer. Then, the photoresist layer is exfoliated, and the color layer is baked to complete the black matrix 202.

The color filter 203 is made by pigment dispersion method, electrodeposition technique, printing method or dyeing method. For example, the pigment dispersion method is explained. A color resin liquid in which pigment (for example, red pigment) is uniformly dispersed is applied on the second substrate 200, and then, baking is carried out to cure. Thereon, a photoresist is applied and pre-baking is carried out. The photoresist is exposed to light through a mask pattern, and then, it is developed for patterning. Then, the photoresist layer is exfoliated, and it is again baked to complete the (red) color filter 203 (203a). The order of the color to make is not particularly limited. Similarly, green color filter 203 (203b) and blue color filter 203 (203c) are formed.

The transparent electrode 204 is provided on the color filter 203 (if necessary, on the color filter 203 an overcoat layer (201) is provided for the surface flattening). The transparent electrode 204 is preferable if it has high transmissivity, and if it has small electrical resistance. The transparent electrode 204 is formed by carrying out the sputtering method of oxide film such as ITO.

Also, for the purpose to protect the transparent electrode 204, a passivation film can be formed on transparent electrode 204.

The second oriented film 205 is the same as the first oriented film 105 as explained above.

As explained above, concrete embodiments of the back-plane and the front-plane have been explained to be used in the present invention. However, the present invention is not limited to the concrete embodiments above, and changes can be freely made depending on the desired liquid crystal display element.

The shape of the columnar spacer is not particularly limited, and it can be various. The example of its horizontal section can include a circle, and a polygon such as quadrangle. In consideration of the misalignment margin at the time of the process, it is preferable that the horizontal section is in a shape of a circle or a regular polygon. Also, the shape of the projection is preferably a circular truncated cone or a prismoid.

The material of the columnar spacer is not particularly limited, so long as it does not dissolve with the seal material, or an organic solvent used for the seal material, or the liquid crystal. It is, however, preferable to use a synthetic resin (curable resin) in view of the processing and weight saving. On the other hand, the projection can be formed on the first substrate to which the seal material contacts, by means of a photolithography method, or a droplet discharge method. Because of the reasons above, it is preferable to use a photo-curable resin suitable for the photolithography method and the droplet discharge method.

Figure 2:
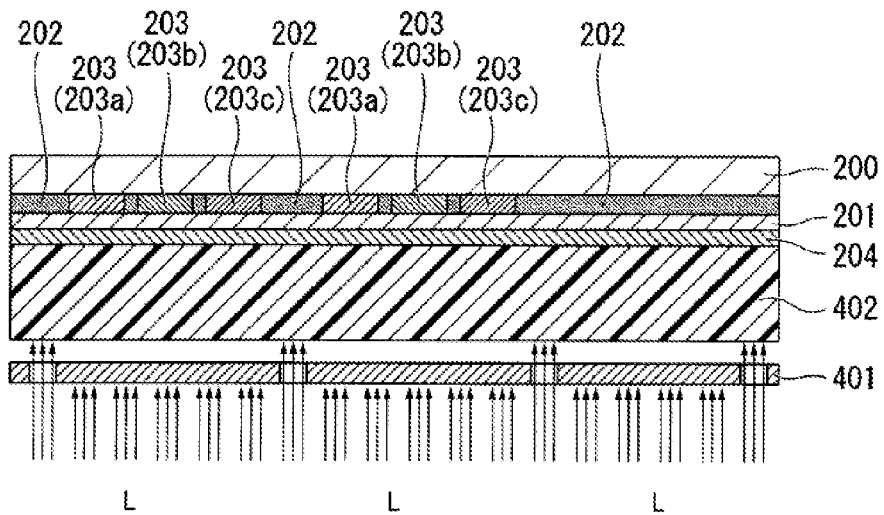
FIG. 2 shows the exposure processing process using the pattern to produce a columnar spacer to form on the black matrix as a photomask pattern.

As an example, the explanation is made in case where the columnar spacer is formed by means of a photolithography method. FIG. 2 shows the exposure processing process using the pattern to produce a columnar spacer to form on the black matrix as a photomask pattern.

On the transparent electrode 204 of the front-plane, a resin liquid for forming the columnar spacer (in which no colorant is included) is applied. Then, the resin layer 402 is baked and cured. Thereon, a photoresist is applied, and prebake is carried out. The photoresist is exposed to light through a mask pattern 401, and then, it is developed to pattern the resin layer. Then, the photoresist layer is exfoliated, and the resin layer is baked to complete the columnar spacer (References 302 and 0304 in FIG. 1).

The formation position of the columnar spacer can be decided as desired, depending on the mask pattern. Therefore, both inside and outside of the sealed region of the liquid crystal display element (i.e., the portion where the seal material is applied) can be formed simultaneously. Also, the columnar spacer is preferably formed to be located on the black matrix in order not to deteriorate the quality of the sealed region. The columnar spacer formed by the photolithography method in this way may be called as a column spacer or a photospacer.

The material of the spacer can include a mixture of a negative aqueous resin such as the PVA-stilbazo photosensitive resin, multi-functional acrylic type monomer, acrylic acid copolymer, and triazole type initiator. Alternatively, there is a way to use a color resin in which colorant is dispersed in polyimide resin. It is not particularly limited in the present invention, and the spacer can be formed from known materials, depending on the affinity between the liquid crystal and the seal material, and so on.

In this way, after the columnar spacer is formed on the surface to become the sealed region on the front-plane, the seal material (reference 301 in FIG. 1) is applied on the back-plane surface to which the seal material contacts.

The material of the seal material is not particularly limited, and used can be a curable resin composition which has added a photocurable, thermosetting or light/heat curable such as epoxy type or acrylic type; and a polymerization initiator. In addition, in order to control the moisture permeability, elastic modulus and viscosity, there may be added fillers of inorganic materials or organic materials. The shape of these fillers is not particularly limited, and can be a spherical, fibrous, or amorphous. Furthermore, in order to favorably control the cell gap, gap materials having a spherical or fibrous shape with a monodispersed diameter can be mixed. Also, in order to increase the strength of the adhesive force with the substrate, fibrous materials which are easy to get twisted with the projections on the substrate can be mixed. The diameter of the fibrous material to be used here is preferably in the level of ⅕ to ⅒ or less of the cell gap, and the length of the fibrous material is desirably shorter than the width of the seal as applied.

Also, the material of the fibrous material is not particularly limited, and can be appropriately selected from synthetic fiber such as cellulose, polyamide and polyester; and inorganic materials such as glass and carbon.

The method to apply the seal material can include a printing method and a dispensing method, but the dispensing method is desirable since the usage amount of the seal material can be smaller. The application position of the seal material is usually set on the black matrix in order not to adversely affect the sealed region. In order to form the liquid crystal drip region in the subsequent process (in order not to leak the liquid crystal), the shape of the seal material application is a closed-loop.

The liquid crystal is dropped in the closed-loop shape (i.e., the sealed region) of the front-plane where the seal material has been applied. A dispenser is usually used. In order to match the liquid crystal quantity to be dropped with the liquid crystalline cell capacity, the quantity is basically equal to the product of the height of the columnar spacer and the area of the seal application. However, in view of the liquid crystal leak or the optimization of the display characteristic during the cell lamination process, the liquid crystal quantity to be dropped can be adjusted appropriately, or the liquid crystal drip position can be dispersed.

Then, the back-plane is laminated to the front-plane in which the seal material has been applied and the liquid crystal has been dropped. In detail, on a stage having a mechanism that can adhere to a substrate such as an electrostatic chuck device, the front-plane and the back-plane are adhered. The second oriented film of the front-plane and the first oriented film of the back-plane are faced to each other, so as to set in a position (distance) such that the seal material and the other substrate do not contact with each other. The inside in the system is vacuumed in this state. After finishing the vacuum, the positions of both substrates are adjusted while confirming the lamination position of the front-plane and the back-plane (i.e., alignment operation). After completing the adjustment of the lamination position, the substrate is made close to the position where the back-plane contacts the seal material on the front-plane. In this state, an inert gas is filled inside the system, and then, returned to the normal pressure while gradually releasing the reduced pressure. At this time, the front-plane and the back-plane are laminated together due to the atmospheric pressure, while a cell gap is formed by the height position of the columnar spacer. In this state, the seal material is exposed to ultraviolet rays to cure the seal material to form a liquid crystal cell. Then, if necessary, a heating step is carried out to promote the curing of the seal material. In order to improve the reinforcement of the adhesive strength and the electrical characteristics reliability of the seal material, a heating step is often added.

EXAMPLES

The present invention is explained more in detail with reference to the Examples, but the present invention is not limited to these Examples. Also, the term "%" in the composition of the Examples and the Comparative Examples below means "mass %."

In the Examples, the characteristics that were measured are as follows.

Tni: nematic phase—isotropic liquid phase transition temperature (° C.)
Δn: Refractive index anisotropy at 298K (or birefringent rate)
Δ∈: Dielectric constant anisotropy at 295K
η: Viscosity at 293K (mPa·s)
γ1: Rotational viscosity (mPa·s) at 295K
VHR: Voltage retention rate (%) under a condition at 333K, at a frequency of 60 Hz, and an applied voltage of 4V.

<Evaluation of the Ghosting>

The evaluation of the ghosting of the liquid crystal display element was made as follows. A predetermined fixed pattern was displayed inside the display area for six weeks, and then, a uniform displaying at full screen was performed to check the level of the afterimage of the fixed pattern by visual observation to evaluate it by four grades.

"A": No afterimage.
"B": Acceptable level though there were a few afterimages
"C": Unacceptable level due to the afterimages
"D" Very inferior due to the existence of the afterimages <Evaluation of the Volatility (Production Device Staining)>

Into a specific container of a vacuum stirring degassing mixer with a volume of 0.33 L, 0.15 kg of the liquid crystal composition was put. While operating the vacuum stirring degassing mixer at a revolution speed of 20 $S^{-1}$ and at a rotation speed of 10.0 $S^{-1}$ to deair it to 15 kPa, the foaming of the liquid crystal material was visually observed. The volatility was classified in four levels below, depending o the time until the foaming began from the operation start of the mixer.

"A": It took 3 minutes or more until it foamed. It was unlikely to cause the staining of the device by the volatilization.

"B": It took 1 minute or more and 3 minutes or less until it foamed. There was concern of slight staining of the device caused by the volatilization.

"C": It took 30 seconds or more and 1 minute or less until it foamed. The device was stained caused by the volatilization.

"D": It took 30 seconds or less until it foamed. There was concern of significant stain of the device caused by the volatilization.

<Evaluation of the Process Compatibility>

In the ODF process, a constant volume metering pump was used. 50 pL of the liquid crystal was dropped per one time, and this step was repeated 100,000 times. For each 100 times (i.e., 0-100 times, 101-200 times, 201-300 times, . . . 99901-100,000 times), the change of the amount of the liquid crystal was evaluated by following four grades.

"A": The change was extremely small (the liquid crystal display element can be produced stably).

"B": Acceptable level though there were slight changes.

"C": Unacceptable Level due to the changes (the yield was worsened by spot outbreak).

"D": Considerably inferior because of the changes (i.e., the leak of the liquid crystal or vacuum air void was generated).

<Evaluation of the Solubility at Low Temperature>

The evaluation of the solubility at a low temperature was made as follows. After preparation of a liquid crystal composition, 0.5 g of the liquid crystal composition was weighted in a sample pot of 1 mL, which was put in a test bath with temperature control, and applied to one cycle of the temperature changes as follows: "−25° C. (kept for one hour)→raising the temperature (0.2° C./minute)→0° C. (kept for one hour)→raising the temperature (0.2° C./minute)→25° C. (kept for one hour)→decreasing the temperature (−0.2° C./minute)→0° C. (kept for one hour)→decreasing the temperature (−0.2° C./minute)→−25° C." During the cycle, the generation of the deposit from the liquid crystal composition was visually observed by the four grades below.

"A": No deposits were observed for 480 hours or more.
"B": No deposits were observed for 240 hours or more.
"C": Deposits were observed within 120 hours.
"D": Deposits were observed within 60 hours.

Example 1

The composition as shown below was prepared.
Physical properties of the composition of Example 1 are shown in Table 1.

Chemical Formula 168:

| Chemical Structure | | Ratio (%) |
|---|---|---|
| 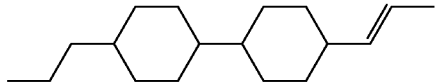 [SMILES: C/C=C/C1CCC(C2CCC(CCC)CC2)CC1] | (1.3) | 8 |
| 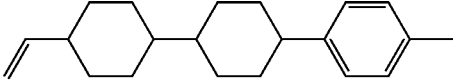 | (11.1) | 10 |
| 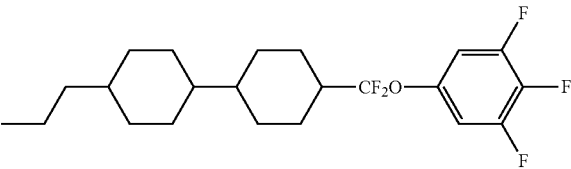 | (28.3) | 8 |
| 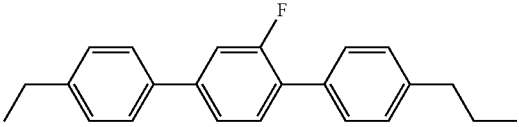 [SMILES: CCCc1ccc(-c2ccc(-c3ccc(CC)cc3)cc2F)cc1] | (i-1-1.1) | 6 |
| 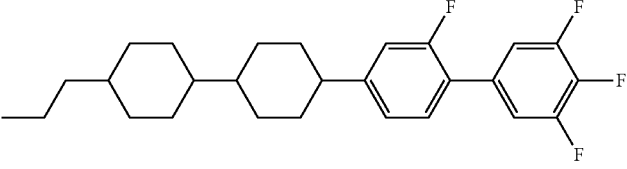 [SMILES: CCCC1CCC(C2CCC(c3ccc(-c4cc(F)c(F)c(F)c4)c(F)c3)CC2)CC1] | (37.2) | 2 |
| 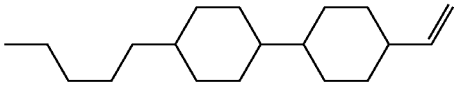 [SMILES: C=CC1CCC(C2CCC(CCCCC)CC2)CC1] | (2.4) | 7 |

-continued

| Chemical Formula 168: | | |
|---|---|---|
| Chemical Structure | | Ratio (%) |
| (structure: propyl-Cy-Cy-CF₂O-phenyl(3,4,5-triF)) | (28.5) | 4 |
| (structure: propyl-Cy-Ph-phenyl(3,4,5-triF)) | (56.2) | 9 |
| (structure: propyl-Cy-Cy-phenyl(3,4,5-triF)) | (34.3) | 15 |
| (structure: ethyl-Cy-Cy-phenyl(3,4,5-triF)) | (34.2) | 10 |
| (structure: propyl-Cy-Ph-phenyl(3,4-diF)) | (33.3) | 10 |
| (structure: pentyl-Cy-Cy-phenyl(3,4,5-triF)) | (34.5) | 5 |
| (structure: butyl-Cy-Ph-Ph-OCH₃) | (ii-1.3) | 6 |

TABLE 1

| Tni (° C.) | 100.5 |
|---|---|
| Δn | 0.095 |
| Δε | 7.8 |
| η (mPa·s) | 19.6 |

Comparative Example 1

The composition which did not include the compound represented by formula (ii) above was prepared. The physical properties of the composition of Comparative Example 1 are shown in Table 2.

Chemical Formula 169:
| Chemical Structure | | Ratio (%) |
|---|---|---|
| 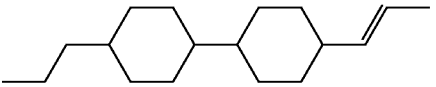 [SMILES: C/C=C/C1CCC(C2CCC(CCC)CC2)CC1] | (1.3) | 8 |
| 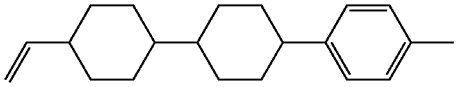 [SMILES: C=CC1CCC(C2CCC(c3ccc(C)cc3)CC2)CC1] | (11.1) | 10 |
| 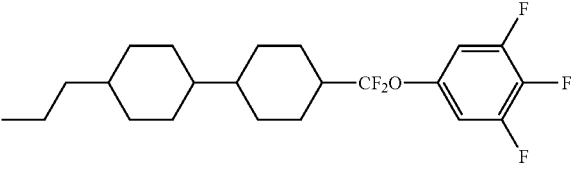 | (28.3) | 4 |
| 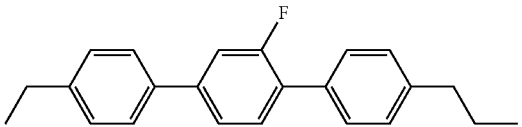 [SMILES: CCCc1ccc(-c2ccc(-c3ccc(CC)cc3)cc2F)cc1] | (i-1-1.1) | 6 |
| 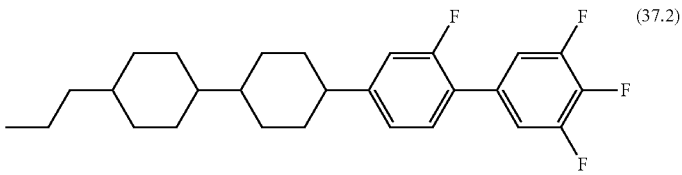 | (37.2) | 2 |
| 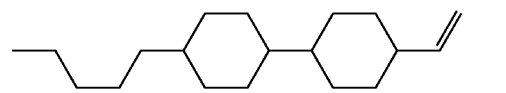 [SMILES: C=CC1CCC(C2CCC(CCCCC)CC2)CC1] | (2.4) | 7 |
| 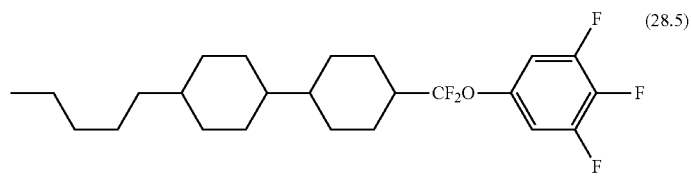 | (28.5) | 4 |
| 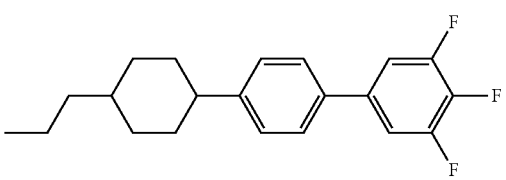 [SMILES: CCCC1CCC(c2ccc(-c3cc(F)c(F)c(F)c3)cc2)CC1] | (56.2) | 9 |
| 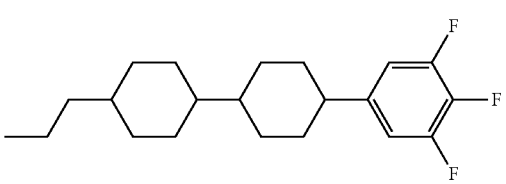 [SMILES: CCCC1CCC(C2CCC(c3cc(F)c(F)c(F)c3)CC2)CC1] | (34.3) | 15 |
| 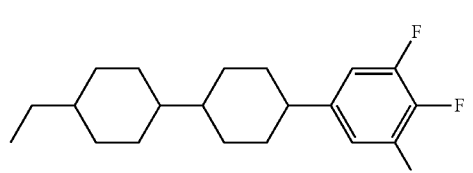 | (34.2) | 10 |

Chemical Formula 169:

| Chemical Structure | | Ratio (%) |
|---|---|---|
| 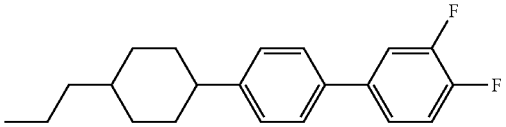 [SMILES: CCCC1CCC(c2ccc(-c3ccc(F)c(F)c3)cc2)CC1] | (33.3) | 10 |
| 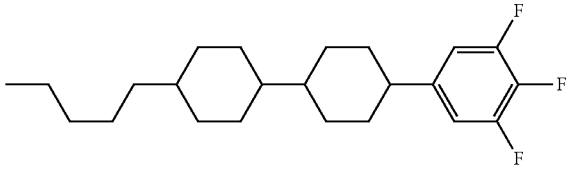 | (34.5) | 5 |
| 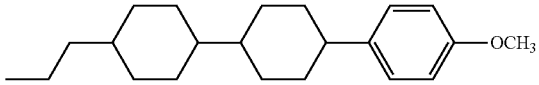 [SMILES: CCCC1CCC(C2CCC(c3ccc(OC)cc3)CC2)CC1] | (13.2) | 5 |
| 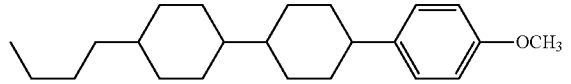 [SMILES: CCCCC1CCC(C2CCC(c3ccc(OC)cc3)CC2)CC1] | (13.3) | 5 |

TABLE 2

| | |
|---|---|
| Tni (° C.) | 100.7 |
| Δn | 0.093 |
| Δε | 7.0 |
| η (mPa·s) | 19.8 |

[Table 2]

The results show that the composition of Comparative Example 1 which did not include the compound represented by formula (ii) had a smaller value of Δε than the composition of Example 1 which included the compound represented by formula (ii).

Example 2

The composition as shown below was prepared.
Physical properties of the composition of Example 2 are shown in Table 3.

Chemical Formula 170:

| Chemical Structure | | Ratio (%) |
|---|---|---|
| 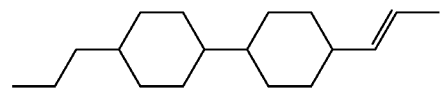 | (1.3) | 5 |
| 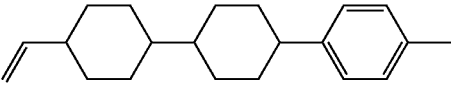 | (11.1) | 10 |
| 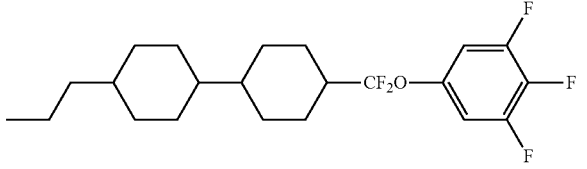 | (28.3) | 5 |
| 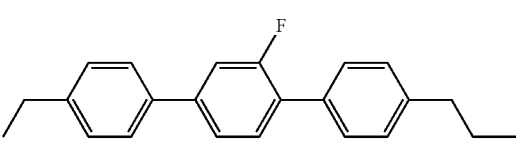 | (i-1-1.1) | 6 |

-continued

| Chemical Formula 170: | | |
|---|---|---|
| Chemical Structure | | Ratio (%) |
| [structure] | (37.2) | 3 |
| [structure] | (2.4) | 6 |
| [structure] | (28.5) | 5 |
| [structure] | (13.3) | 4 |
| [structure] | (56.2) | 10 |
| [structure] | (34.3) | 15 |
| [structure] | (34.2) | 10 |
| [structure] | (33.3) | 10 |
| [structure] | (34.5) | 5 |
| [structure] | (ii-1.3) | 6 |

TABLE 3
| | |
|---|---|
| Tni (° C.) | 103.1 |
| Δn | 0.099 |
| Δε | 8.0 |
| η (mPa·s) | 23.2 |
Example 3
The composition as shown below was prepared.
Physical properties of the composition of Example 3 are shown in Table 4.
Chemical Formula 171:
| Chemical Structure | | Ratio (%) |
|---|---|---|
| 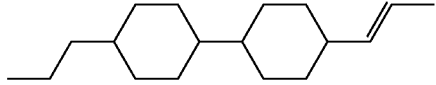 [SMILES: C/C=C/C1CCC(C2CCC(CCC)CC2)CC1] | (1.3) | 5 |
| 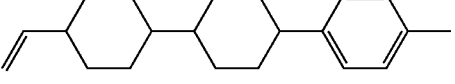 | (11.1) | 10 |
| 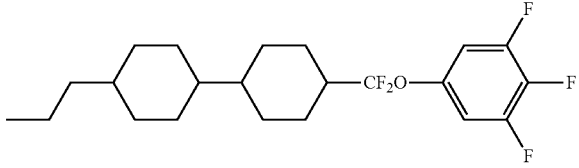 | (28.3) | 5 |
| 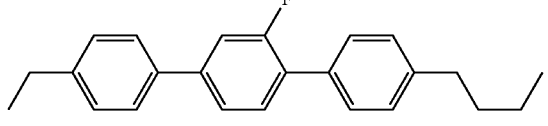 | (i-1-1.4) | 6 |
| 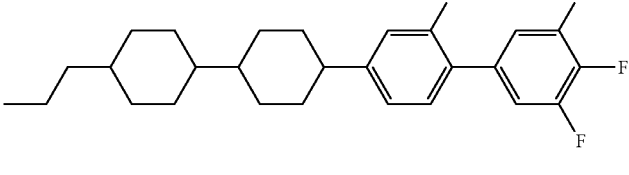 | (37.2) | 3 |
| 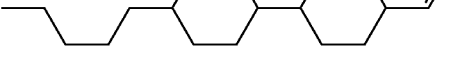 | (2.4) | 6 |
| 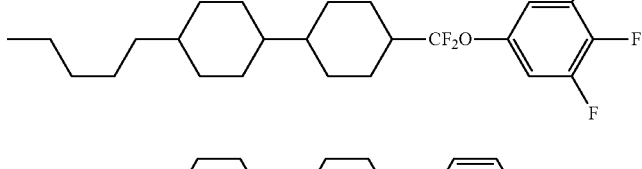 | (28.5) | 5 |
| 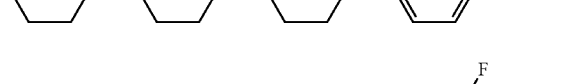 | (13.3) | 4 |
| 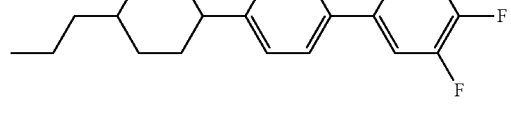 | (56.2) | 10 |

-continued

| Chemical Formula 171: | | |
|---|---|---|
| Chemical Structure | | Ratio (%) |
| propyl-Cy-Cy-Ph(3,4,5-F) | (34.3) | 15 |
| ethyl-Cy-Cy-Ph(3,4,5-F) | (34.2) | 10 |
| propyl-Cy-Ph-Ph(3,4-F) | (33.3) | 10 |
| butyl-Cy-Cy-Ph(3,4,5-F) | (34.5) | 5 |
| butyl-Cy-Ph-Ph-OCH₃ | (ii-1.3) | 6 |

TABLE 4

| | |
|---|---|
| Tni (° C.) | 103.9 |
| Δn | 0.100 |
| Δε | 7.9 |
| η (mPa·s) | 24.3 |

Example 4

The composition as shown below was prepared.
Physical properties of the composition of Example 4 are shown in Table 5.

| Chemical Formula 172: | | |
|---|---|---|
| Chemical Structure | | Ratio (%) |
| propyl-Cy-Cy-CH=CH₂ | (1.3) | 5 |
| vinyl-Cy-Cy-Ph-methyl | (11.1) | 10 |
| propyl-Cy-Cy-CF₂O-Ph(3,4,5-F) | (28.3) | 5 |

-continued
| Chemical Formula 172: | | |
|---|---|---|
| Chemical Structure | | Ratio (%) |
| 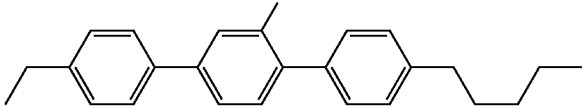 | (i-1-1.6) | 6 |
| 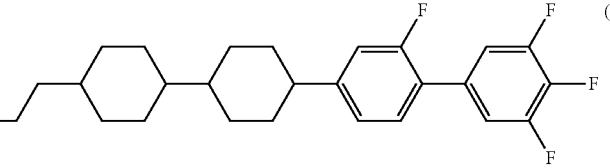 | (37.2) | 3 |
| 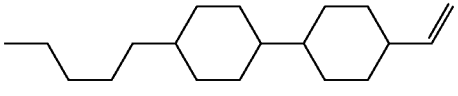 | (2.4) | 6 |
| 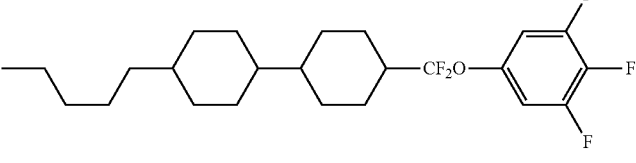 | (28.5) | 5 |
| 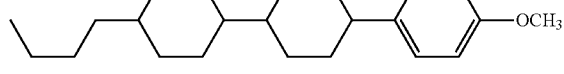 | (13.3) | 4 |
| 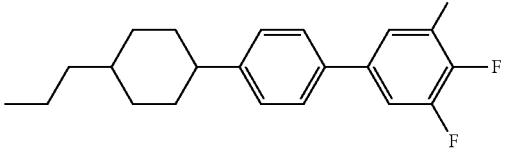 | (56.2) | 10 |
| 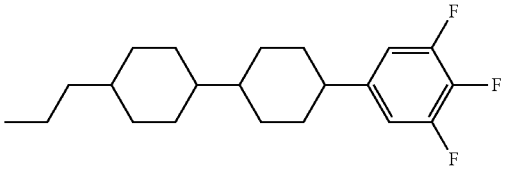 [SMILES: CCCC1CCC(C2CCC(c3cc(F)c(F)c(F)c3)CC2)CC1] | (34.3) | 15 |
| 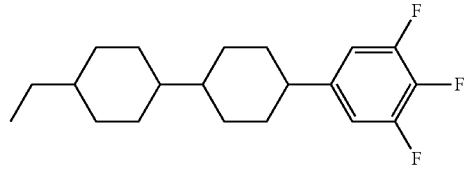 [SMILES: CCC1CCC(C2CCC(c3cc(F)c(F)c(F)c3)CC2)CC1] | (34.2) | 10 |
| 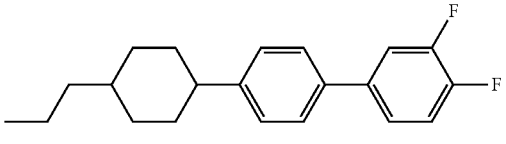 [SMILES: CCCC1CCC(c2ccc(-c3ccc(F)c(F)c3)cc2)CC1] | (33.3) | 10 |
| 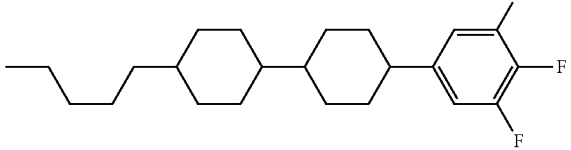 | (34.5) | 5 |

-continued
| Chemical Formula 172: | | |
|---|---|---|
| Chemical Structure | | Ratio (%) |
| 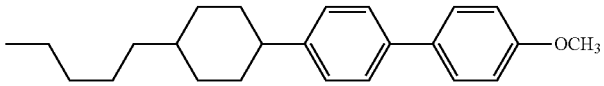 [SMILES: CCCCCC1CCC(c2ccc(-c3ccc(OC)cc3)cc2)CC1] | (ii-1.3) | 6 |
| TABLE 5 | |
|---|---|
| Tni (° C.) | 104.2 |
| Δn | 0.101 |
| Δε | 7.8 |
| η (mPa · s) | 25.0 |
Example 5
The composition as shown below was prepared.
Physical properties of the composition of Example 5 are shown in Table 6.
| Chemical Formula 173: | | |
|---|---|---|
| Chemical Structure | | Ratio (%) |
| 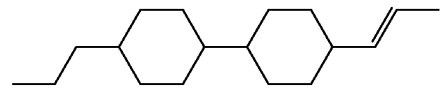 [SMILES: C/C=C/C1CCC(C2CCC(CCC)CC2)CC1] | (1.3) | 5 |
| 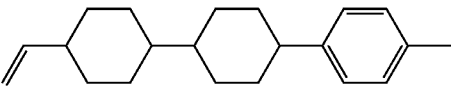 | (11.1) | 10 |
| 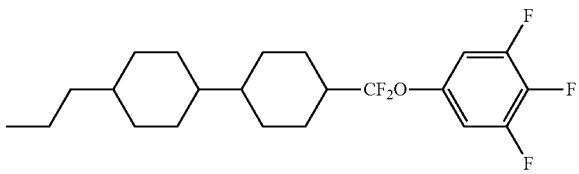 | (28.3) | 5 |
| 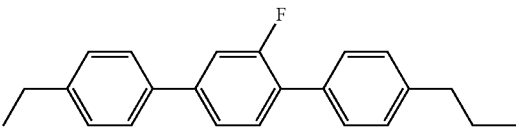 | (i-1-1.1) | 6 |
| 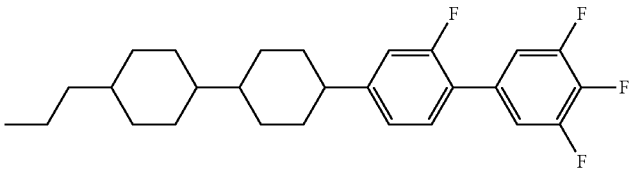 [SMILES: CCCC1CCC(C2CCC(c3ccc(-c4cc(F)c(F)c(F)c4)c(F)c3)CC2)CC1] | (37.2) | 3 |
|  | (2.4) | 6 |
| 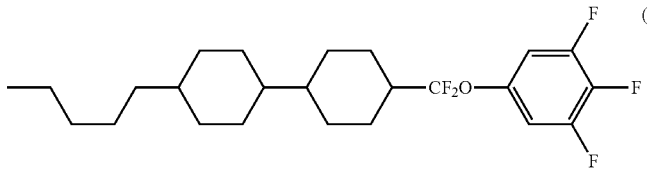 | (28.5) | 5 |
| 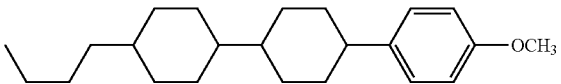 [SMILES: CCCCC1CCC(C2CCC(c3ccc(OC)cc3)CC2)CC1] | (13.3) | 4 |

-continued
| Chemical Formula 173: | | |
|---|---|---|
| Chemical Structure | | Ratio (%) |
| 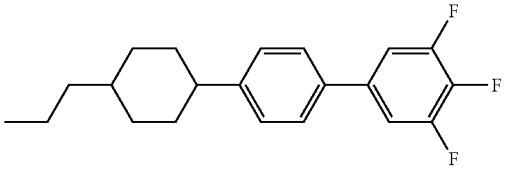 | (56.2) | 10 |
| 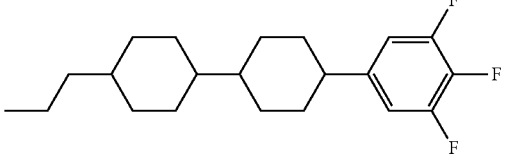 | (34.3) | 15 |
| 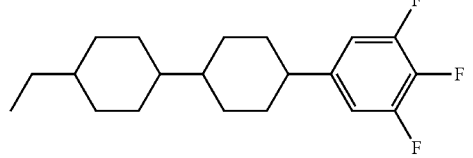 | (34.2) | 10 |
| 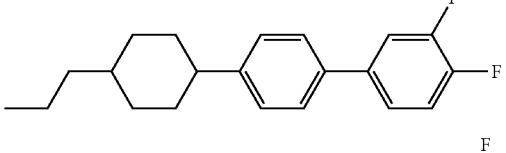 | (33.3) | 10 |
| 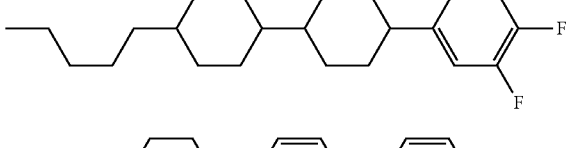 | (34.5) | 5 |
| 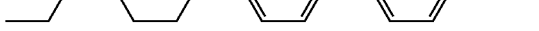 | (ii-1.1) | 6 |
TABLE 6
| Tni (° C.) | 93.9 |
|---|---|
| Δn | 0.087 |
| Δε | 7.3 |
| η (mPa·s) | 16.0 |
Example 6
The composition as shown below was prepared.
Physical properties of the composition of Example 6 are shown in Table 7.
| Chemical Formula 174: | | |
|---|---|---|
| Chemical Structure | | Ratio (%) |
| 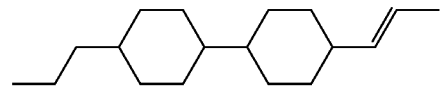 [SMILES: C/C=C/C1CCC(C2CCC(CCC)CC2)CC1] | (1.3) | 5 |
| 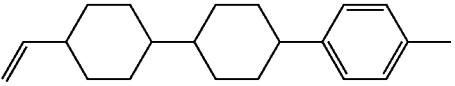 [SMILES: C=CC1CCC(C2CCC(c3ccc(C)cc3)CC2)CC1] | (11.1) | 10 |

-continued

Chemical Formula 174:

| Chemical Structure | | Ratio (%) |
|---|---|---|
| propyl-Cy-Cy-CF$_2$O-Ph(3,4,5-F$_3$) | (28.3) | 5 |
| ethyl-Ph-Ph(2-F)-Ph-propyl | (i-1-1.1) | 6 |
| propyl-Cy-Cy-Ph(2-F)-Ph(3,4,5-F$_3$) | (37.2) | 3 |
| pentyl-Cy-Cy-CH=CH$_2$ | (2.4) | 6 |
| pentyl-Cy-Cy-CF$_2$O-Ph(3,4,5-F$_3$) | (28.5) | 5 |
| butyl-Cy-Cy-Ph-OCH$_3$ | (13.3) | 4 |
| propyl-Cy-Ph-Ph(3,4,5-F$_3$) | (56.2) | 10 |
| propyl-Cy-Cy-Ph(3,4,5-F$_3$) | (34.3) | 15 |
| ethyl-Cy-Cy-Ph(3,4,5-F$_3$) | (34.2) | 10 |

-continued

Chemical Formula 174:

| Chemical Structure | | Ratio (%) |
|---|---|---|
| (structure 1) | (33.3) | 10 |
| (structure 2) | (34.5) | 5 |
| (structure 3) | (ii-1.2) | 6 |

TABLE 7

| | |
|---|---|
| Tni (° C.) | 93.9 |
| Δn | 0.087 |
| Δε | 7.3 |
| η (mPa·s) | 16.3 |

Each construction of each embodiment as explained above, or its combination is an example. Without deviating from the gist of the present invention, addition of the constitution, abbreviation, replacement, or other changes are possible. Also, the present invention is not limited by each embodiment, and defined only by the scope of the claims.

Table 8 shows the results of the liquid crystal composition of the Examples, including initial VHR value, VHR value after heating (at 150° C. for one hour), the evaluation of the ghosting, the evaluation of the volatility, the evaluation of the process compatibility, and the evaluation of the solubility at a low temperature.

In Examples 2-6, the drop of the VHR values after the heating was small, and they were good in the evaluation of ghosting, volatility, process compatibility, and solubility at a low temperature solubility.

TABLE 8

| | Ex. 2 | Ex. 3 | Ex. 4 | Ex. 5 | Ex. 6 |
|---|---|---|---|---|---|
| Initial VHR | 99.3 | 99.2 | 99.0 | 99.0 | 99.1 |
| VHR after heating | 98.3 | 98.2 | 98.3 | 98.1 | 98.1 |
| Ghosting | A | A | A | A | A |
| Volatility | A | A | A | A | A |
| Process compatibility | A | A | A | A | A |
| Solubility at a low temperature solubility | A | A | A | A | A |

INDUSTRIAL UTILITY

The present invention can provide a liquid crystal composition and a liquid crystal display element using the same. Here, the liquid crystal composition has positive value of Δε, which can produce the liquid crystal display element with an excellent display quality at a high yield, having a liquid crystal phase at a wide temperature range, being small in the small viscosity, excellent in the solubility at a low temperature, high in the specific resistivity and the voltage retention, stable to the heat and light irradiation, and causing little defectiveness such as ghosting or drip trace.

EXPLANATION OF THE REFERENCES IN THE DRAWINGS

100: first substrate
102: TFT layer
103: pixel electrode
104: passivation film
105: first oriented film
200: second substrate
201: flattened film (overcoat layer)
202: black matrix
203: color filter
204: transparent electrode
205: second oriented film
301: seal material
302: projection (columnar spacer)
303: liquid crystal layer
304: projection (columnar spacer)
401: mask pattern
402: resin layer
L: light

What is claimed is:

1. A liquid crystal composition having a positive value of Δε, comprising:
   at least one kind of a compound represented by the following formula (i); and
   at least one kind of a compound represented by the following formula (ii):

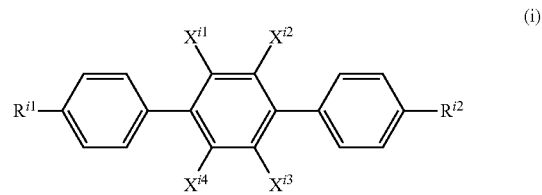

(i)

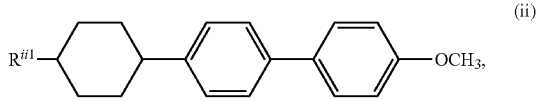

wherein in the formulae, each of $R^{i1}$, $R^{i2}$ and $R^{ii1}$ independently represents an alkyl group having a carbon number of 1-8;
one of the alkyl groups, or two or more of the alkyl groups being noncontiguous, include —$CH_2$— which can be independently substituted by —CH=CH—, —C≡C—, —O—, —CO—, —COO— or —OCO—;
hydrogen atom in the alkyl group can be substituted by fluorine atom or chlorine atom; and
one of $X^{i1}$, $X^{i2}$, $X^{i3}$ and $X^{i4}$ represents fluorine atom, and the others of $X^{i1}$, $X^{i2}$, $X^{i3}$ and $X^{i4}$ represent hydrogen atom.

2. The liquid crystal composition according to claim 1, wherein $X^{i1}$, $X^{i3}$ and $X^{i4}$ in the formula (i) are hydrogen atom, and $X^{i2}$ represents fluorine atom.

3. The liquid crystal composition according to claim 1, further comprising a compound represented by formula (L);

Formula 2

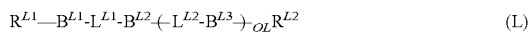

wherein in the formula, each of $R^{L1}$ and $R^{L2}$ independently represents an alkyl group having a carbon atom number of 1-8;
one of the alkyl groups, or two or more of the alkyl groups being noncontiguous, include —$CH_2$— which can be independently substituted by —CH=CH—, —C≡C—, —O—, —CO—, —COO— or —OCO—;
OL represents 0, 1, 2 or 3;
each of $B^{L1}$, $B^{L2}$ and $B^{L3}$ independently represents a group selected from the group consisting of (a) and (b) below;
(a): 1,4-cyclohexylene group (in which one of —$CH_2$— groups or noncontiguous two of —$CH_2$— groups can be substituted with —O—); and
(b): 1,4-phenylene group (in which one of —CH= group or noncontiguous two of —CH= group can be substituted with —N=);
at least one hydrogen atom in the group (a) and the group (b) can be independently substituted with cyano group, fluorine atom or chlorine atom;
each of $L^{L1}$ and $L^{L2}$ independently represents single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF— or —C≡C—;
when OL is 2 or 3 so that plural groups of $L^{L2}$ exist, said plural groups of $L^{L2}$ can be the same or different;
when OL is 2 or 3 so that plural groups of $B^{L3}$ exist, said plural groups of $B^{L3}$ can be the same or different; and however, the compound represented by formula (L) is not the compound represented by the formula (i) or the compound represented by the formula (ii).

4. The liquid crystal composition according to claim 1, further comprising a compound represented by formula (M);

Chemical Formula 3

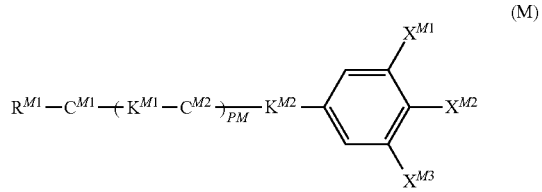

wherein in the formula, $R^{M1}$ represents an alkyl group having a carbon atom number of 1-8;
one of the alkyl groups, or two or more of the alkyl groups being noncontiguous, include —$CH_2$— which can be independently substituted by —CH=CH—, —C≡C—, —O—, —CO—, —COO— or —OCO—;
PM represents 0, 1, 2 3 or 4;
each of $C^{M1}$ and $C^{M2}$ independently represents a group selected from the group consisting of (d) and (e) below;
(d): 1,4-cyclohexylene group (in which one of —$CH_2$— groups or noncontiguous two of —$CH_2$— groups can be substituted with —O— or —S—); and
(e): 1,4-phenylene group (in which one of —CH= groups or noncontiguous two of —CH= groups can be substituted with —N=);
at least one hydrogen atom in the group (d) and the group (e) can be independently substituted with cyano group, fluorine atom or chlorine atom;
each of $K^{M1}$ and $K^{M2}$ independently represents single bond, —$CH_2CH_2$—, —$(CH_2)_4$—, —$OCH_2$—, —$CH_2O$—, —$OCF_2$—, —$CF_2O$—, —COO—, —OCO— or —C≡C—,
when PM is 2, 3 or 4 so that plural groups of $K^{M1}$ exist, said plural groups of $K^{M1}$ can be the same or different;
when PM is 2, 3 or 4 so that plural groups of $C^{M2}$ exist, said plural groups of $C^{M2}$ can be the same or different;
each of $X^{M1}$ and $X^{M3}$ independently represents hydrogen atom, chlorine atom or fluorine atom; and
$X^{M2}$ represents hydrogen atom, fluorine atom, chlorine atom, cyano group, trifluoromethyl group, fluoromethoxy group, difluoromethoxy group, trifluoromethoxy group or 2,2,2-trifluoroethyl group.

5. A liquid crystal display element using the composition of claim 1.

6. A liquid crystal display element using the composition of claim 1, useful for IPS mode, OCB mode, ECB mode, VA mode, VA-IPS mode or FFS mode.

7. A liquid crystal display using the liquid crystal display element of claim 5.

* * * * *